US007949565B1

(12) United States Patent  (10) Patent No.: US 7,949,565 B1
Eldering et al.  (45) Date of Patent: May 24, 2011

(54) PRIVACY-PROTECTED ADVERTISING SYSTEM

(75) Inventors: Charles A. Eldering, Doylestown, PA (US); Gregory C. Flickinger, Furlong, PA (US)

(73) Assignee: Prime Research Alliance E., Inc. (VG)

( * ) Notice: Subject to any disclaimer, the term of this patent is extended or adjusted under 35 U.S.C. 154(b) by 1625 days.

(21) Appl. No.: 09/591,577

(22) Filed: Jun. 9, 2000

Related U.S. Application Data

(63) Continuation-in-part of application No. 09/204,888, filed on Dec. 3, 1998, now Pat. No. 7,150,030.

(60) Provisional application No. 60/183,409, filed on Feb. 18, 2000, provisional application No. 60/190,341, filed on Mar. 16, 2000, provisional application No. 60/196,375, filed on Apr. 12, 2000.

(51) Int. Cl.
*G06Q 30/00* (2006.01)
(52) U.S. Cl. .................................. 705/14.49; 705/14.53
(58) Field of Classification Search ................ 705/1, 10, 705/14
See application file for complete search history.

(56) References Cited

U.S. PATENT DOCUMENTS

| 4,258,386 A | 3/1981 | Cheung ........................... 358/84 |
| 4,546,382 A | 10/1985 | McKenna |
| 4,602,279 A | 7/1986 | Freeman ......................... 358/86 |
| 4,745,549 A | 5/1988 | Hashimoto ................... 364/402 |
| 4,754,410 A | 6/1988 | Leech et al. .................. 364/513 |
| 5,223,924 A | 6/1993 | Strubbe |
| 5,231,494 A | 7/1993 | Wachob |
| 5,233,423 A | 8/1993 | Jernigan |
| 5,287,181 A | 2/1994 | Holman |
| 5,319,455 A | 6/1994 | Hoarty et al. ...................... 348/7 |
| 5,374,951 A | 12/1994 | Welsh |
| 5,410,344 A | 4/1995 | Graves et al. ..................... 348/1 |
| 5,446,919 A | 8/1995 | Wilkins ......................... 455/6.2 |
| 5,448,471 A | 9/1995 | Deaton |
| 5,550,928 A | 8/1996 | Lu |
| 5,565,909 A | 10/1996 | Thibadeau |

(Continued)

FOREIGN PATENT DOCUMENTS

CA 2286243 4/2001

(Continued)

OTHER PUBLICATIONS

Broadvision, "The Power of Personalization", 3 pgs.

(Continued)

*Primary Examiner* — Yehdega Retta
(74) *Attorney, Agent, or Firm* — Carlineo, Spicer & Kee, LLC

(57) ABSTRACT

A database of consumer profiles is generated from multiple sources of information including demographic databases identifying demographic attributes of the consumers and transaction records for the consumers. The transaction records are processed to generate transaction attributes and interests of the consumer. The consumer profiles identify deterministic and probabilistic attributes about the consumer, but do not contain privacy violating information such as raw transaction records. The consumer profiles may be maintained in a plurality of distributed databases. Advertisers generate profiles that identify attributes of an intended target market of the advertisement. The advertisement profiles are in the form of operators that can be applied to the database of consumer profiles to determine applicability of advertisements to the subscribers. The operators may only be applied to or make measurements on certain "observables". The operators will not be able to obtain private information from the database of consumer profiles.

15 Claims, 43 Drawing Sheets

U.S. PATENT DOCUMENTS

| | | | |
|---|---|---|---|
| 5,579,055 A | 11/1996 | Hamilton | |
| 5,585,865 A | 12/1996 | Amano | |
| 5,592,560 A | 1/1997 | Deaton | |
| 5,596,373 A | 1/1997 | White | |
| 5,600,364 A | 2/1997 | Hendricks et al. | 348/1 |
| 5,608,445 A | 3/1997 | Mischler | |
| 5,619,709 A | 4/1997 | Caid et al. | 395/794 |
| 5,635,989 A | 6/1997 | Rothmuller | |
| 5,636,346 A | 6/1997 | Saxe | 395/201 |
| 5,661,516 A | 8/1997 | Carles | |
| 5,687,322 A | 11/1997 | Deaton | |
| 5,703,655 A | 12/1997 | Corey | |
| 5,704,017 A | 12/1997 | Heckerman et al. | 395/61 |
| 5,710,884 A | 1/1998 | Dedrick | 395/200.47 |
| 5,724,521 A | 3/1998 | Dedrick | 395/226 |
| 5,740,549 A | 4/1998 | Reilly et al. | 395/214 |
| 5,749,081 A | 5/1998 | Whiteis | |
| 5,754,939 A * | 5/1998 | Herz et al. | 455/3.04 |
| 5,758,259 A | 5/1998 | Lawler | 346/6 |
| 5,761,601 A | 6/1998 | Nemirofsky | |
| 5,761,662 A | 6/1998 | Dasan | |
| 5,765,030 A | 6/1998 | Nachenberg | |
| 5,768,592 A | 6/1998 | Chang | |
| 5,774,170 A | 6/1998 | Hite et al. | 348/9 |
| 5,774,664 A | 6/1998 | Hidary | |
| 5,786,845 A | 7/1998 | Tsuria | |
| 5,790,935 A | 8/1998 | Payton | |
| 5,794,210 A | 8/1998 | Goldhaber | |
| 5,796,952 A | 8/1998 | Davis | |
| 5,805,974 A | 9/1998 | Hite | |
| 5,818,935 A | 10/1998 | Maa | |
| 5,819,156 A | 10/1998 | Belmont | |
| 5,835,905 A * | 11/1998 | Pirolli et al. | 707/3 |
| 5,848,396 A | 12/1998 | Gerace | 705/10 |
| 5,857,190 A | 1/1999 | Brown | |
| 5,872,588 A | 2/1999 | Aras | |
| 5,883,818 A | 3/1999 | Salimi et al. | |
| 5,912,696 A | 6/1999 | Bueh | |
| 5,915,243 A | 6/1999 | Smolen | 705/14 |
| 5,918,014 A | 6/1999 | Robinson | |
| 5,926,205 A | 7/1999 | Krause | |
| 5,930,764 A | 7/1999 | Melchione | |
| 5,933,811 A | 8/1999 | Angles | |
| 5,948,061 A | 9/1999 | Merriman et al. | 709/219 |
| 5,974,299 A | 10/1999 | Massetti | |
| 5,974,396 A | 10/1999 | Anderson | |
| 5,974,398 A | 10/1999 | Hanson | |
| 5,974,399 A | 10/1999 | Giulian | |
| 5,977,964 A | 11/1999 | Williams | |
| 5,991,735 A | 11/1999 | Gerace | 705/10 |
| 6,002,393 A | 12/1999 | Hite | |
| 6,002,394 A | 12/1999 | Schein | |
| 6,005,597 A | 12/1999 | Barrett et al. | 348/1 |
| 6,009,410 A | 12/1999 | LeMole | |
| 6,012,051 A | 1/2000 | Sammon, Jr. et al. | 706/52 |
| 6,014,698 A | 1/2000 | Griffiths | |
| 6,018,710 A | 1/2000 | Wynblatt | |
| 6,020,883 A | 2/2000 | Herz et al. | 345/327 |
| 6,026,368 A | 2/2000 | Brown | |
| 6,026,370 A | 2/2000 | Jermyn | |
| 6,055,510 A | 4/2000 | Henrick | |
| 6,055,573 A | 4/2000 | Gardenswartz | |
| 6,085,031 A | 7/2000 | Johnson et al. | |
| 6,088,722 A | 7/2000 | Herz et al. | 709/217 |
| 6,108,637 A | 8/2000 | Blumenau | 705/7 |
| 6,119,098 A | 9/2000 | Guyot et al. | 705/14 |
| 6,120,300 A * | 9/2000 | Ho et al. | 434/332 |
| 6,133,912 A | 10/2000 | Montero | |
| 6,134,532 A | 10/2000 | Lazarus et al. | 705/14 |
| 6,141,010 A | 10/2000 | Hoyle | |
| 6,160,570 A | 12/2000 | Sitnik | |
| 6,177,931 B1 | 1/2001 | Alexander et al. | 345/327 |
| 6,205,247 B1 | 3/2001 | Breuer et al. | |
| 6,216,129 B1 | 4/2001 | Eldering | 707/10 |
| 6,236,978 B1 | 5/2001 | Tuzhilin | |
| 6,286,005 B1 | 9/2001 | Cannon | |
| 6,286,140 B1 | 9/2001 | Ivanyi | |
| 6,298,348 B1 | 10/2001 | Eldering | 707/10 |
| 6,324,519 B1 | 11/2001 | Eldering | 705/14 |
| 6,327,574 B1 | 12/2001 | Kramer | |
| 6,400,996 B1 | 6/2002 | Hoffberg et al. | |
| 6,446,261 B1 | 9/2002 | Rosser | |
| 6,457,010 B1 | 9/2002 | Eldering et al. | 707/10 |
| 6,460,036 B1 | 10/2002 | Herz | |
| 6,463,585 B1 * | 10/2002 | Hendricks et al. | 725/35 |
| 6,560,578 B2 | 5/2003 | Eldering | |
| 6,684,194 B1 | 1/2004 | Eldering | |
| 6,714,917 B1 | 3/2004 | Eldering | |
| 6,820,062 B1 | 11/2004 | Gupta | |
| 2001/0049620 A1 | 12/2001 | Blasko | |
| 2002/0095676 A1 | 7/2002 | Knee | |
| 2002/0194058 A1 | 12/2002 | Eldering | |
| 2003/0004810 A1 | 1/2003 | Eldering | |
| 2003/0135853 A1 | 7/2003 | Goldman | |
| 2005/0283796 A1 | 12/2005 | Flickinger | |

FOREIGN PATENT DOCUMENTS

| | | |
|---|---|---|
| GB | 2348346 | 9/2000 |
| GB | 2348530 | 10/2000 |
| WO | 9712486 | 4/1997 |
| WO | 9717774 | 5/1997 |
| WO | 9741673 | 11/1997 |
| WO | 9821877 | 5/1998 |
| WO | 9828906 | 7/1998 |
| WO | 9834189 | 8/1998 |
| WO | 98721713 | 11/1998 |
| WO | 9901984 | 1/1999 |
| WO | 9904561 | 1/1999 |
| WO | 9944159 | 9/1999 |
| WO | 9965237 A1 | 12/1999 |
| WO | 9966719 A1 | 12/1999 |
| WO | 0008802 | 2/2000 |
| WO | 0013434 | 3/2000 |
| WO | 0014951 | 3/2000 |
| WO | 0033224 | 6/2000 |
| WO | 0054504 | 9/2000 |
| WO | 0055748 | 9/2000 |
| WO | 0124027 | 4/2001 |

OTHER PUBLICATIONS

Raskutti, Bhavani, "Acquiring Customer Preferences for Information Filtering: a Heuristic-Statistical Approach", Proceedings of the 5$^{th}$ International Conference on User Modeling, Kailuna-Kona, HI, USA, pp. 2-5, (Jan. 1996), 3 pgs.

Engage Technologies, "About Engage Technologies", (Copyright 1997), 13 pgs.

Firefly Corporation, "Firefly Passport Office", (Copyright 1997), 8 pgs.

Gallagher, K., "A framework for targeting banner advertising on the Internet", System Sciences 1997, Proceedings of the Thirtieth Hawaii International Conference, vol. 4, pp. 265-275, (Jan. 7-10, 1997), 12 pgs.

Media Metrix, "Frequently Asked Questions", 2 pgs.

Net Perceptions, "Adding Value in the Digital Age", 11 pgs.

Open Sesame, "Learn Sesame", (copyright 1998) 3 pgs.

Aptex Software, "SelectCast for Ad Servers", 4 pgs.

Aptex Software, "SelectCast for Commerce Servers", 2 pgs.

U.S. Appl. No. 09/516,983, Eldering, Charles A.

U.S. Appl. No. 09/635,542, Eldering, Charles A.

U.S. Appl. No. 09/807,887, Eldering, Charles.

U.S. Appl. No. 09/857,160, Eldering, Charles A.

U.S. Appl. No. 09/857,256, Eldering, Charles A.

U.S. Appl. No. 11/196,774, Flickinger, Gregory.

U.S. Appl. No. 09/516,983, filed Mar. 1, 2000, Eldering, Charles A.

U.S. Appl. No. 09/635,542, filed Aug. 10, 2000, Eldering, Charles A.

U.S. Appl. No. 09/807,887, filed Apr. 19, 2001, Eldering, Charles A.

U.S. Appl. No. 09/857,160, filed Jul. 1, 2001, Eldering, Charles A.

U.S. Appl. No. 09/857,256, filed Jun. 1, 2001, Eldering, Charles A.

U.S. Appl. No. 09/204,888, Eldering et al.

U.S. Appl. No. 09/205,119, Eldering et al.

U.S. Appl. No. 60/190,375, Eldering.

U.S. Appl. No. 60/190,341, Blasko et al.

U.S. Appl. No. 60/183,409, Eldering et al.

* cited by examiner

ADVERTISEMENT SUCCESS RATES

| ADVERTISEMENT APPLICABILITY | SUCCESS RATE |
|---|---|
| EXTREMELY APPLICABLE | 0.05 |
| QUITE APPLICABLE | 0.03 |
| APPLICABLE | 0.01 |
| NOT VERY APPLICABLE | 0.005 |
| NOT APPLICABLE | 0.001 |

*FIG. 1C*

| TIME | CHANNEL ID | PROGRAM TITLE | VOLUME |
|---|---|---|---|
| 08:01:25AM | 06 | "MORNING TV" | 5/10 |
| 08:01:45AM | 13 | "GOOD MORNING AMERICA" | 5/10 |
| 08:03:25AM | 13 | "GOOD MORNING AMERICA" | 6/10 |
| ... | | | |
| 06:11:25PM | 09 | "SEINFELD" | 5/10 |
| 06:15:23PM | 09 | "ADVERTISING" | 5/10 |
| 06:17:25PM | 09 | "SEINFELD" | 5/10 |
| 06:28:10PM | 09 | "ADVERTISING" | 5/10 |
| 06:30:07PM | 52 | "LIVING SINGLE" | 5/10 |
| ... | | | |

FIG. 8

| TIME OF DAY | MINUTES WATCHED | CHANNEL CHANGES | AVERAGE VOLUME |
|---|---|---|---|
| MORNING (6AM-9AM) | 61 | 2 | 5/10 |
| MID-DAY (9AM-3PM) | 0 | 0 | - |
| AFTERNOON (3PM-6PM) | 0 | 0 | - |
| NIGHT (6PM-10PM) | 122 | 4 | 6/10 |
| LATE NIGHT (12AM-6AM) | 0 | 0 | - |
| TOTAL | 183 | 6 | 5.7/10 |

*FIG. 9*

| CATEGORIES | DEMOGRAPHIC GROUPS | | | | | | | | | | |
|---|---|---|---|---|---|---|---|---|---|---|---|
| | AGE | | | INCOME | | | SIZE | | | GENDER | |
| | 0-10 | 10-18 ... | >70 | 0-20K | 20-50K ... | 50-100K | 1 | 2 ... | >5 | M | F |
| NEWS | 0.1 | 0.1 | 0.4 | 0.2 | 0.3 | 0.4 | 0.5 | 0.3 | 0.1 | 0.3 | 0.7 |
| FICTION | 0.5 | 0.3 | 0.2 | 0.4 | 0.2 | 0.3 | 0.3 | 0.2 | 0.1 | 0.8 | 0.2 |
| FACTUAL | 0.2 | 0.2 | 0.3 | 0.1 | 0.4 | 0.2 | 0.2 | 0.2 | 0.4 | 0.4 | 0.6 |
| ... | | | | | | | | | | | |
| ADVERTISING | 0.1 | 0.3 | 0.5 | 0.3 | 0.2 | 0.1 | 0.2 | 0.1 | 0.3 | 0.5 | 0.5 |

*FIG. 12B*

| HOUSEHOLD PARAMETER 1701 | AVERAGE VALUE 1705 | SESSION VALUE 1703 | UPDATE? 1707 |
|---|---|---|---|
| SIZE | 2.6 | 3.0 | YES |
| AGE | 23.5 | 12 | YES |
| SEX (FEMALE=1) | 0.6 | 0.7 | YES |
| INCOME ($0-$20K) | 0.1 | 0.1 | YES |
| INCOME ($20-$50K) | 0.6 | 0.7 | YES |
| INCOME ($50-$100K) | 0.2 | 0.1 | YES |
| INCOME (>$100K) | 0.1 | 0.1 | YES |
| ZIP CODE | | | NO |
| TELEPHONE NUMBER | | | NO |

FIG. 17

| HOUSEHOLD INTEREST | AVERAGE VALUE | SESSION VALUE |
|---|---|---|
| DRAMA | 0.1 | 0.20 |
| ROMANCE | 0.1 | 0.20 |
| ACTION | 0.6 | 0.25 |
| SITCOM | 0.2 | 0.30 |
| ... | | |
| SPORTS | 0 | 0.05 |
| HEALTH/EXCERCISE | 0.6 | 0.2 |
| FOOD | 0.3 | 0.4 |
| CHILD RELATED | 0.0 | 0.1 |
| TOYS | 0.0 | 0.1 |
| ... | | |
| AUTOMOBILE | 0.1 | 0.2 |

1901 / 1903 / 1905
1909 PROGRAMMING
1907 PRODUCTS

FIG. 19

```
READ POP DATA
FOR N=1 TO M
    READ PRODUCT ID
    RETRIEVE [PRODUCT DEMOGRAPHICS VECTOR]
    RETRIEVE [DEMOGRAPHIC CHARACTERIZATION VECTOR]
    RETRIEVE [PRODUCT PREFERENCE VECTOR]
    WEIGHT = PRODUCT TOTAL PURCHASE/PRODUCT CATEGORY
        TOTAL PURCHASE
    HOUSEHOLD DEMOGRAPHICS VECTOR =
        (WEIGHT) * (PRODUCT DEMOGRAPHICS VECTOR) +
        (DEMOGRAPHIC CHARACTERIZATION VECTOR)
    NORMALIZE [DEMOGRAPHIC CHARACTERIZATION VECTOR]
    STORE [DEMOGRAPHIC CHARACTERIZATION VECTOR]
    PRODUCT PREFERENCE VECTOR =
        (WEIGHT * PRODUCT PURCHASE VECTOR) + (PRODUCT
        PREFERENCE VECTOR)
    NORMALIZE [PRODUCT PREFERENCE VECTOR]
    STORE [PRODUCT PREFERENCE VECTOR]
NEXT M
```

FIG. 24A

```
READ [AD DEMOGRAPHIC VECTOR]
READ [AD PRODUCT CATEGORY, AD PRODUCT PREFERENCE VECTOR]
RETRIEVE [DEMOGRAPHIC CHARACTERIZATION VECTOR]
RETRIEVE [PRODUCT PREFERENCE VECTOR (PRODUCT CATEGORY)]
DEMOGRAPHIC CORRELATION = CORRELATE [DEMOGRAPHIC
    CHARACTERIZATION VECTOR, AD DEMOGRAPHIC VECTOR]
PRODUCT PREFERENCE CORRELATION = CORRELATE [AD PRODUCT
    PREFERENCE VECTOR, PRODUCT PREFERENCE VECTOR]
RETURN [DEMOGRAPHIC CORRELATION]
RETURN [PRODUCT PREFERENCE CORRELATION]
```

*FIG. 24B*

PRODUCT DEMOGRAPHICS VECTOR

PRODUCT ID

| HOUSEHOLD INCOME | ≤20K | 0.2 |
| HOUSEHOLD INCOME | 20-40K | 0.3 |
| ... | | |
| HOUSEHOLD SIZE | 0-2 | 0.1 |
| HOUSEHOLD SIZE | 2-4 | 0.3 |

PRODUCT CHARACTERISTICS

PRODUCT ID: 2597251
BRAND: KELLOGG'S CORN FLAKES
SIZE: 32 OZ
PRICE: $2.69

PRODUCT DEMOGRAPHICS RULES

| MONTHLY QUANTITY OF DIAPERS PURCHASED | ESTIMATED HOUSEHOLD SIZE | ESTIMATED # OF CHILDREN <5 |
|---|---|---|
| >300 | >5 | ≥3 |
| 150-300 | 3-5 | 2-3 |
| 50-150 | 3-4 | 1-2 |
| 1-50 | 3-4 | 1 |

HEURISTIC RULES

*FIG. 25*

PRIVACY-PROTECTED ADVERTISING SYSTEM

This application is a Continuation-In-Part (CIP) of U.S. application Ser. No. 09/204,888 filed on Dec. 3, 1998 now U.S. Pat. No. 7,150,030. This application is also related to U.S. application Ser. Nos. 09/205,653 (Issued U.S. Pat. No. 6,457,010) and 09/205,119 filed on Dec. 3, 1998; 09/268,519 (Issued U.S. Pat. No. 6,298,348), 09/268,526 (Issued U.S. Pat. No. 6,216,129) and 09/268,520 (Issued U.S. Pat. No. 6,324,519) all filed on Mar. 12, 1999, and provisional application Nos. 60/183,409 filed on Feb. 18, 2000, 60/190,341 filed on Mar. 16, 2000 and 60/196,375 filed on Apr. 12, 2000. All of the above applications are herein incorporated by reference in their entirety, but are not admitted to be prior art.

BACKGROUND OF THE INVENTION

Advertising forms an important part of broadcast programming including broadcast video (television), radio and printed media. The revenues generated from advertisers subsidize and in some cases pay entirely for programming received by subscribers. For example, over the air broadcast programming (non-cable television) is provided entirely free to subscribers and is essentially paid for by the advertisements placed in the shows that are watched. Even in cable television systems and satellite-based systems, the revenues from advertisements subsidize the cost of the programming, and were it not for advertisements, the monthly subscription rates for cable television would be many times higher than at present. Radio similarly offers free programming based on payments for advertising. The low cost of newspapers and magazines is based on the subsidization of the cost of reporting, printing and distribution from the advertising revenues.

Techniques for inserting pre-recorded spot messages into broadcast transmission have been known. Generally, broadcast video sources (i.e., TV networks, special interest channels, etc.) schedule their air time with two types of information: "programming" for the purpose of informing or entertaining, and "avails" for the purpose of advertising. The avails may occupy roughly 20-25% of the total transmitting time, and are usually divided into smaller intervals of 15, 30, or 60 seconds.

In many prior art systems, the insertion of advertisements in avails is handled by a combination of cue-tone detectors, switching equipment and tape players that hold the advertising material. Upon receipt of the cue tones, an insertion controller automatically turns on a tape player containing the advertisement. Switching equipment then switches the system output from the video and audio signals received from the programming source to the output of the tape player. The tape player remains on for the duration of the advertising, after which the insertion controller causes the switching equipment to switch back to the video and audio channels of the programming source. When switched, these successive program and advertising segments usually feed to a radio-frequency (RF) modulator for delivery to the subscribers.

Many subscriber television systems, such as cable television are currently being converted to digital systems. These new digital systems compress the advertising data according to decompression standards, such as a Motion Picture Experts Group (MPEG) compression standard (currently MPEG-2 standard). The compressed data is then stored as a digital file on a large disk drive (or several drives). Upon receipt of the cue tone, the digital file is spooled ("played") off of the drive.

The advertisement may be inserted into the digital MPEG stream using digital video splicing techniques that include the healing of the broken MPEG stream. Alternatively, the digital advertisement may be converted to analog and spliced with an analog signal. Yet another technique for ad insertion involves decompressing the digital MPEG stream and splicing the ad in with the program in an uncompressed format.

A prior art (present model) of providing advertisements along with actual programming is based on linked sponsorship. In the linked sponsorship model, the advertisements are inserted into the actual programming based on the contents of the programming, e.g., a baby stroller advertisement may be inserted into a parenting program.

Even with linked sponsorship, advertising, and in particular broadcast television advertising, is mostly ineffective. That is, a large percentage, if not the majority of advertisements, do not have a high probability of effecting a sale. In addition to this fact, many advertisements are not even seen/heard by the subscriber who may mute the sound, change channels, or simply leave the room during a commercial break.

The reasons for such ineffectiveness are due to the fact that the displayed advertisements are not targeted to the subscribers' needs, likes or preferences. Generally, the same advertisements are displayed to all the subscribers irrespective of the needs and preferences of the subscribers.

In the Internet world, efforts have been made to collect information about subscriber likes and preferences by different means, e.g., by the use of cookies. In cookies and other profiling means, the user viewing habits, purchase habits, or surfing habits are monitored, recorded and analyzed, and then, based on the analysis, suitable advertisements are selected. Even though cookies and other profiling means assist in targeting advertising, they have recently come under fire as these means are known to invade the privacy of the subscribers without their authorization.

Thus, a system and a method is desired for providing subscribers/consumers with advertisements which are more targeted/directed to their lifestyles, while ensuring that their demographic, purchase, and product preference data is maintained private.

SUMMARY OF THE INVENTION

The present invention is directed at a system and a method for providing subscribers/consumers with advertisements that are more directed to their lifestyles, while ensuring that their demographic, purchase, and product preference data is maintained private. The present invention allows manufacturers and advertisers to use their advertising dollars more effectively across a multitude of media platforms including video and Internet domains, and eventually extending into the printed media.

The system is based on the premise that the subscribers may agree to have advertisements delivered to them on a more selective basis than the prior art "linked sponsorship" model in which advertisements are only linked to the contents of the programming. Subscribers/consumers who sign up for this service will receive discounts from the Internet access or video service provider. Advertisers may send profiles for their advertisements to a Secure Correlation Server™ (SCS) that allows the advertisement to be correlated to the subscriber profiles. No information regarding the subscriber is released, and subscribers who do not wish to participate in the service are not profiled.

A system in accordance with one embodiment of the present invention utilizes the principles of Quantum Advertising™ in which subscribers/consumers are described by consumer/subscriber characterization vectors that contain deterministic and probabilistic information regarding the consumer/subscriber, but do not contain privacy violating information such as, transaction records of purchases, video selections, or other raw data.

In accordance with the principles of one embodiment of the present invention, the subscriber profiles may be created by collecting information from a plurality of distributed databases. These distributed databases may be queried through the use of operators that in effect make measurements on certain "observables." By controlling the types of observables, certain parameters may be measured (in a probabilistic or deterministic sense) while other parameters may remain unmeasurable in order to preserve privacy. The operators may include clustering operators as well as operators for correlating advertisement characterization vectors with consumer/subscriber characterizations.

In another embodiment of the present invention, a system permits the targeting of advertisements in the Internet and video platforms, e.g., Switched Digital Video (SDV) and cable-based systems. In a SDV platform, the present invention allows for resolution of the advertising at the level of the home and even at the level of the individual user/subscriber. The system of the present invention may also be utilized for the delivery of advertisements over cable networks by selecting advertisements at the head end or substituting advertisements in the set-top box.

The general principles of the present invention are not constrained to video networks and may be generally applied to a variety of media systems including printed media, radio broadcasting, and store coupons. The system provides the overall capability to match advertisements using consumer profiles that do not contain the raw transaction information, thus subscriber privacy is maintained.

BRIEF DESCRIPTION OF THE DRAWINGS

These and other features and objects of the invention will be more fully understood from the following detailed description of the preferred embodiments that should be read in light of the accompanying drawings:

FIG. 1C illustrates an exemplary case where different success rates are determined by measuring products or services that were purchased as the result of the viewing of a targeted advertisement;

FIG. 8 illustrates a time of day detailed record;

FIG. 9 illustrates a household viewing habits statistical table;

FIG. 12B illustrates a set of heuristic rules expressed in terms of conditional probabilities;

FIG. 17 illustrates average and session household demographic data;

FIG. 19 illustrates a household interest profile including programming and product profiles;

FIGS. 24A-B illustrate pseudocode updating the characteristics vectors and for a correlation operation respectively;

FIG. 25 illustrates heuristic rules;

DETAILED DESCRIPTION OF THE PREFERRED EMBODIMENT

Figure 1A:
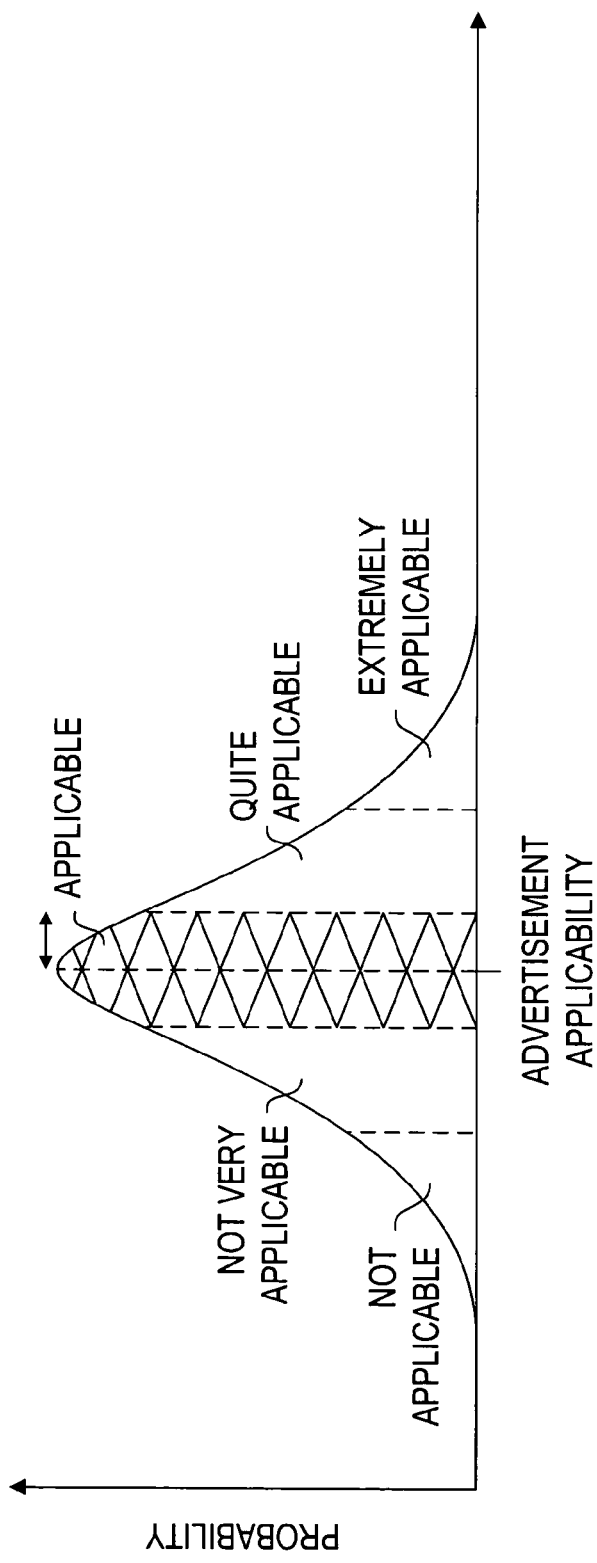
FIG. 1A illustrates advertisement applicability modeled as a distribution curve.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1A through 30B in particular, the apparatus of the present invention is disclosed.

The principles of the present invention propose a method and system for targeting advertisements to only a selected group of subscribers without jeopardizing the privacy of the subscribers. As illustrated in FIG. 1A, advertisement applicability, in accordance with the principles of the present invention may be modeled as a distribution curve. As illustrated in FIG. 1A, a well-designed advertisement may be found to be "applicable" by the majority of subscribers, but there will be a number of subscribers for whom the advertisement will not be applicable. Similarly, some of the subscribers may find the advertisement to be quite applicable or extremely applicable. The subscribers that find the advertisement to be extremely applicable are most likely to purchase the product or service, and the subscribers that find the advertisement to be less applicable are less likely to purchase the product or service.

Figure 1B:
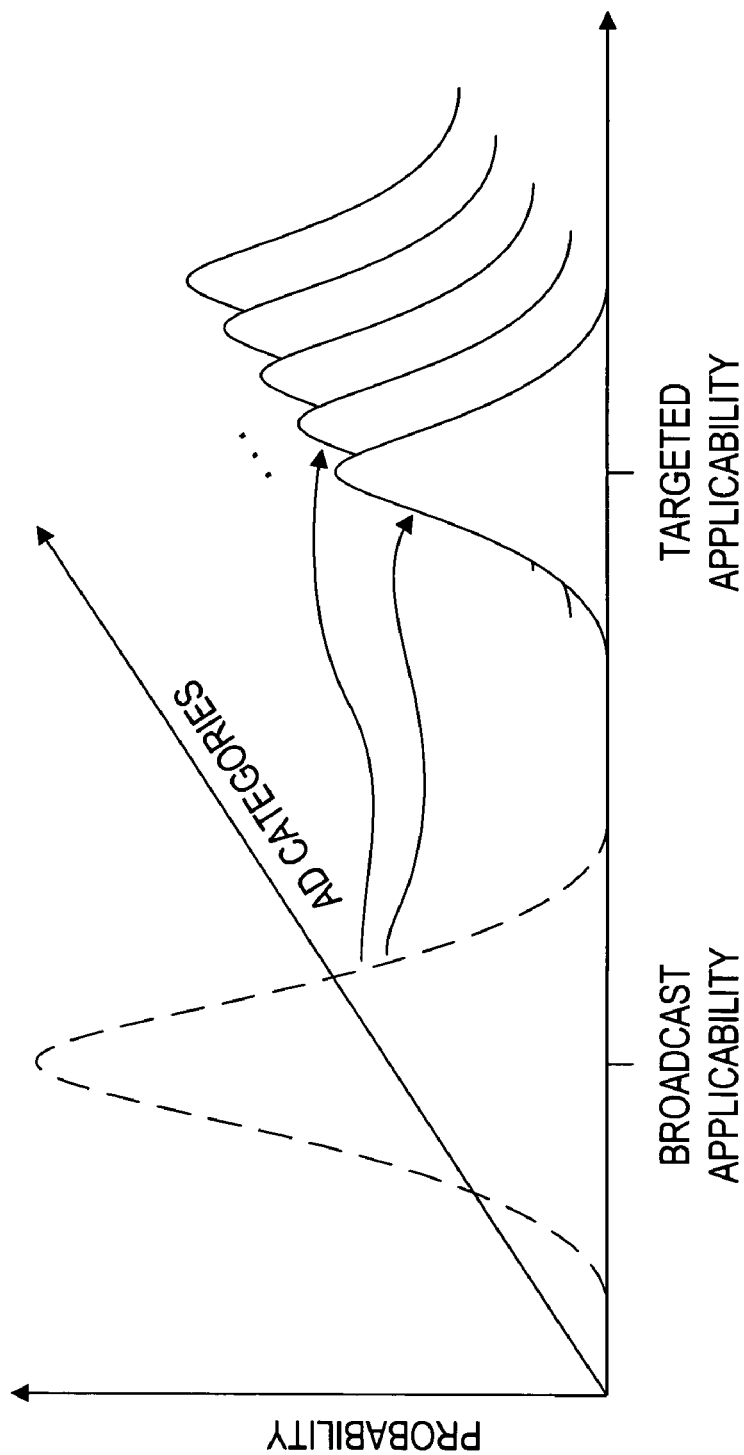
FIG. 1B illustrates an exemplary case of targeted marketing, where subscribers are divided into subgroups and the advertisement is displayed only to a subgroup of the subscribers.

Thus, in accordance with the principles of the present invention, the overall subscribership may be divided into subgroups (smaller groups), and the advertisement may be displayed only to the subgroup that is most interested in the advertisement and is most likely to purchase the product. FIG. 1B illustrates an exemplary case where subscribers are divided into subgroups, and the advertisement is displayed only to a subgroup of the subscribers.

By forming subgroups and targeting advertisements to one or more subgroups, the effectiveness of the advertisements may be greatly increased, and overall advertisement success rates may be increased. The increase in overall advertisement success rates represents more effective use of advertising dollars, and is a "welfare gain" in the sense that those dollars may be used for other goods and services. FIG. 1C illustrates an exemplary case where different success rates are determined by measuring products or services that were purchased as the result of the viewing of an advertisement. As can be seen, the highest success rate corresponds to the subgroup that finds the advertisement to be extremely applicable, and the lowest success rate corresponds to the subgroup that finds the advertisement least applicable.

Figure 2:
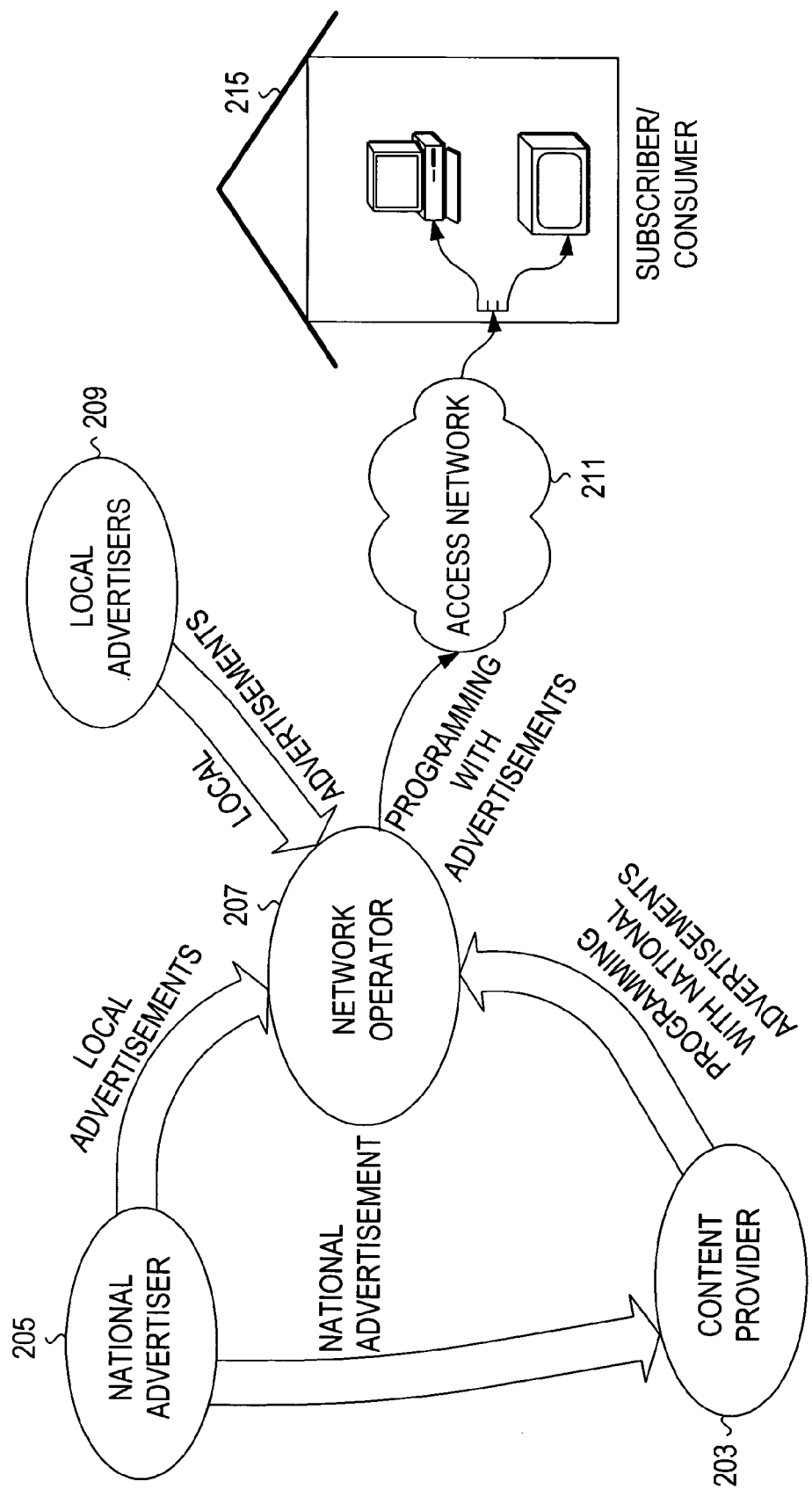
FIG. 2 illustrates an exemplary television system based on traditional advertising schemes.

The principles of the present invention may be applied to many different applications. In one embodiment, the present invention is utilized in a cable-based television (CTV) system. FIG. 2 illustrates an exemplary CTV system based on a traditional advertising business model. The CTV system consists of a content provider 203 (e.g., programmers) producing syndicated programs having advertising spots (avails). The content provider 203 also incorporates national advertisements that are received from a national advertiser 205. The programming contents (along with national advertisements) are then provided to a network operator (e.g., cable operator) 207. Generally, the network operator 207 purchases the programming contents for a fee. The network provider 207 is also provided with a right to substitute a percentage of the national advertisements with local advertisements (e.g. 20% of the advertisements may be substituted).

Thus, the network operator 207 may directly receive from one or more local advertisers 209 local advertisements to replace a percentage of the national advertisements. The local advertisements may also be received from the national advertiser 205. The network operator 207 then delivers the advertisements and programming to subscribers/consumer 215 via an access network 211. The information may be delivered to a personal computer or a television or any other display means at the subscriber end. The access network 211 may be a cable-based system, a satellite-based television system, an Internet-based computer network, or a Switched Digital Video (SDV) platform using xDSL transmission technology. Such access systems are well known to those skilled in the art.

In traditional systems, e.g., in the exemplary system of FIG. 2, the local advertisements are not generally customized based on the needs/preferences of the subscribers. Instead, the local advertisements are selected based on local markets, and the same advertisement is displayed to a subgroup, e.g., the opening of a local store may be advertised to a few local subscribers. Thus, even though the traditional advertising scheme as illustrated in FIG. 2 attempts to substitute national/generic advertisements with some local advertisements, the effectiveness of the advertisements is not increased because the advertisements are not customized/tailored based on user preferences/likes.

Figure 3:
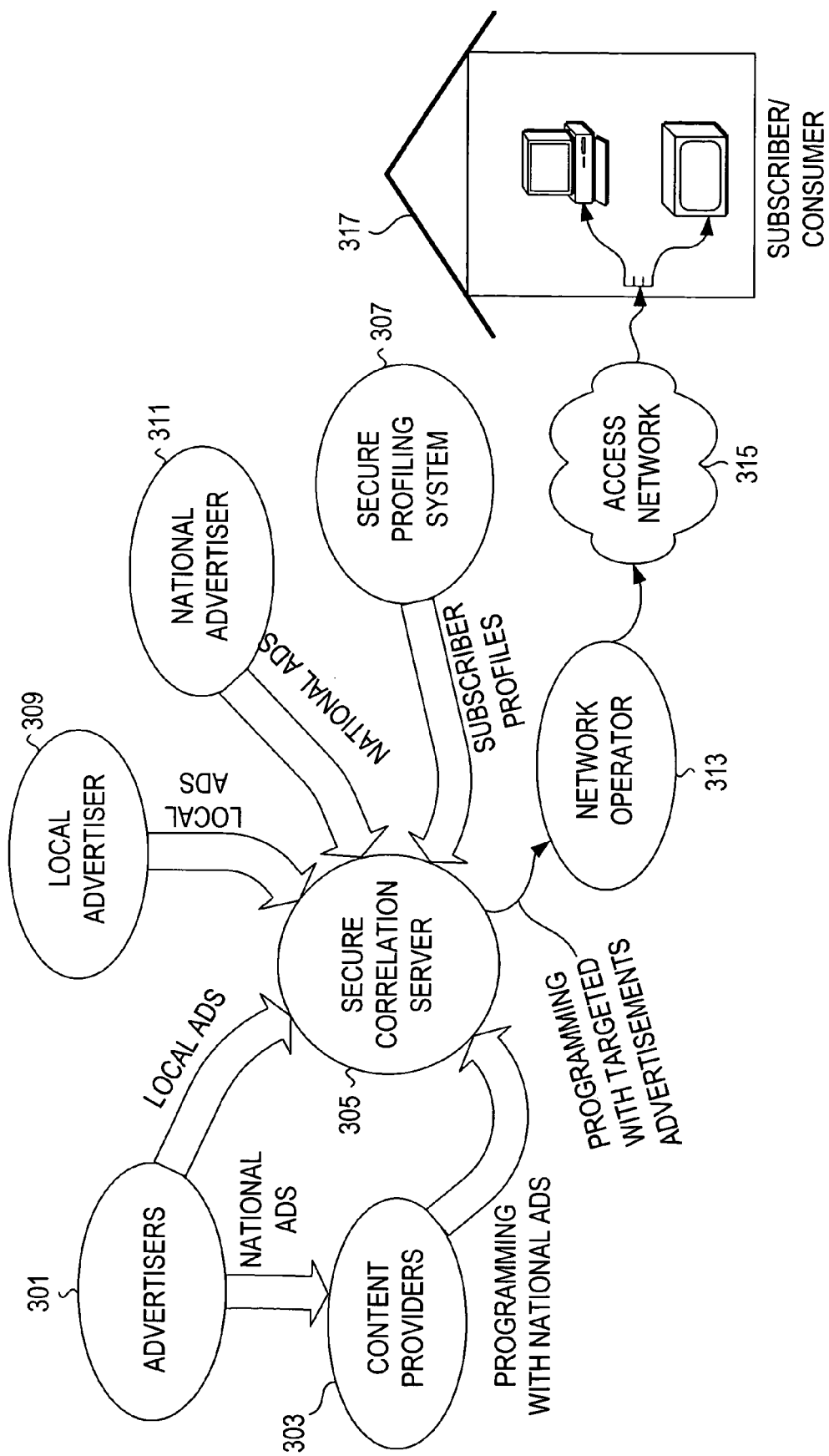
FIG. 3 illustrates a system utilizing targeted advertisements based on the principles of the present invention.

FIG. 3 illustrates a system utilizing targeted advertisements based on the principles of the present invention. In this model, the local advertisements are delivered from the advertisers to a centralized Secure Correlation Server™ 305 configured to perform matching of the advertisements to subscribers or groups of subscribers. At the correlation server 305, the input is received from a secure profiling system 307 in the form of subscriber profiles, and advertisements are matched to one or more subscriber profiles.

As illustrated in FIG. 3, a content provider 303 receives national advertisements from one or more advertisers 301, multiplexes the national advertisements in the programming and forwards the program streams having national advertisements to the correlation server 305. The correlation server 305 evaluates the advertisements and attempts to match them with one or more subscriber profiles stored in the secure profiling system 307. The correlation server 305, based on one or more subscriber profiles can substitute national advertisements within the program streams with more targeted advertisements received from local advertisers 309 or from national advertisers 311. The correlation server 305 may also receive local advertisements from the advertisers 301.

The correlation server 305 forwards programming having targeted advertisements to a network operator 313. The programming having targeted advertisements may then be forwarded to a subscriber 317 via an access network 315. On the subscriber end, the information may be delivered to a personal computer or a television or any other display means.

FIG. 3 illustrates the ability of a system in accordance with the principles of the present invention to target national advertisements as well as local advertisements. The advertisers may provide national advertisements to a Secure Correlation Server™ 305 that may match the advertisements to different subscribers 317. By providing the ability to match advertisements to demographic groups (in cable television systems) and to individual subscribers (in switched digital video systems) using the correlation process, the present invention allows for substantial increases in advertising effectiveness.

The system of FIG. 3 is secure for many reasons. First, the correlation server 305 does not contain raw data such as viewing or purchase records. Second, the correlation server 305 does not transmit subscriber/consumer profiles to third parties, and only performs internal calculations to determine the applicability of an advertisement to an individual subscriber.

It is to be noted that even though previously described embodiments are described with reference to video advertisements, the principles of the present invention are not based on a particular media. The principles of the present invention may be applied to diverse media such as printed media in which there are national (broadcast) advertisements as well as local advertisements, Internet advertisements, radio advertisements (in particular Internet radio broadcasting) and a variety of other forms of media advertisements.

In accordance with the principles of the present invention, different types of profiles may be created by the secure profiling system 307. These profiles may be subscriber profiles created from video selection data, consumer profiles created from retail purchases, and profiles created from the voluntary information provided by the consumer/subscriber. In a switched digital video system, these profiles may be based on individual viewing habits. In cable-based television systems, these profiles may be based on specific pay-per-view demands. In Internet-based computer networks, these profiles may be based upon Internet surfing habits.

As discussed above, one type of profile that can be generated is based on video selection data. The programming viewed by the subscriber, both entertainment and advertisement, can be studied and processed by a subscriber characterization system to determine program characteristics. This determination of the program characteristics is referred to as a program characteristics vector. The vector may be a truly one-dimensional vector, but can also be represented as an n dimensional matrix that can be decomposed into vectors.

The subscriber profile vector represents a profile of the subscriber (or the household of subscribers) and can be in the form of a demographic profile (average or session) or a program or product preference vector. The program and product preference vectors are considered to be part of a household interest profile that can be thought of as an n dimensional matrix representing probabilistic measurements of subscriber interests.

In the case that the subscriber profile vector is a demographic profile, the subscriber profile vector indicates a probabilistic measure of the age of the subscriber or average age of the viewers in the household, sex of the subscriber, income range of the subscriber or household, and other such demographic data. Such information comprises household demographic characteristics and is composed of both average and session values. Extracting a single set of values from the household demographic characteristics can correspond to a subscriber profile vector.

The household interest profile can contain both programming and product profiles, with programming profiles corresponding to probabilistic determinations of what programming the subscriber (household) is likely to be interested in, and product profiles corresponding to what products the subscriber (household) is likely to be interested in. These profiles contain both an average value and a session value, the average value being a time average of data, where the averaging period may be several days, weeks, months, or the time between resets of unit.

Since a viewing session is likely to be dominated by a particular viewer, the session values may, in some circumstances, correspond most closely to the subscriber values, while the average values may, in some circumstances, correspond most closely to the household values.

Figure 4:
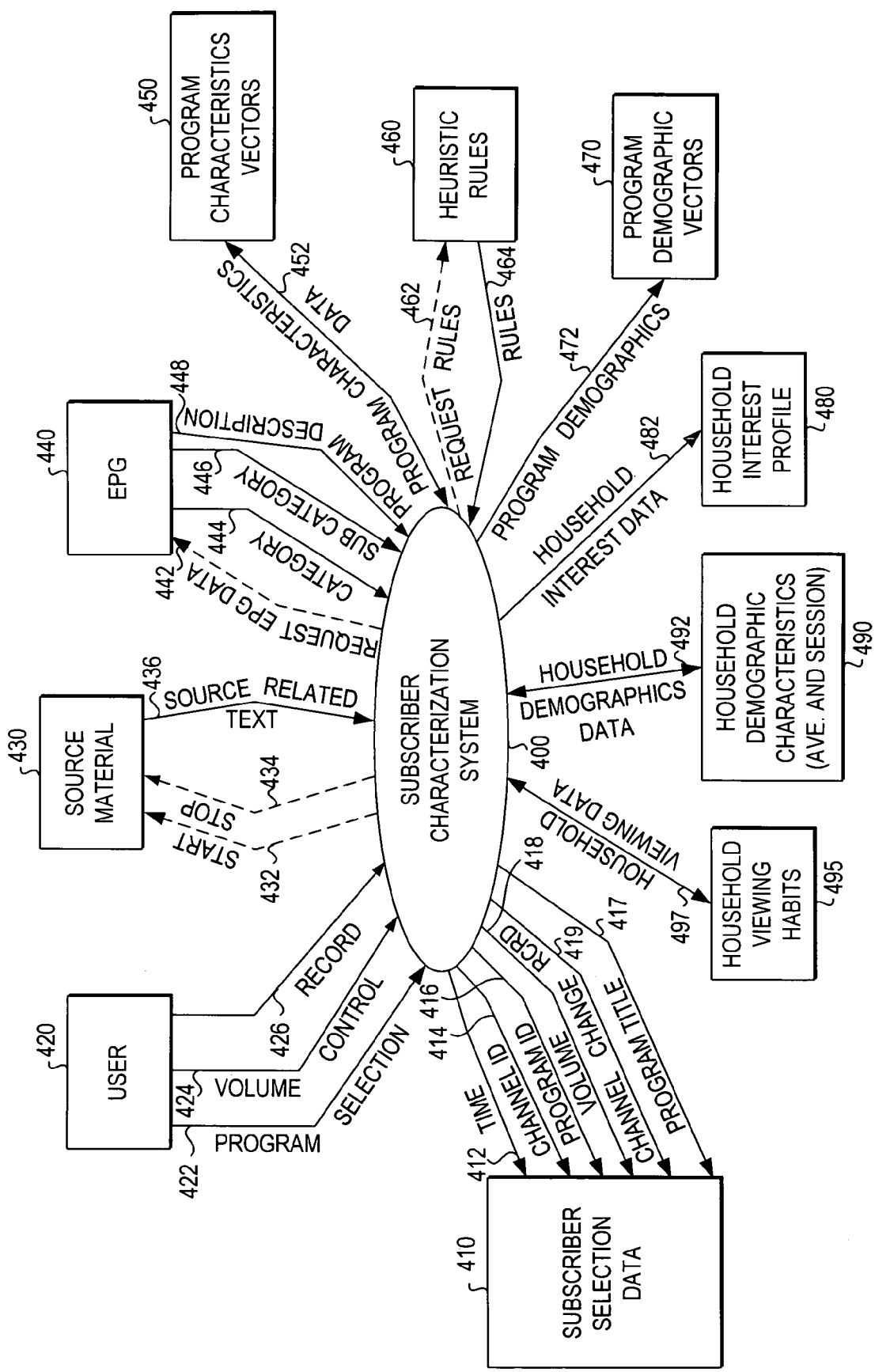
FIG. 4 illustrates a context diagram for a subscriber characterization system.

FIG. 4 depicts the context diagram of a preferred embodiment of a Subscriber Characterization System (SCS) 400. A context diagram, in combination with entity-relationship diagrams, provide a basis from which one skilled in the art can realize the present invention. The present invention can be realized in a number of programming languages including C, C++, Perl, and Java, although the scope of the invention is not limited by the choice of a particular programming language or tool. Object oriented languages have several advantages in terms of construction of the software used to realize the present invention, although the present invention can be realized in procedural or other types of programming languages known to those skilled in the art.

In generating a subscriber profile, the SCS 400 receives from a user 420 commands in the form of a volume control signal 424 or program selection data 422 which can be in the form of a channel change but may also be an address request which requests the delivery of programming from a network address. A record signal 426 indicates that the programming or the address of the programming is being recorded by the user. The record signal 426 can also be a printing command, a tape recording command, a bookmark command or any other command intended to store the program being viewed, or program address, for later use.

The material being viewed by the user 420 is referred to as source material 430. The source material 430, as defined herein, is the content that a subscriber selects and may consist of analog video, Motion Picture Expert Group (MPEG) digital video source material, other digital or analog material, Hypertext Markup Language (HTML) or other type of multimedia source material. The subscriber characterization system 400 can access the source material 430 received by the user 420 using a start signal 432 and a stop signal 434, which control the transfer of source related text 436 which can be analyzed as described herein.

In a preferred embodiment, the source related text 436 can be extracted from the source material 430 and stored in memory. The source related text 436, as defined herein, includes source related textual information including descriptive fields that are related to the source material 430, or text that is part of the source material 430 itself The source related text 436 can be derived from a number of sources including but not limited to closed captioning information, Electronic Program Guide (EPG) material, and text information in the source itself (e.g. text in HTML files).

Electronic Program Guide (EPG) 440 contains information related to the source material 430 that is useful to the user 420. The EPG 440 is typically a navigational tool that contains source related information including but not limited to the programming category, program description, rating, actors, and duration. The structure and content of EPG data is described in detail in U.S. Pat. No. 5,596,373 assigned to Sony Corporation and Sony Electronics that is herein incorporated by reference. As shown in FIG. 4, the EPG 440 can be accessed by the SCS 400 by a request EPG data signal 442 that results in the return of a category 444, a sub-category 446, and a program description 448.

In one embodiment of the present invention, EPG data is accessed and program information such as the category 444, the sub-category 446, and the program description 448 are stored in memory.

In another embodiment of the present invention, the source related text 436 is the closed captioning text embedded in the analog or digital video signal. Such closed captioning text can be stored in memory for processing to extract the program characteristic vectors 450.

One of the functions of the SCS 400 is to generate the program characteristics vectors 450 which are comprised of program characteristics data 452, as illustrated in FIG. 4. The program characteristics data 452, which can be used to create the program characteristics vectors 450 both in vector and table form, are examples of source related information that represent characteristics of the source material. In a preferred embodiment, the program characteristics vectors 450 are lists of values that characterize the programming (source) material in according to the category 444, the sub-category 446, and the program description 448. The present invention may also be applied to advertisements, in which case program characteristics vectors contain, as an example, a product category, a product sub-category, and a brand name.

As illustrated in FIG. 4, the SCS 400 uses heuristic rules 460. The heuristic rules 460, as described herein, are composed of both logical heuristic rules as well as heuristic rules expressed in terms of conditional probabilities. The heuristic rules 460 can be accessed by the SCS 400 via a request rules signal 462 that results in the transfer of a copy of rules 464 to the SCS 400.

The SCS 400 forms program demographic vectors 470 from program demographics 472, as illustrated in FIG. 4. The program demographic vectors 470 also represent characteristics of source related information in the form of the intended or expected demographics of the audience for which the source material is intended.

Subscriber selection data 410 is obtained from the monitored activities of the user and in a preferred embodiment can be stored in a dedicated memory. In an alternate embodiment, the subscriber selection data 410 is stored in a storage disk. Information that is utilized to form the subscriber selection data 410 includes time 412, which corresponds to the time of an event, channel ID 414, program ID 416, volume level 418, channel change record 419, and program title 417. A detailed record of selection data is illustrated in FIG. 8.

In a preferred embodiment, a household viewing habits 495 illustrated in FIG. 4 is computed from the subscriber selection data 410. The SCS 400 transfers household viewing data 497 to form household viewing habits 495. The household viewing data 497 is derived from the subscriber selection data 410 by looking at viewing habits at a particular time of day over an extended period of time, usually several days or weeks, and making some generalizations regarding the viewing habits during that time period.

The program characteristics vector 450 is derived from the source related text 436 and/or from the EPG 440 by applying information retrieval techniques. The details of this process are discussed in accordance with FIG. 10.

The program characteristics vector 450 is used in combination with a set of the heuristic rules 460 to define a set of the program demographic vectors 470 illustrated in FIG. 4 describing the audience the program is intended for.

One output of the SCS 400 is a household profile including household demographic characteristics 490 and a household interest profile 480. The household demographic characteristics 490 resulting from the transfer of household demographic data 492, and the household interest profile 480, resulting from the transfer of household interests data 482. Both the household demographics characteristics 490 and the household interest profile 480 have a session value and an average value, as will be discussed herein.

Figure 5:
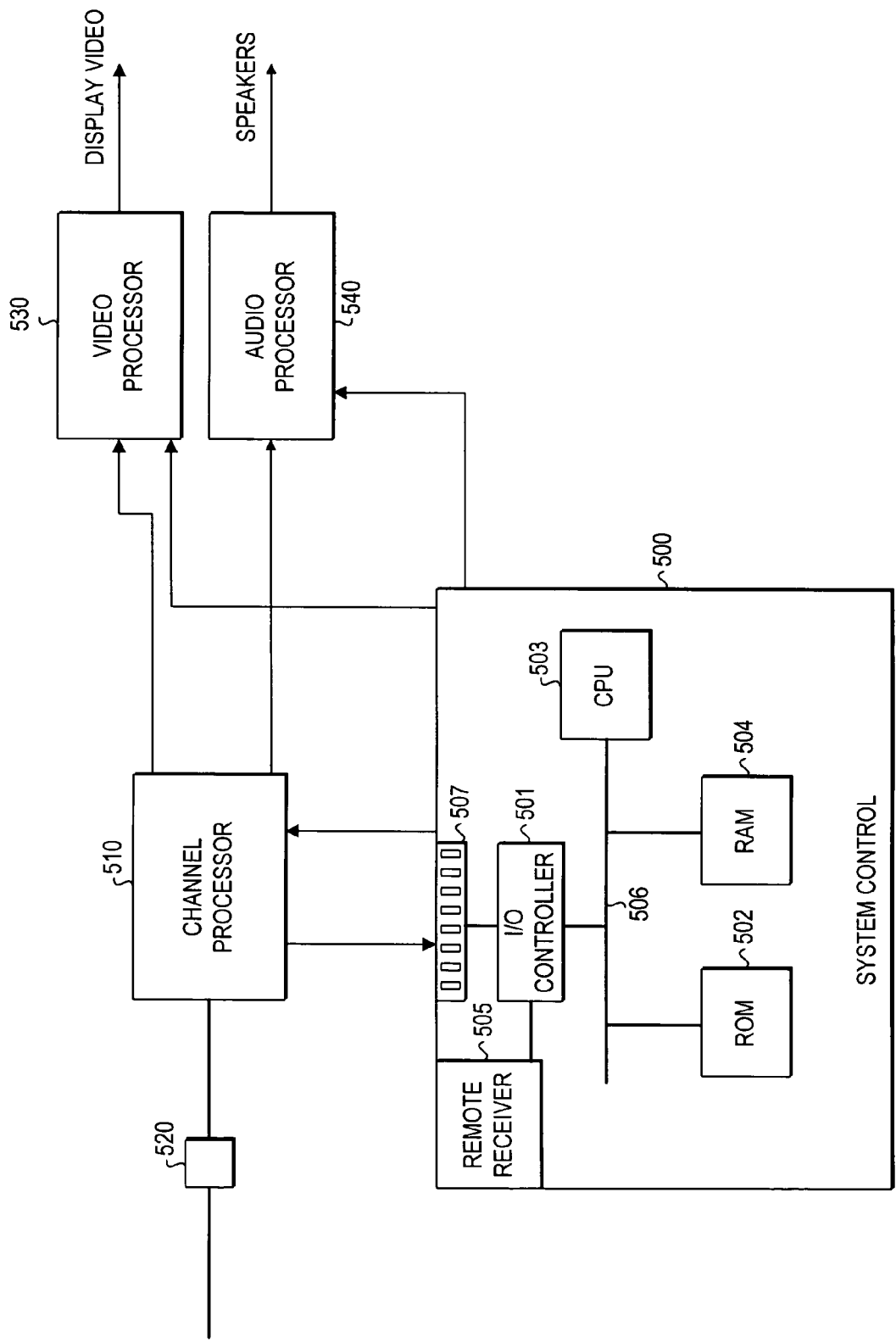
FIG. 5 illustrates a block diagram for a realization of a subscriber monitoring system for receiving video signals.

The monitoring system depicted in FIG. 5 is responsible for monitoring the subscriber activities, and can be used to realize the SCS 400. In a preferred embodiment, the monitoring system of FIG. 5 is located in a television set-top device or in the television itself. In an alternate embodiment, the monitoring system is part of a computer that receives programming from a network.

In an application of the system for television services, an input connector 520 accepts the video signal coming either from an antenna, cable television input, or other network. The video signal can be analog or Digital MPEG. Alternatively, the video source may be a video stream or other multimedia stream from a communications network including the Internet.

In the case of either analog or digital video, selected fields are defined to carry EPG data or closed captioning text. For analog video, the closed captioning text is embedded in the vertical blanking interval (VBI). As described in U.S. Pat. No. 5,579,005, assigned to Scientific-Atlanta, Inc., the EPG information can be carried in a dedicated channel or embedded in the VBI. For digital video, the closed captioning text is carried as video user bits in a user data field. The EPG data is transmitted as ancillary data and is multiplexed at the transport layer with the audio and video data.

Referring to FIG. 5, a system control unit 500 receives commands from the user 520, decodes the command and forwards the command to the destined module. In a preferred embodiment, the commands are entered via a remote control to a remote receiver 505 or a set of selection buttons 507 available at the front panel of the system control unit 500. In an alternate embodiment, the commands are entered by the user 420 via a keyboard.

The system control unit 500 also contains a Central Processing Unit (CPU) 503 for processing and supervising all of the operations of the system control unit 500, a Read Only Memory (ROM) 502 containing the software and fixed data, a Random Access Memory (RAM) 504 for storing data. CPU 503, RAM 504, ROM 502, and I/O controller 501 are attached to a master bus 506. A power supply in a form of battery can also be included in the system control unit 500 for backup in case of power outage.

An input/output (I/O) controller 501 interfaces the system control unit 500 with external devices. In a preferred embodiment, the I/O controller 501 interfaces to the remote receiver 505 and a selection button such as the channel change button on a remote control. In an alternate embodiment, it can accept input from a keyboard or a mouse.

The program selection data 422 is forwarded to a channel processor 510. The channel processor 510 tunes to a selected channel and the media stream is decomposed into its basic components: the video stream, the audio stream, and the data stream. The video stream is directed to a video processor module 530 where it is decoded and further processed for display to the TV screen. The audio stream is directed to an audio processor 540 for decoding and output to the speakers.

The data stream can be EPG data, closed captioning text, Extended Data Service (EDS) information, a combination of these, or an alternate type of data. In the case of EDS the call sign, program name and other useful data are provided. In a preferred embodiment, the data stream is stored in a reserved location of the RAM 504. In an alternate embodiment, a magnetic disk is used for data storage. The system control unit 500 writes also in a dedicated memory, which in a preferred embodiment is the RAM 504, the selected channel, the time 412 of selection, the volume level 418 and the program ID 416 and the program title 417. Upon receiving the program selection data 422, the new selected channel is directed to the channel processor 510 and the system control unit 500 writes to the dedicated memory the channel selection end time and the program title 417 at the time 412 of channel change. The system control unit 500 keeps track of the number of channel changes occurring during the viewing time via the channel change record 419. This data forms part of the subscriber selection data 410.

The volume control signal 424 is sent to the audio processor 540. In a preferred embodiment, the volume level 418 selected by the user 420 corresponds to the listening volume. In an alternate embodiment, the volume level 418 selected by the user 420 represents a volume level to another piece of equipment such as an audio system (home theatre system) or to the television itself. In such a case, the volume can be measured directly by a microphone or other audio sensing device that can monitor the volume at which the selected source material is being listened.

A program change occurring while watching a selected channel is also logged by the system control unit 500. Monitoring the content of the program at the time of the program change can be done by reading the content of the EDS. The EDS contains information such as program title, which is transmitted via the VBI. A change on the program title field is detected by the monitoring system and logged as an event. In an alternate embodiment, an EPG is present and program information can be extracted from the EPG. In a preferred embodiment, the programming data received from the EDS or EPG permits distinguishing between entertainment programming and advertisements.

Figure 6:
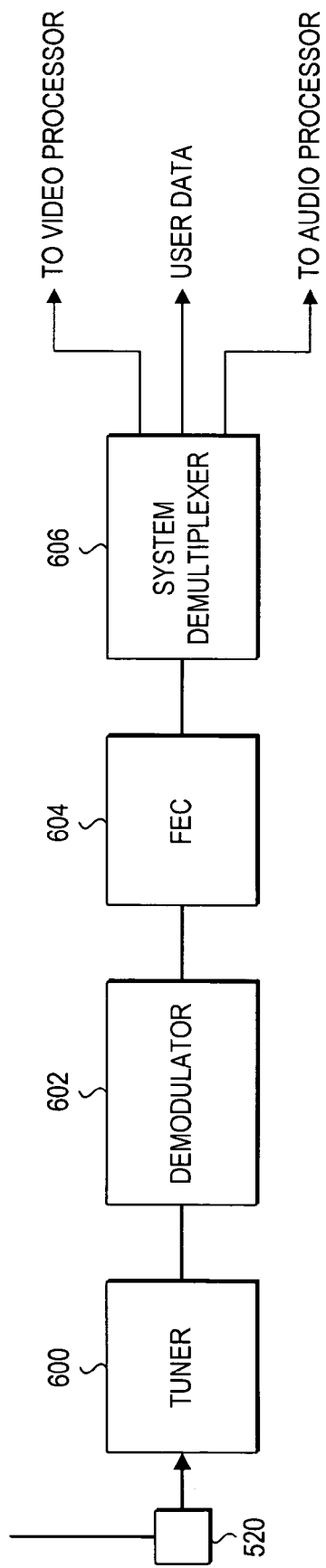
FIG. 6 illustrates a block diagram of a channel processor.

FIG. 6 illustrates the block diagram of the channel processor 510. In a preferred embodiment, the input connector 520 connects to a tuner 600 that tunes to the selected channel. A local oscillator can be used to heterodyne the signal to the IF signal. A demodulator 602 demodulates the received signal and the output is fed to an FEC decoder 604. The data stream received from the FEC decoder 604 is, in a preferred embodiment, in an MPEG format. In a preferred embodiment, system demultiplexer 606 separates out video and audio information for subsequent decompression and processing, as well as ancillary data which can contain program related information.

The data stream presented to the system demultiplexer 606 consists of packets of data including video, audio and ancillary data. The system demultiplexer 606 identifies each packet from the stream ID and directs the stream to the corresponding processor. The video data is directed to the video processor module 530 and the audio data is directed to the audio processor 540. The ancillary data can contain closed captioning text, emergency messages, program guide, or other useful information.

Closed captioning text is considered to be ancillary data and is thus contained in the video stream. The system demultiplexer 606 accesses the user data field of the video stream to extract the closed captioning text. The program guide, if present, is carried on data stream identified by a specific transport program identifier.

In an alternate embodiment, analog video can be used. For analog programming, ancillary data such as closed captioning text or EDS data are carried in a vertical blanking interval.

Figure 7:
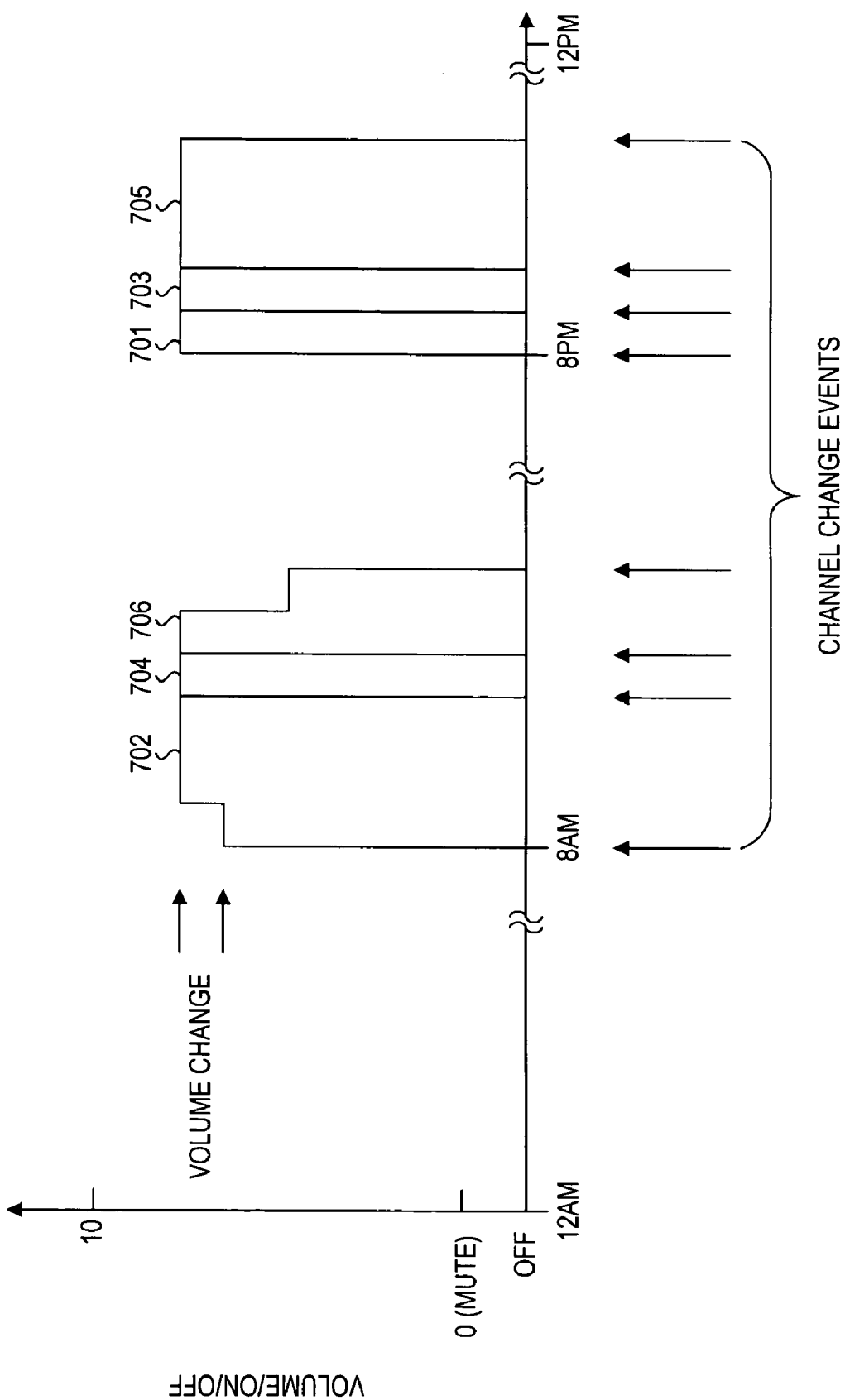
FIG. 7 illustrates a channel sequence and volume over a twenty-four (24) hour period.

FIG. 7 illustrates a channel sequence and volume over a twenty-four (24) hour period. The Y-axis represents the status of the receiver in terms of on/off status and volume level. The X-axis represents the time of day. The channels viewed are represented by the windows 701-706, with a first channel 702 being watched followed by the viewing of a second channel 704, and a third channel 706 in the morning. In the evening a fourth channel 701 is watched, a fifth channel 703, and a sixth channel 705. A channel change is illustrated by a momentary transition to the "off" status and a volume change is represented by a change of level on the Y-axis.

A detailed record of the subscriber selection data 410 is illustrated in FIG. 8 in a table format. A time column 802 contains the starting time of every event occurring during the viewing time. A Channel ID column 804 lists the channels viewed or visited during that period. A program title column 803 contains the titles of all programs viewed. A volume column 801 contains the volume level 418 at the time 412 of viewing a selected channel.

A representative statistical record corresponding to the household viewing habits 495 is illustrated in FIG. 9. In a preferred embodiment, a time of day column 900 is organized in period of time including morning, mid-day, afternoon, night, and late night. In an alternate embodiment, smaller time periods are used. A minutes watched column 902 lists, for each period of time, the time in minutes in which the SCS 400 recorded delivery of programming. The number of channel changes during that period and the average volume are also included in that table in a channel changes column 904 and an average volume column 906 respectively. The last row of the statistical record contains the totals for the items listed in the minutes watched column 902, the channel changes column 904 and the average volume 906.

Figure 10A:
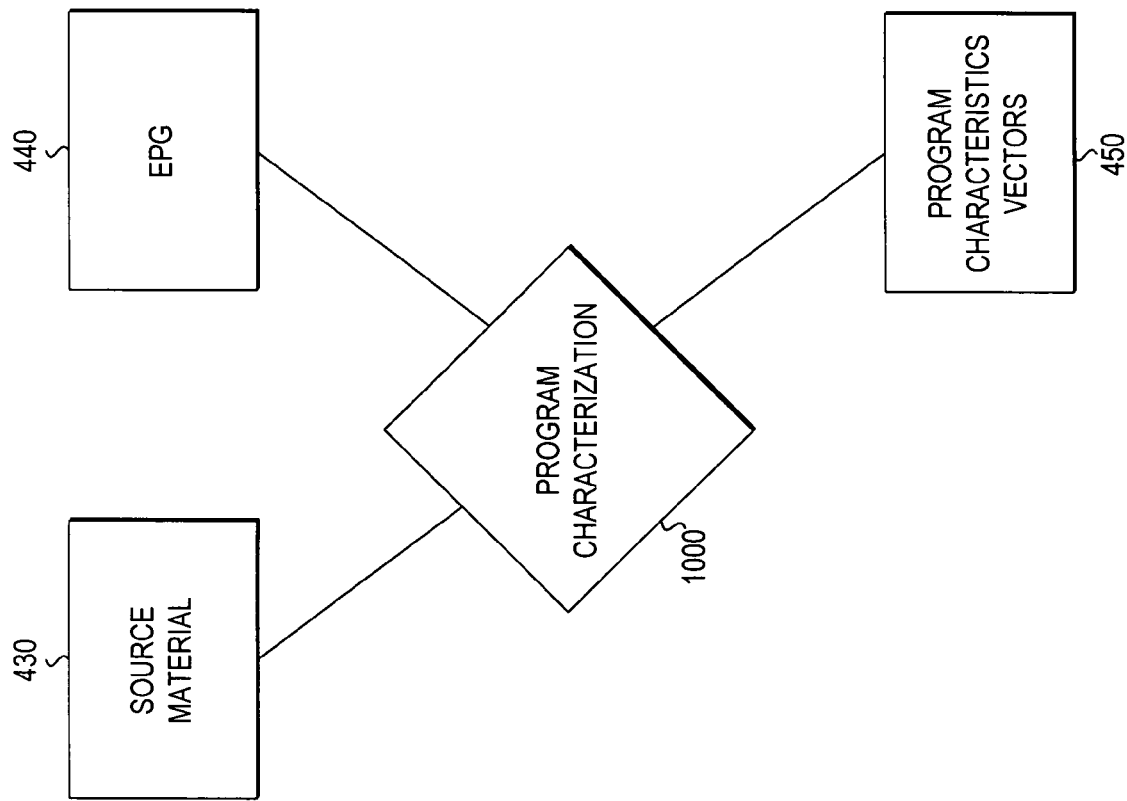
FIG. 10A illustrates an entity-relationship diagram for the generation of program characteristics vectors.

FIG. 10A illustrates an entity-relationship diagram for the generation of the program characteristics vector 450. The context vector generation and retrieval technique described in U.S. Pat. No. 5,619,709, which is incorporated herein by reference, can be applied for the generation of the program characteristics vectors 450. Other techniques are well known by those skilled in the art.

Referring to FIG. 10A, the source material 430 or the EPG 440 is passed through a program characterization process 1000 to generate the program characteristics vectors 450. The program characterization process 1000 is described in accordance with FIG. 10B. Program content descriptors including a first program content descriptor 1002, a second program content descriptor 1004 and an nth program content descriptor 1006, each classified in terms of the category 444, the sub-category 446, and other divisions as identified in the industry accepted program classification system, are presented to a context vector generator 1020. As an example, the program content descriptor can be text representative of the expected content of material found in the particular program category 444. In this example, the program content descriptors 1002, 1004 and 1006 would contain text representative of what would be found in programs in the news, fiction, and advertising categories respectively. The context vector generator 1020 generates context vectors for that set of sample texts resulting in a first summary context vector 1008, a second summary context vector 1010, and an nth summary context vector 1012. In the example given, the summary context vectors 1008, 1010, and 1012 correspond to the categories of news, fiction and advertising respectively. The summary vectors are stored in a local data storage system.

Figure 10B:
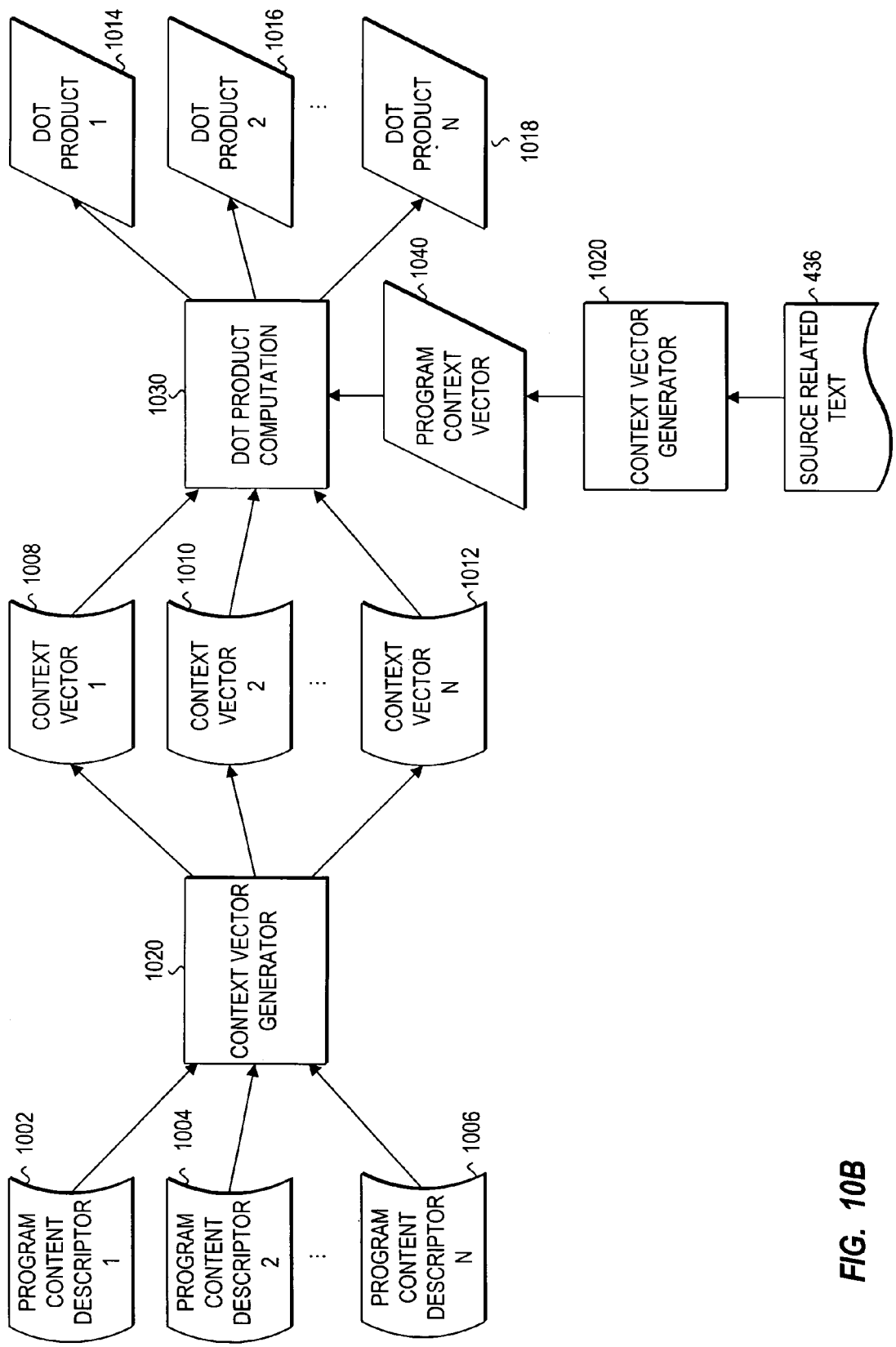
FIG. 10B illustrates a flowchart for program characterization.

Referring to FIG. 10B, a sample of the source related text 436 that is associated with the new program to be classified is passed to the context vector generator 1020 that generates a program context vector 1040 for that program. The source related text 436 can be either the source material 430, the EPG 440, or other text associated with the source material. A comparison is made between the actual program context vectors and the stored program content context vectors by computing, in a dot product computation process 1030, the dot product of the first summary context vector 1008 with the program context vector 1040 to produce a first dot product 1014. Similar operations are performed to produce second dot product 1016 and nth dot product 1018.

The values contained in the dot products 1014, 1016 and 1018, while not probabilistic in nature, can be expressed in probabilistic terms using a simple transformation in which the result represents a confidence level of assigning the corresponding content to that program. The transformed values add up to one. The dot products can be used to classify a program, or form a weighted sum of classifications that results in the program characteristics vectors 450. In the example given, if the source related text 436 was from an advertisement, the nth dot product 1018 would have a high value, indicating that the advertising category was the most appropriate category, and assigning a high probability value to that category. If the dot products corresponding to the other categories were significantly higher than zero, those categories would be assigned a value, with the result being the program characteristics vectors 450 as shown in FIG. 11D.

For the sub-categories, probabilities obtained from the content pertaining to the same sub-category 446 are summed to form the probability for the new program being in that sub-category 446. At the sub-category level, the same method is applied to compute the probability of a program being from the given category 444. The three levels of the program classification system; the category 444, the sub-category 446 and the content, are used by the program characterization process 1000 to form the program characteristics vectors 450 which are depicted in FIGS. 11D-11F.

Figure 11A:
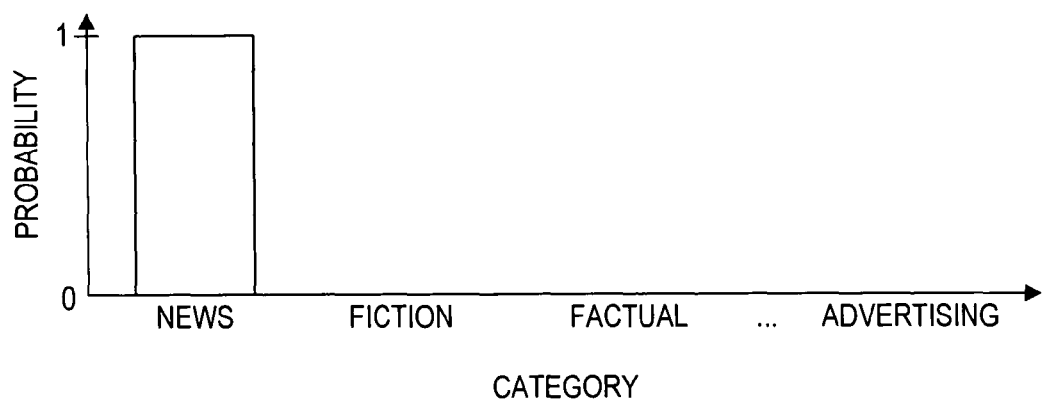
FIG. 11A illustrates a deterministic program category vector.
Figure 11B:
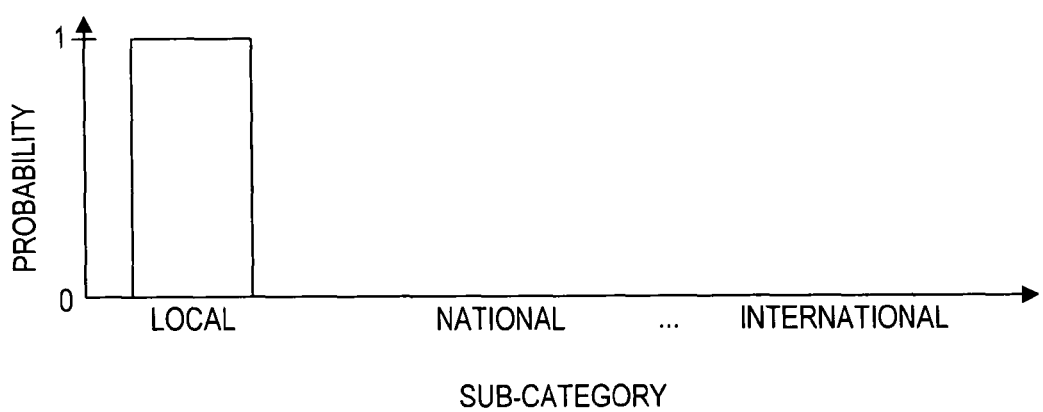
FIG. 11B illustrates a deterministic program sub-category vector.
Figure 11C:
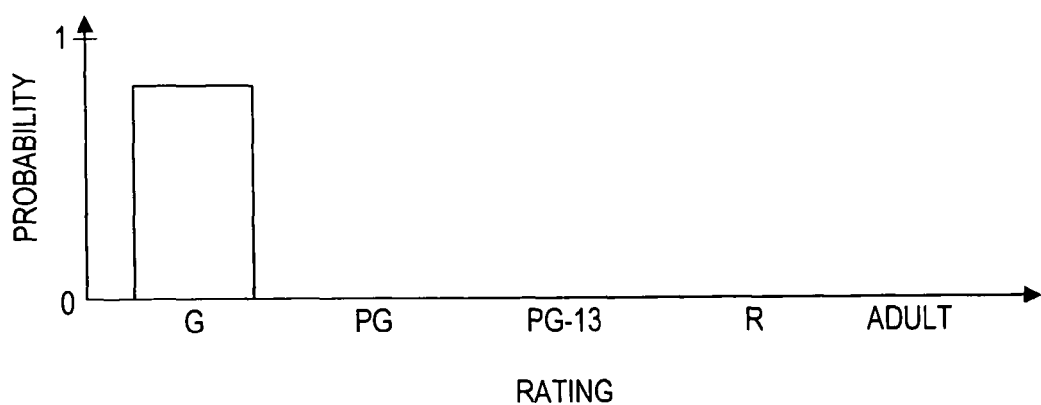
FIG. 11C illustrates a deterministic program rating vector.
Figure 11D:
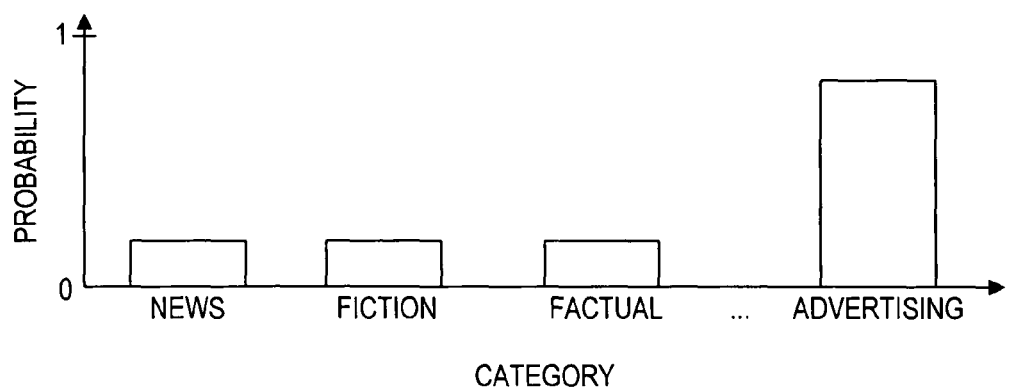
FIG. 11D illustrates a probabilistic program category vector.
Figure 11E:
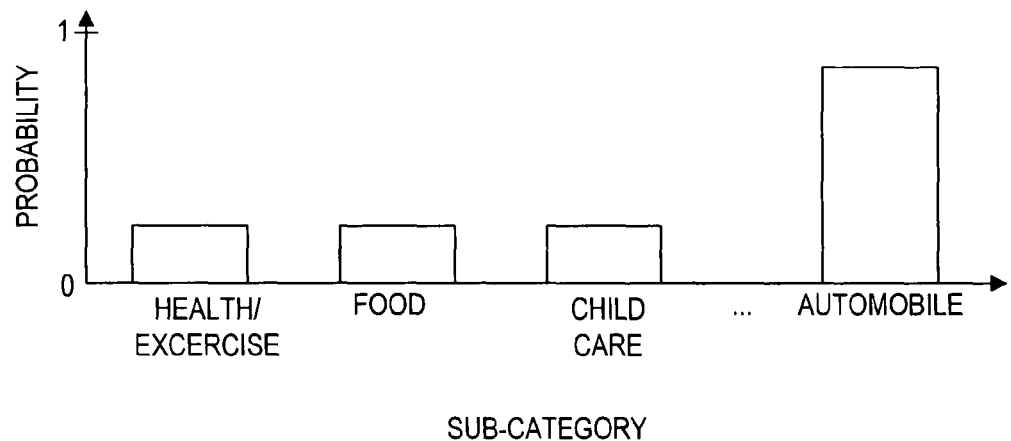
FIG. 11E illustrates a probabilistic program sub-category vector.
Figure 11F:
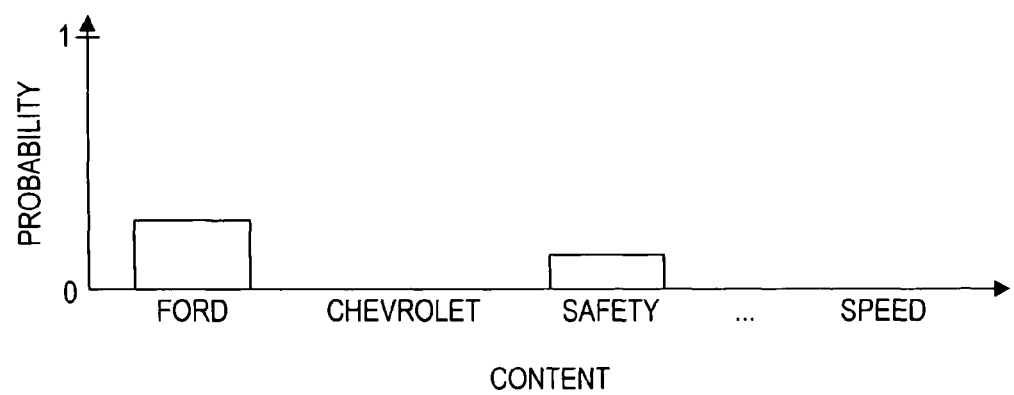
FIG. 11F illustrates a probabilistic program content vector.

The program characteristics vectors 450 in general are represented in FIGS. 11A-F. FIGS. 11A-C are an example of deterministic program vectors. This set of vectors is generated when the program characteristics are well defined, as can occur when the source related text 436 or the EPG 440 contains specific fields identifying the category 444 and the sub-category 446. A program rating can also provided by the EPG 440.

In the case that these characteristics are not specified, a statistical set of vectors is generated from the process described in accordance with FIG. 10. FIG. 11D shows the probability that a program being watched is from the given category 444. The categories are listed in the X-axis. The sub-category 446 is also expressed in terms of probability. This is shown in FIG. 11E. The content component of this set of vectors is a third possible level of the program classification, and is illustrated in FIG. 11F.

Figure 12A:
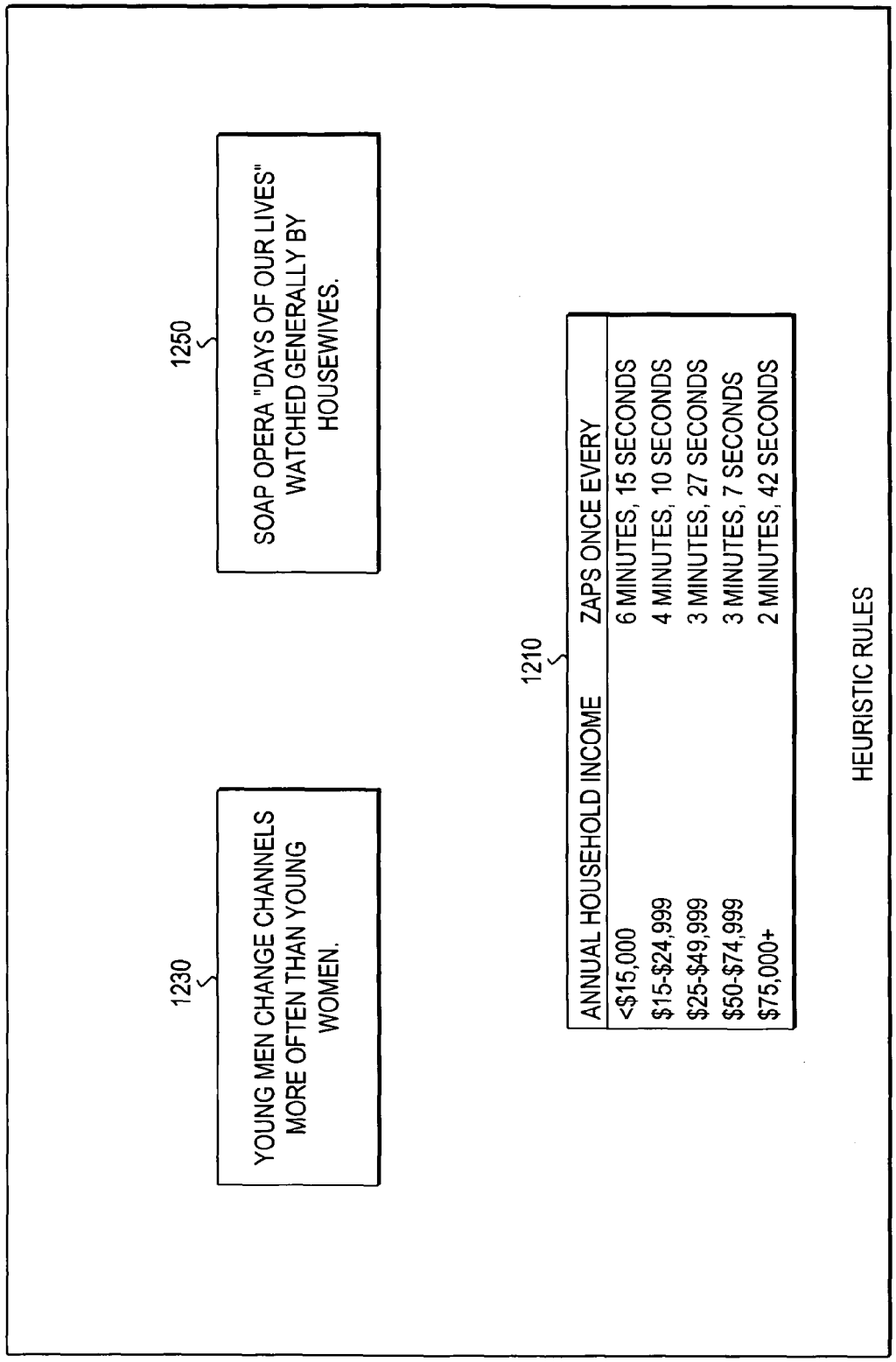
FIG. 12A illustrates a set of logical heuristic rules.

FIG. 12A illustrates sets of logical heuristics rules that form part of the heuristic rules 460. In a preferred embodiment, logical heuristic rules are obtained from sociological or psychological studies. Two types of rules are illustrated in FIG. 12A. The first type links an individual's viewing characteristics to demographic characteristics such as gender, age, and income level. A channel changing rate rule 1230 attempts to determine gender based on channel change rate. An income related channel change rate rule 1210 attempts to link channel change rates to income brackets. A second type of rules links particular programs to particular audience, as illustrated by a gender determining rule 1250 which links the program category 444/sub-category 446 with a gender. The result of the application of the logical heuristic rules illustrated in FIG. 12A are probabilistic determinations of factors including gender, age, and income level. Although a specific set of logical heuristic rules has been used as an example, a wide number of types of logical heuristic rules can be used to realize the present invention. In addition, these rules can be changed based on learning within the system or based on external studies that provide more accurate rules.

FIG. 12B illustrates a set of the heuristic rules 460 expressed in terms of conditional probabilities. In the example shown in FIG. 12B, the category 444 has associated with it conditional probabilities for demographic factors such as age, income, family size and gender composition. The category 444 has associated with it conditional probabilities that represent probability that the viewing group is within a certain age group dependent on the probability that they are viewing a program in that category 444.

Figure 13:
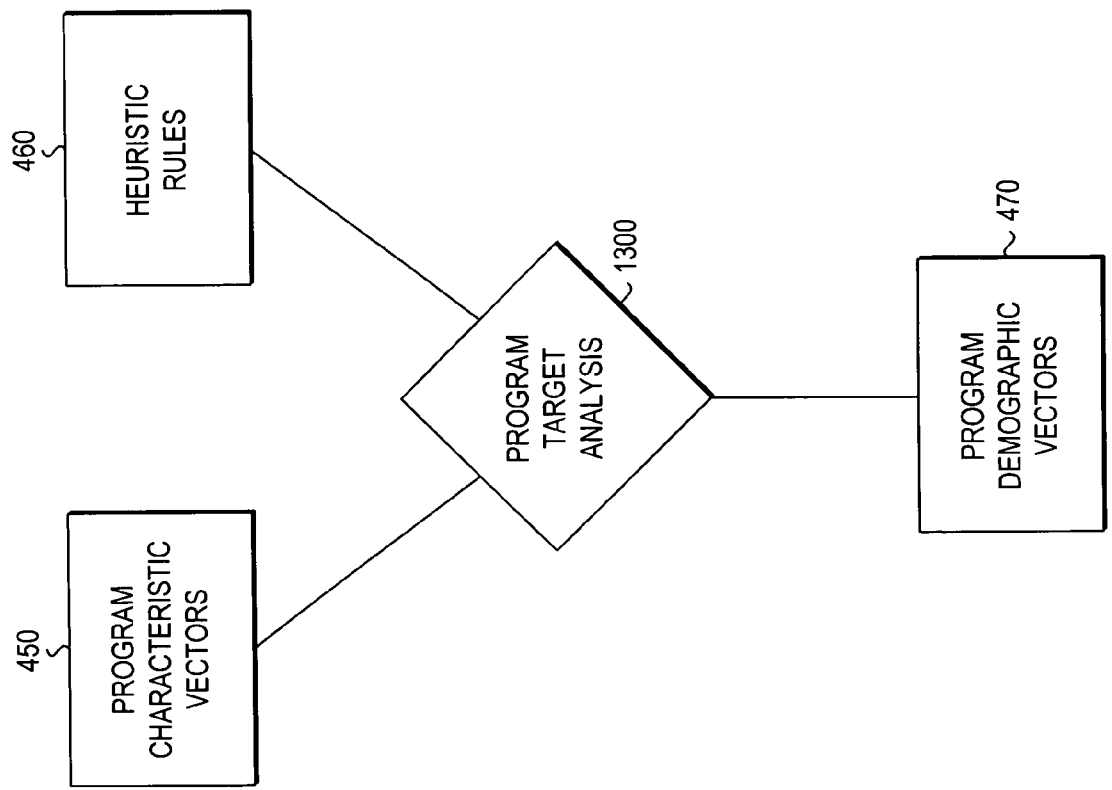
FIG. 13 illustrates an entity-relationship diagram for the generation of program demographic vectors.

FIG. 13 illustrates an entity-relationship diagram for the generation of the program demographic vectors 470. In a preferred embodiment, the heuristic rules 460 are applied along with the program characteristic vectors 450 in a program target analysis process 1300 to form the program demographic vectors 470. The program characteristic vectors 450 indicate a particular aspect of a program, such as its violence level. The heuristic rules 460 indicate that a particular demographic group has a preference for that program. As an example, it may be the case that young males have a higher preference for violent programs than other sectors of the population. Thus, a program which has the program characteristic vectors 450 indicating a high probability of having violent content, when combined with the heuristic rules 460 indicating that "young males like violent programs", will result, through the program target analysis process 1300, in the program demographic vectors 470 which indicate that there is a high probability that the program is being watched by a young male.

Figure 14:
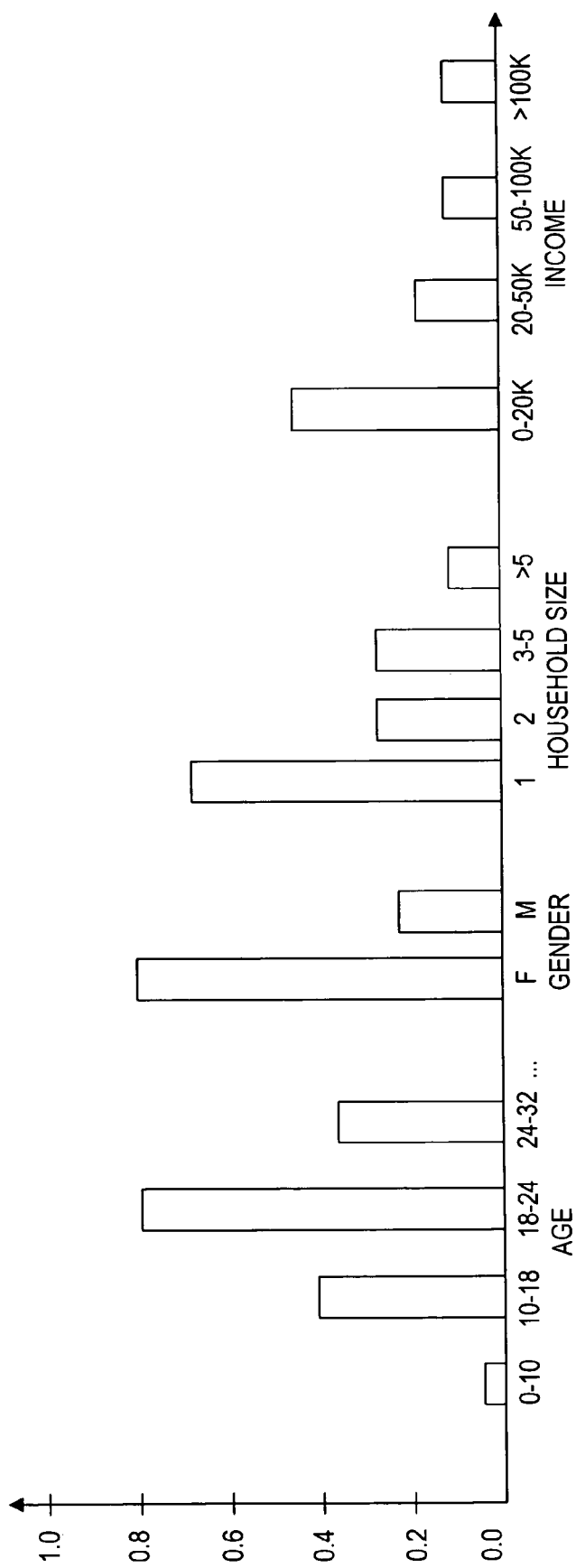
FIG. 14 illustrates a program demographic vector.

The program target analysis process 1300 can be realized using software programmed in a variety of languages which processes mathematically the heuristic rules 460 to derive the program demographic vectors 470. The table representation of the heuristic rules 460 illustrated in FIG. 12B expresses the probability that the individual or household is from a specific demographic group based on a program with a particular category 444. This can be expressed, using probability terms as follow "the probability that the individuals are in a given demographic group conditional to the program being in a given category". Referring to FIG. 14, the probability that the group has certain demographic characteristics based on the program being in a specific category is illustrated.

Expressing the probability that a program is destined to a specific demographic group can be determined by applying Bayes rule. This probability is the sum of the conditional probabilities that the demographic group likes the program, conditional to the category 444 weighted by the probability that the program is from that category 444. In a preferred embodiment, the program target analysis can calculate the program demographic vectors by application of logical heuristic rules, as illustrated in FIG. 12A, and by application of heuristic rules expressed as conditional probabilities as shown in FIG. 12B. Logical heuristic rules can be applied using logical programming and fuzzy logic using techniques well understood by those skilled in the art, and are discussed in the text by S. V. Kartalopoulos entitled "Understanding Neural Networks and Fuzzy Logic" which is incorporated herein by reference.

Conditional probabilities can be applied by simple mathematical operations multiplying program context vectors by matrices of conditional probabilities. By performing this process over all the demographic groups, the program target analysis process 1300 can measure how likely a program is to be of interest to each demographic group. Those probabilities values form the program demographic vector 470 represented in FIG. 14.

As an example, the heuristic rules expressed as conditional probabilities shown in FIG. 12B are used as part of a matrix multiplication in which the program characteristics vector 450 of dimension N, such as those shown in FIGS. 11A-11F is multiplied by an N×M matrix of heuristic rules expressed as conditional probabilities, such as that shown in FIG. 12B. The resulting vector of dimension M is a weighted average of the conditional probabilities for each category and represents the household demographic characteristics 490. Similar processing can be performed at the sub-category and content levels.

FIG. 14 illustrates an example of the program demographic vector 470, and shows the extent to which a particular program is destined to a particular audience. This is measured in terms of probability as depicted in FIG. 14. The Y-axis is the probability of appealing to the demographic group identified on the X-axis.

Figure 15:
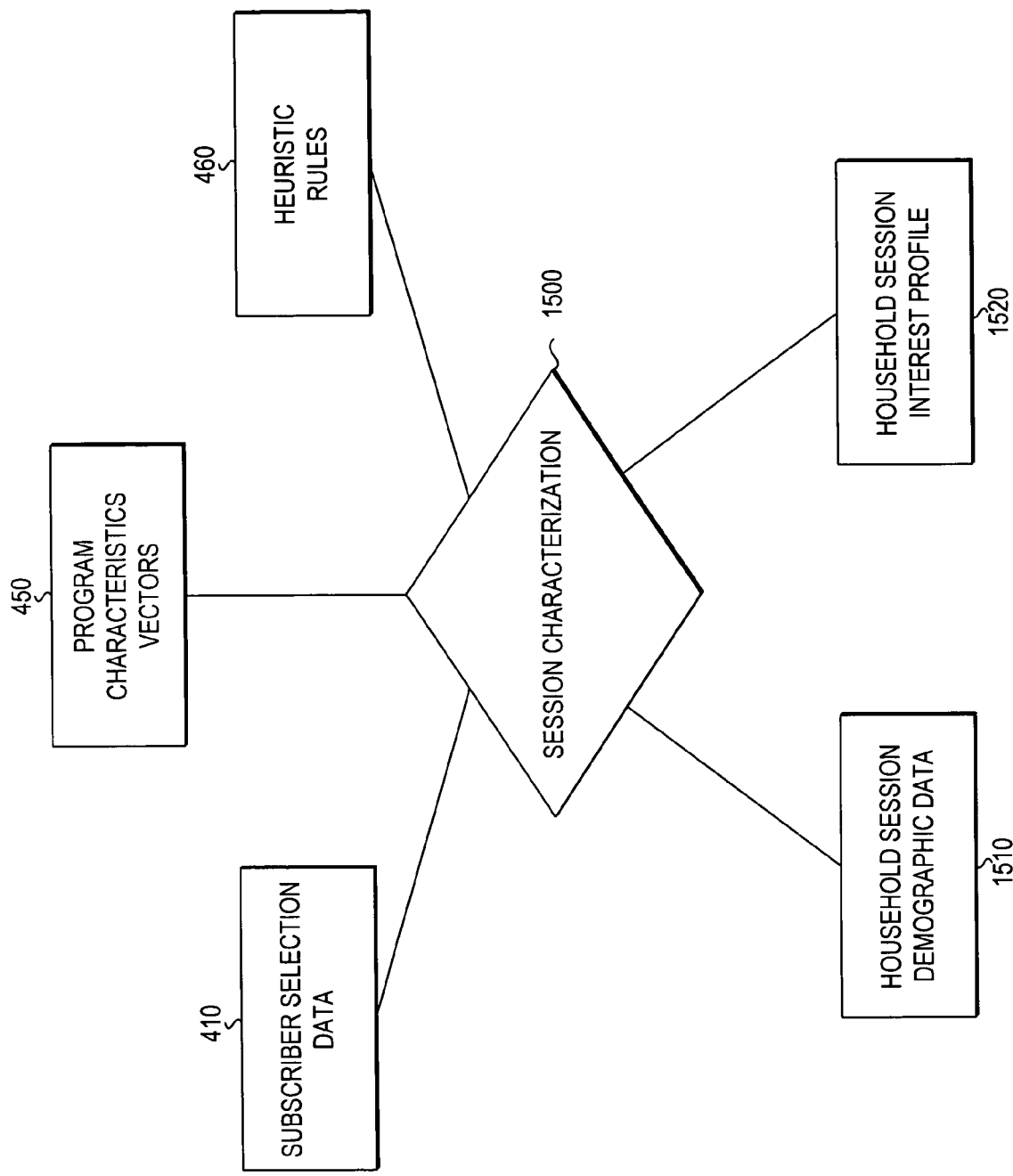
FIG. 15 illustrates an entity-relationship diagram for the generation of household session demographic data and household session interest profiles.

FIG. 15 illustrates an entity-relationship diagram for the generation of household session demographic data 1510 and household session interest profile 1520. In a preferred embodiment, the subscriber selection data 410 is used along with the program characteristics vectors 450 in a session characterization process 1500 to generate the household session interest profile 1520. The subscriber selection data 410 indicates what the subscriber is watching, for how long and at what volume they are watching the program.

In a preferred embodiment, the session characterization process 1500 forms a weighted average of the program characteristics vectors 450 in which the time duration the program is watched is normalized to the session time (typically defined as the time from which the unit was turned on to the present). The program characteristics vectors 450 are multiplied by the normalized time duration (which is less than one unless only one program has been viewed) and summed with the previous value. Time duration data, along with other subscriber viewing information, is available from the subscriber selection data 410. The resulting weighted average of program characteristics vectors forms the household session interest profile 1520, with each program contributing to the household session interest profile 1520 according to how long it was watched. The household session interest profile 1520 is normalized to produce probabilistic values of the household programming interests during that session.

In an alternate embodiment, the heuristic rules 460 are applied to both the subscriber selection data 410 and the program characteristics vectors 450 to generate the household session demographic data 1510 and the household session interest profile 1520. In this embodiment, weighted averages of the program characteristics vectors 450 are formed based on the subscriber selection data 410, and the heuristic rules 460 are applied. In the case of logical heuristic rules as shown in FIG. 12A, logical programming can be applied to make determinations regarding the household session demographic data 1510 and the household session interest profile 1520. In the case of heuristic rules in the form of conditional probabilities such as those illustrated in FIG. 12B, a dot product of the time averaged values of the program characteristics vectors can be taken with the appropriate matrix of heuristic rules to generate both the household session demographic data 1510 and the household session interest profile 1520.

Volume control measurements which form part of the subscriber selection data 410 can also be applied in the session characterization process 1500 to form a household session interest profile 1520. This can be accomplished by using normalized volume measurements in a weighted average manner similar to how time duration is used. Thus, muting a show results in a zero value for volume, and the program characteristics vector 450 for this show will not be averaged into the household session interest profile 1520.

Figure 16:
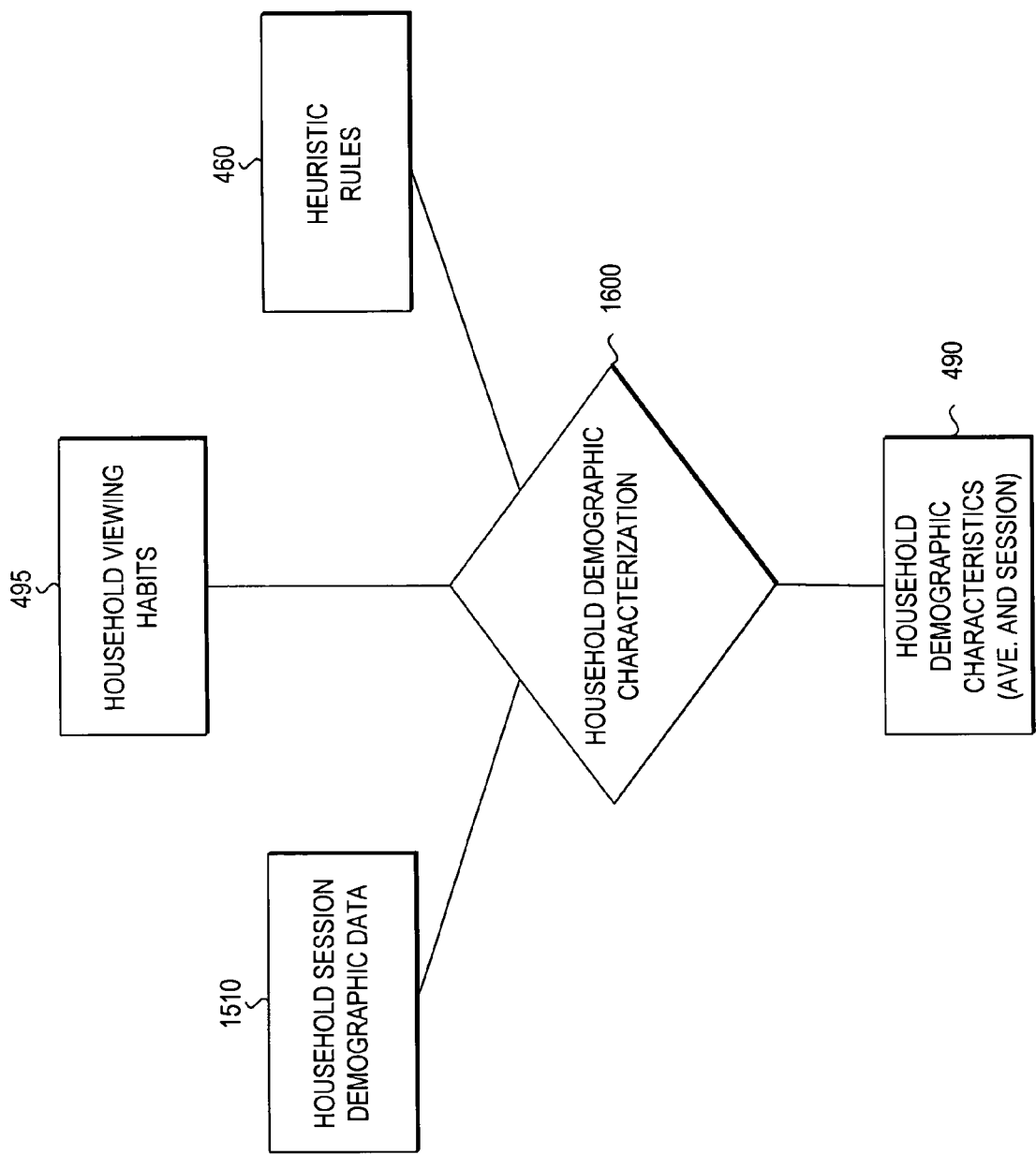
FIG. 16 illustrates an entity-relationship diagram for the generation of average and session household demographic characteristics.

FIG. 16 illustrates an entity-relationship diagram for the generation of average household demographic characteristics and session household demographic characteristics 490. A household demographic characterization process 1600 generates the household demographic characteristics 490 represented in table format in FIG. 17. The household demographic characterization process 1600 uses the household viewing habits 495 in combination with the heuristic rules 460 to determine demographic data. For example, a household with a number of minutes watched of zero during the day may indicate a household with two working adults. Both logical heuristic rules as well as rules based on conditional probabilities can be applied to the household viewing habits 495 to obtain the household demographics characteristics 490.

The household viewing habits 495 is also used by the system to detect out-of-habits events. For example, if a household with a zero value for the minutes watched column 902 at late night presents a session value at that time via the household session demographic data 1510, this session will be characterized as an out-of-habits event and the system can exclude such data from the average if it is highly probable that the demographics for that session are greatly different than the average demographics for the household. Nevertheless, the results of the application of the household demographic characterization process 1600 to the household session demographic data 1510 can result in valuable session demographic data, even if such data is not added to the average demographic characterization of the household.

FIG. 17 illustrates the average and session household demographic characteristics. A household demographic parameters column 1701 is followed by an average value column 1705, a session value column 1703, and an update column 1707. The average value column 1705 and the session value column 1703 are derived from the household demographic characterization process 1600. The deterministic parameters such as address and telephone numbers can be obtained from an outside source or can be loaded into the system by the subscriber or a network operator at the time of installation. Updating of deterministic values is prevented by indicating that these values should not be updated in the update column 1707.

Figure 18:
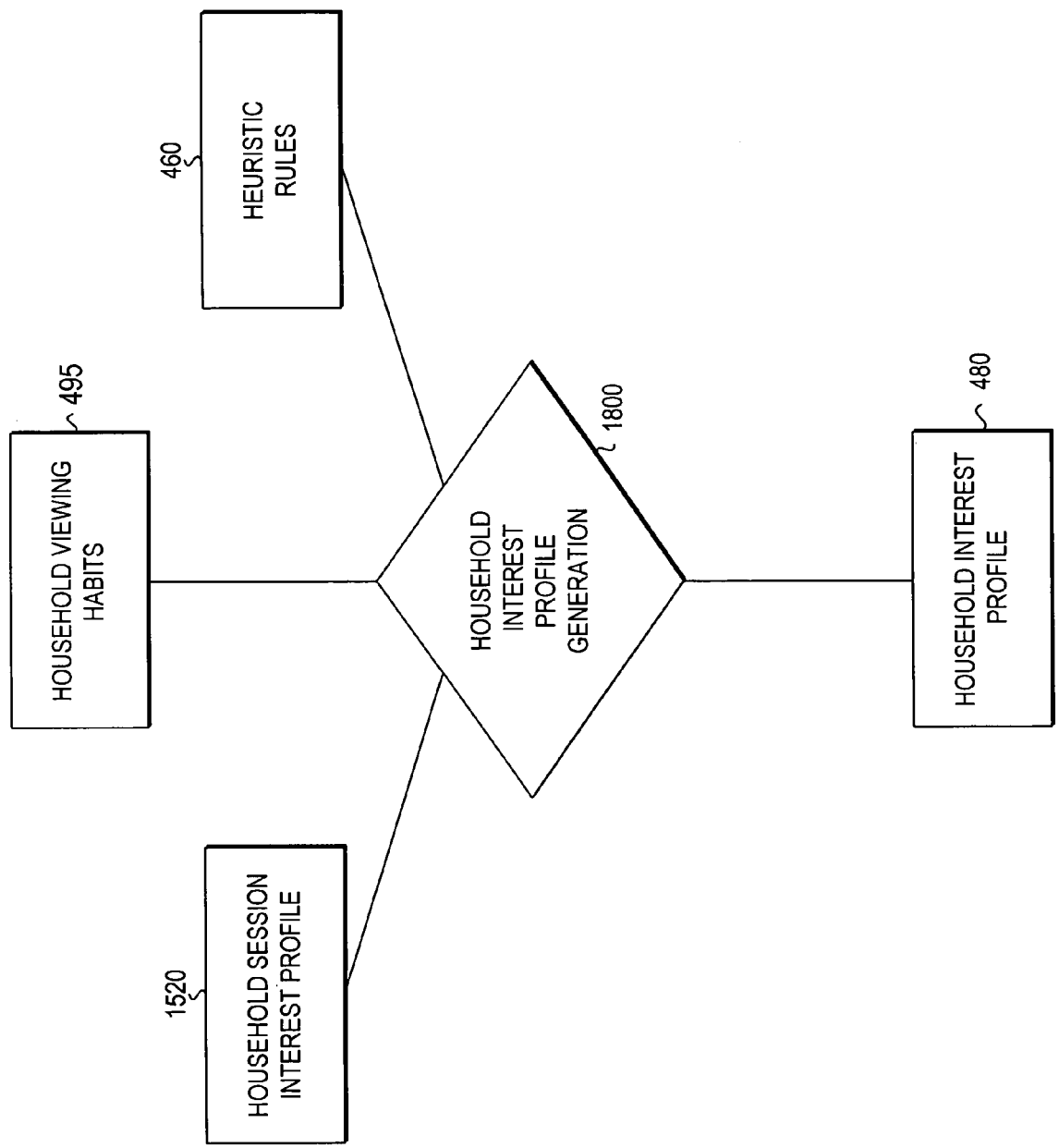
FIG. 18 illustrates an entity-relationship diagram for generation of a household interest profile.

FIG. 18 illustrates an entity-relationship diagram for the generation of the household interest profile 480 in a household interest profile generation process 1800. In a preferred embodiment, the household interest profile generation process comprises averaging the household session interest profile 1520 over multiple sessions and applying the household viewing habits 495 in combination with the heuristic rules 460 to form the household interest profile 480 which takes into account both the viewing preferences of the household as well as assumptions about households/subscribers with those viewing habits and program preferences.

FIG. 19 illustrates the household interest profile 480 that is composed of a programming types row 1909, a products types row 1907, and a household interests column 1901, an average value column 1903, and a session value column 1905.

The product types row 1907 gives an indication as to what type of advertisement the household would be interested in watching, thus indicating what types of products could potentially be advertised with a high probability of the advertisement being watched in its entirety. The programming types row 1909 suggests what kind of programming the household is likely to be interested in watching. The household interests column 1901 specifies the types of programming and products that are statistically characterized for that household.

As an example of the industrial applicability of the invention, a household will perform its normal viewing routine without being requested to answer specific questions regarding likes and dislikes. Children may watch television in the morning in the household, and may change channels during commercials, or not at all. The television may remain off during the working day, while the children are at school and day care, and be turned on again in the evening, at which time the parents may "surf" channels, mute the television during commercials, and ultimately watch one or two hours of broadcast programming. The present invention provides the ability to characterize the household, and may make the determination that there are children and adults in the household, with program and product interests indicated in the household interest profile 480 corresponding to a family of that composition. A household with two retired adults will have a completely different characterization that will be indicated in the household interest profile 480.

Figure 20A:
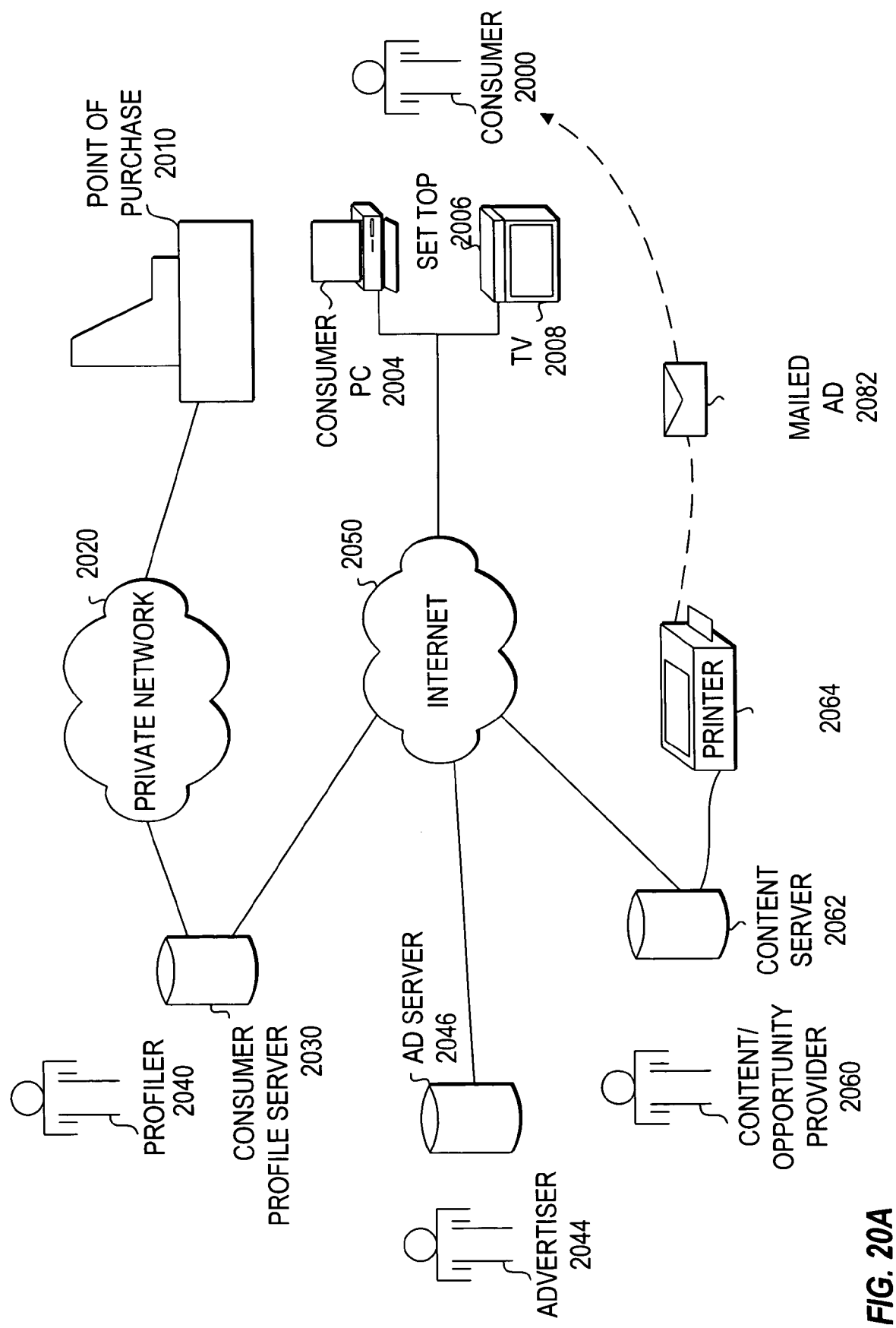
FIGS. 20A-B illustrate user relationship diagrams for the present invention.

As discussed above, an additional method of profiling includes profiling based on consumer purchases. FIG. 20A shows a user relationship diagram that illustrates the relationships between a consumer profiling system and various entities. As can be seen in FIG. 20A, a consumer 2000 can receive information and advertisements from a consumer personal computer (PC) 2004, displayed on a television 2008 which is connected to a set-top 2006, or can receive a mailed ad 2082.

Advertisements and information displayed on consumer PC 2004 or television 2008 can be received over an Internet 2050, or can be received over the combination of the Internet 2050 with another telecommunications access system. The telecommunications access system can include but is not limited to cable TV delivery systems, switched digital video access systems operating over telephone wires, microwave telecommunications systems, or any other medium which provides connectivity between the consumer 2000 and a content server 2062 and ad server 2046.

A content/opportunity provider 2060 maintains the content server 2062 which can transmit content including broadcast programming across a network such as the Internet 2050. Other methods of data transport can be used including private data networks and can connect the content sever 2060 through an access system to a device owned by consumer 2000.

Content/opportunity provider 2060 is termed such since if consumer 2000 is receiving a transmission from content server 2062, the content/opportunity provider can insert an advertisement. For video programming, content/opportunity provider is typically the cable network operator or the source of entertainment material, and the opportunity is the ability to transmit an advertisement during a commercial break.

The majority of content that is being transmitted today is done so in broadcast form, such as broadcast television programming (broadcast over the air and via cable TV networks), broadcast radio, and newspapers. Although the interconnectivity provided by the Internet will allow consumer specific programming to be transmitted, there will still be a large amount of broadcast material that can be sponsored in part by advertising. The ability to insert an advertisement in a broadcast stream (video, audio, or mailed) is an opportunity for advertiser 2044. Content can also be broadcast over the Internet and combined with existing video services, in which case opportunities for the insertion of advertisements will be present.

Although FIG. 20A represents content/opportunity provider 2060 and content server 2062 as being independently connected to Internet 2050, with the consumer's devices being also being directly connected to the Internet 2050, the content/opportunity provider 2060 can also control access to the subscriber. This can occur when the content/opportunity provider is also the cable operator or telephone company. In such instances, the cable operator or telephone company can be providing content to consumer 2000 over the cable operator/telephone company access network. As an example, if the cable operator has control over the content being transmitted to the consumer 2000, and has programmed times for the insertion of advertisements, the cable operator is considered to be a content/opportunity provider 2060 since the cable operator can provide advertisers the opportunity to access consumer 2000 by inserting an advertisement at the commercial break.

In a preferred embodiment of the present invention, a pricing policy can be defined. The content/opportunity provider 2060 can charge advertiser 2044 for access to consumer 2000 during an opportunity. In a preferred embodiment the price charged for access to consumer 2000 by content/opportunity provider varies as a function of the applicability of the advertisement to consumer 2000. In an alternate embodiment consumer 2000 retains control of access to the profile and charges for viewing an advertisement.

The content provider can also be a mailing company or printer that is preparing printed information for consumer 2000. As an example, content server 2062 can be connected to a printer 2064 that creates a mailed ad 2082 for consumer 2000. Alternatively, printer 2064 can produce advertisements for insertion into newspapers that are delivered to consumer 2000. Other printed material can be generated by printer 2062 and delivered to consumer 2000 in a variety of ways.

Advertiser 2044 maintains an ad server 2046 that contains a variety of advertisements in the form of still video that can be printed, video advertisements, audio advertisements, or combinations thereof.

Profiler 2040 maintains a consumer profile server 2030 that contains the characterization of consumer 2000. The consumer profiling system is operated by profiler 2040, who can use consumer profile server 2030 or another computing device connected to consumer profile server 2030 to profile consumer 2000.

Data to perform the consumer profiling is received from a point of purchase 2010. Point of purchase 2010 can be a grocery store, department store, other retail outlet, or can be a web site or other location where a purchase request is received and processed. In a preferred embodiment, data from the point of purchase is transferred over a public or private network 2020, such as a local area network within a store or a wide area network that connects a number of department or grocery stores. In an alternate embodiment the data from point of purchase 2010 is transmitted over the Internet 2050 to profiler 2040.

Profiler 2040 may be a retailer who collects data from its stores, but can also be a third party who contracts with consumer 2000 and the retailer to receive point of purchase data and profile consumer 2000. Consumer 2000 may agree to such an arrangement based on the increased convenience offered by targeted ads, or through a compensation arrangement in which they are paid on a periodic basis for revealing their specific purchase records.

Figure 20B:
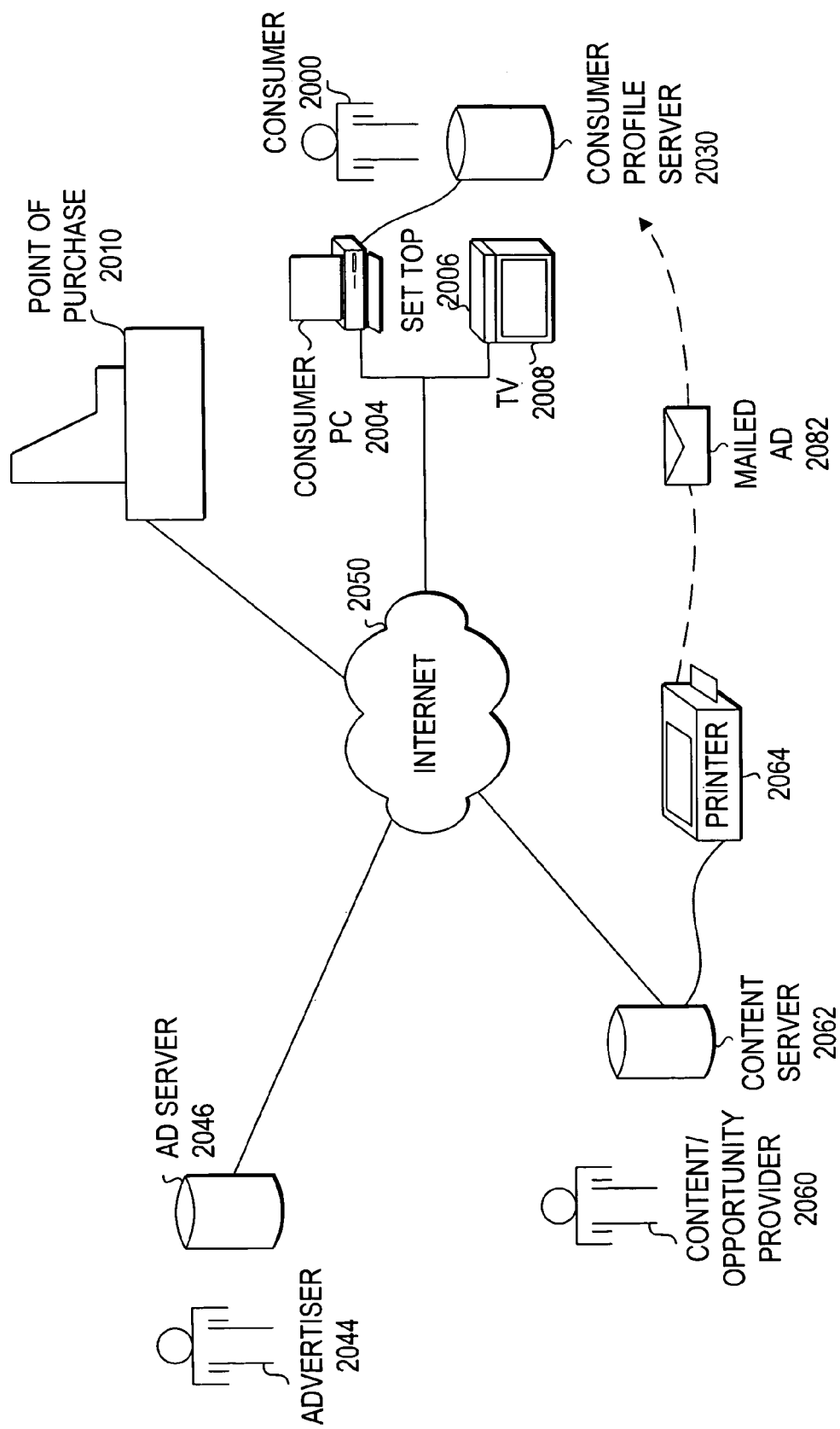

FIG. 20B illustrates an alternate embodiment of the present invention in which the consumer 2000 is also profiler 2040. Consumer 2000 maintains consumer profile server 2030 that is connected to a network, either directly or through consumer PC 2004 or set-top 2006. Consumer profile server 2030 can contain the consumer profiling system, or the profiling can be performed in conjunction with consumer PC 2004 or set-top 2006. A subscriber characterization system that monitors the viewing habits of consumer 2000 can be used in conjunction with the consumer profiling system to create a more accurate consumer profile.

When the consumer 2000 is also the profiler 2040, as shown in FIG. 20B, access to the consumer demographic and product preference characterization is controlled exclusively by consumer 2000, who will grant access to the profile in return for receiving an increased accuracy of ads, for cash compensation, or in return for discounts or coupons on goods and services.

Figure 21A:
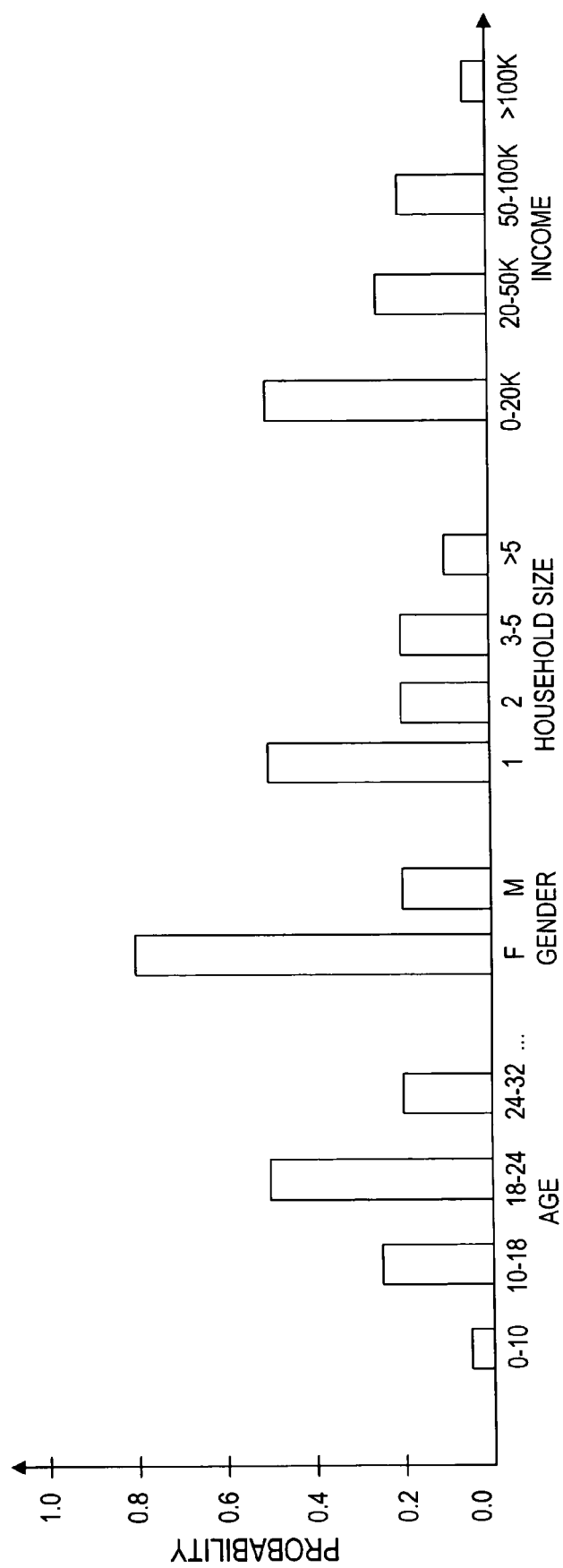
FIGS. 21A-D illustrate a probabilistic consumer demographic characterization vector, a deterministic consumer demographic characterization vector, a consumer product preference characterization vector, and a storage structure for consumer characterization vectors respectively.

FIG. 21A illustrates an example of a probabilistic demographic characterization vector. The demographic characterization vector is a representation of the probability that a consumer falls within a certain demographic category such as an age group, gender, household size, or income range.

In a preferred embodiment the demographic characterization vector includes interest categories. The interest categories may be organized according to broad areas such as music, travel, and restaurants. Examples of music interest categories include country music, rock, classical, and folk. Examples of travel categories include "travels to another state more than twice a year," and travels by plane more than twice a year."

Figure 21B:
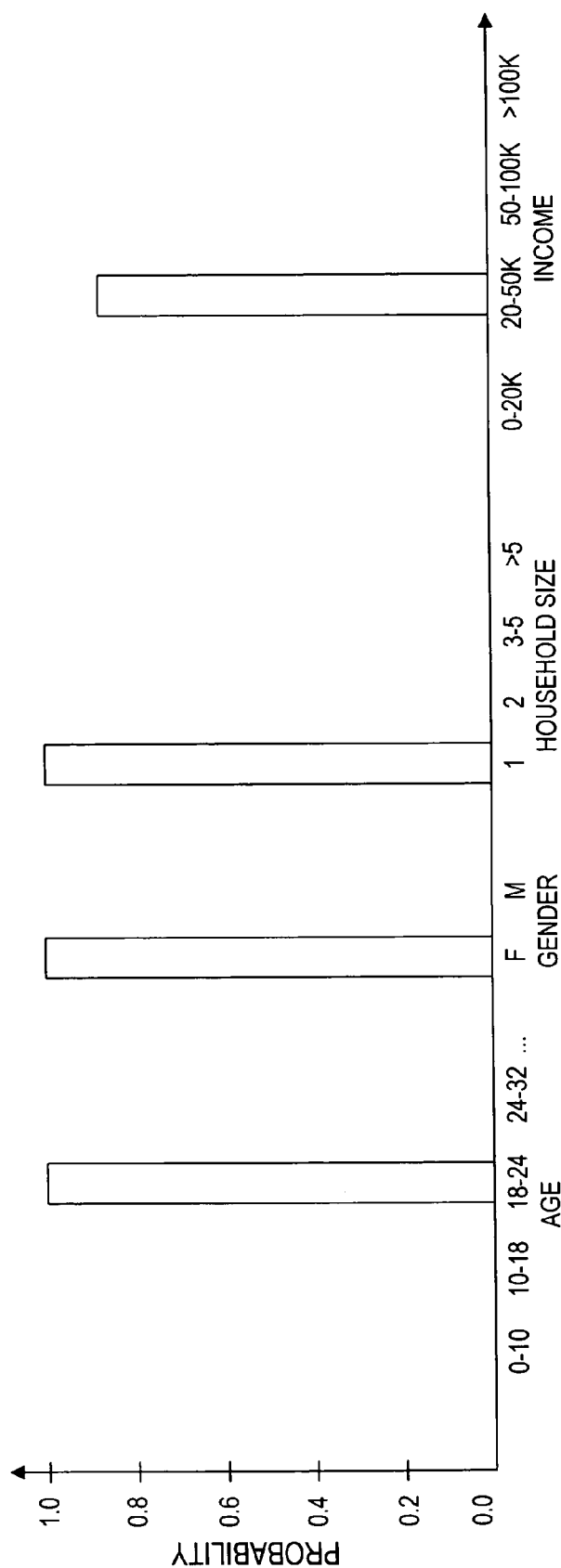

FIG. 21B illustrates a deterministic demographic characterization vector. The deterministic demographic characterization vector is a representation of the consumer profile as determined from deterministic rather than probabilistic data. As an example, if consumer 2000 agrees to answer specific questions regarding age, gender, household size, income, and interests the data contained in the consumer characterization vector will be deterministic.

As with probabilistic demographic characterization vectors, the deterministic demographic characterization vector can include interest categories. In a preferred embodiment, consumer 2000 answers specific questions in a survey generated by profiler 2040 and administered over the phone, in written form, or via the Internet 2050 and consumer PC 2004. The survey questions correspond either directly to the elements in the probabilistic demographic characterization vector, or can be processed to obtain the deterministic results for storage in the demographic characterization vector.

Figure 21C:
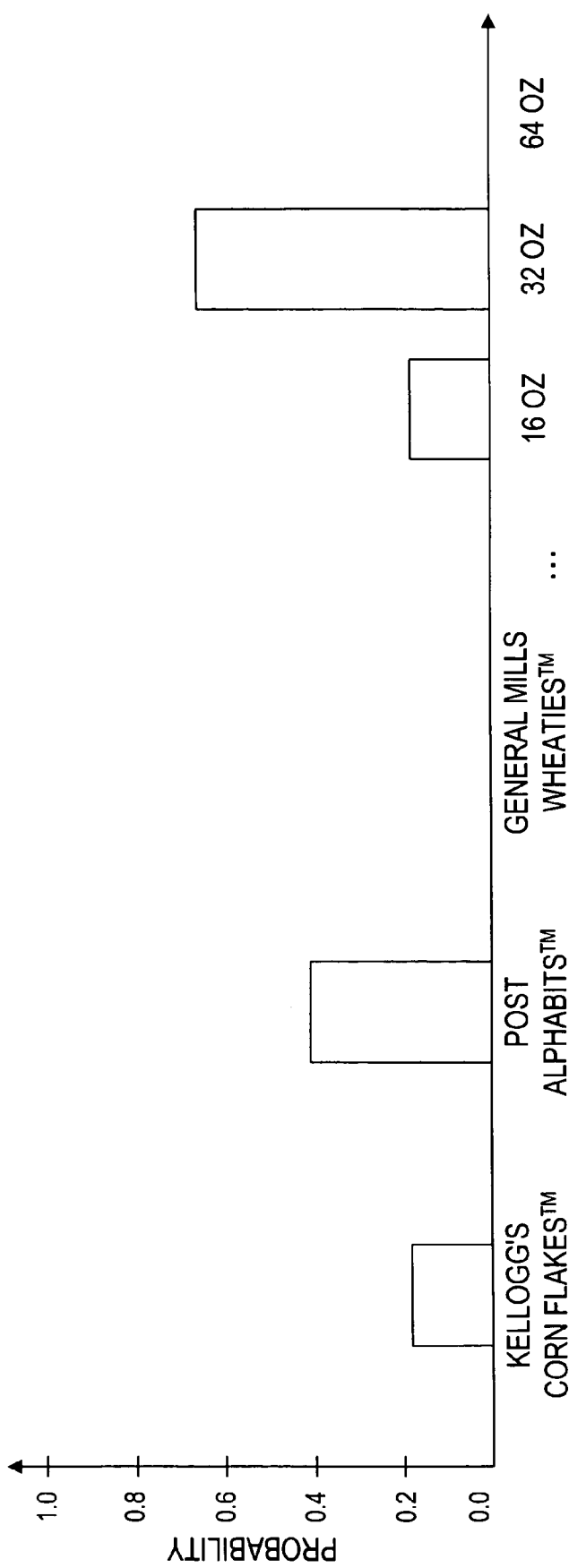

FIG. 21C illustrates a product preference vector. The product preference represents the average of the consumer preferences over past purchases. As an example, a consumer who buys the breakfast cereal manufactured by Post under the trademark ALPHABITS about twice as often as purchasing the breakfast cereal manufactured by Kellogg under the trademark CORN FLAKES, but who never purchases breakfast cereal manufactured by General Mills under the trademark WHEATIES, would have a product preference characterization such as that illustrated in FIG. 21C. As illustrated in FIG. 21C, the preferred size of the consumer purchase of a particular product type can also be represented in the product preference vector.

Figure 21D:
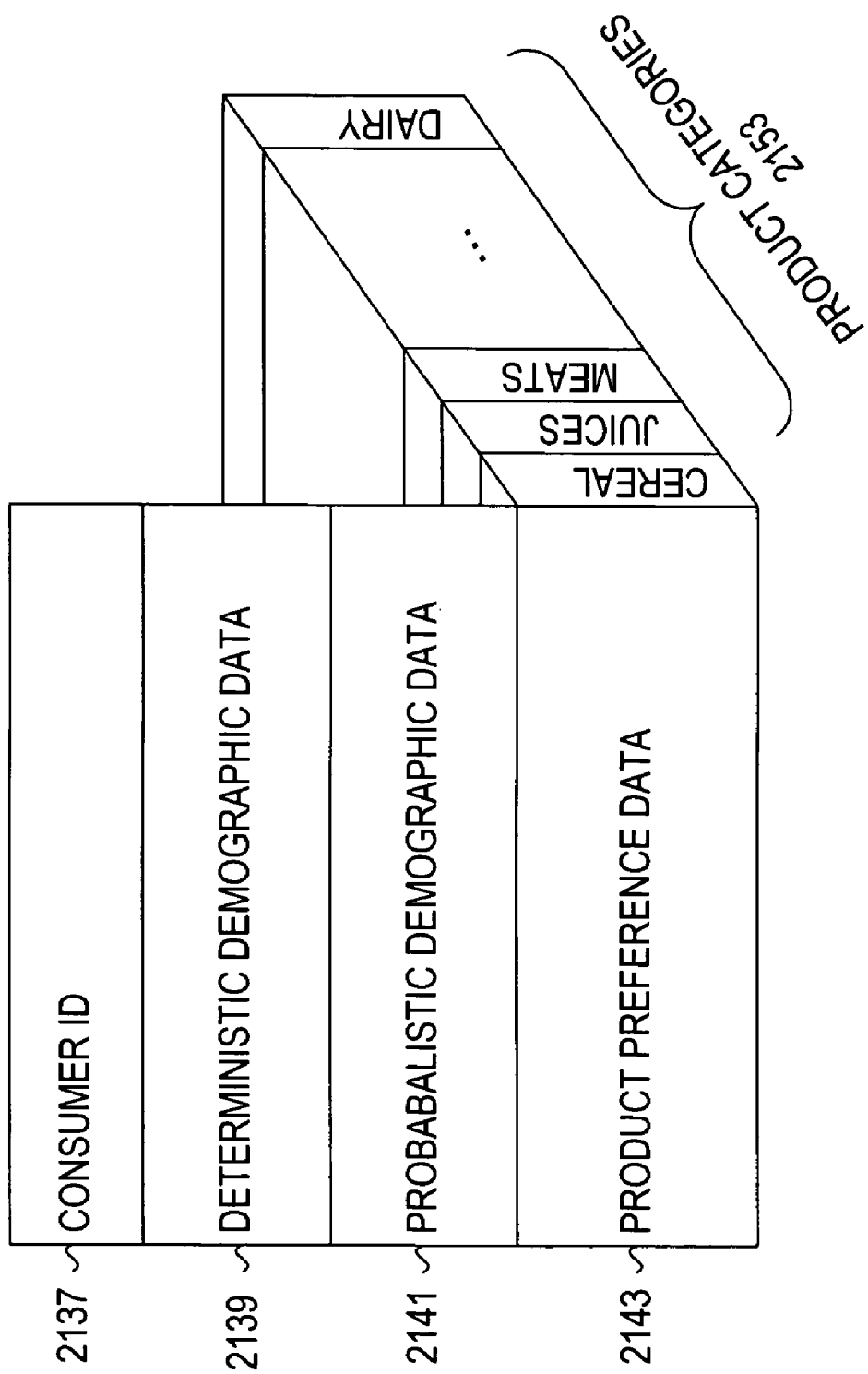

FIG. 21D represents a data structure for storing the consumer profile, which can be comprised of a consumer ID field 2137, a deterministic demographic data field 2139, a probabilistic demographic data field 2141, and one or more product preference data fields 2143. As illustrated in FIG. 21D, the product preference data field 2143 can be comprised of multiple fields arranged by product categories 2153.

Depending on the data structure used to store the information contained in the vector, any of the previously mentioned vectors may be in the form of a table, record, linked tables in a relational database, series of records, or a software object.

A consumer ID 2312 (described later with respect to FIG. 23) can be any identification value uniquely associated with consumer 2000. In a preferred embodiment consumer ID 2312 is a telephone number, while in an alternate embodiment consumer ID 2312 is a credit card number. Other unique identifiers include consumer name with middle initial or a unique alphanumeric sequence, the consumer address, social security number.

The vectors described and represented in FIGS. 21A-C form consumer characterization vectors that can be of varying length and dimension, and portions of the characterization vector can be used individually. Vectors can also be concatenated or summed to produce longer vectors that provide a more detailed profile of consumer 2000. A matrix representation of the vectors can be used, in which specific elements, such a product categories 2153, are indexed. Hierarchical structures can be employed to organize the vectors and to allow hierarchical search algorithms to be used to locate specific portions of vectors.

Figure 22A:
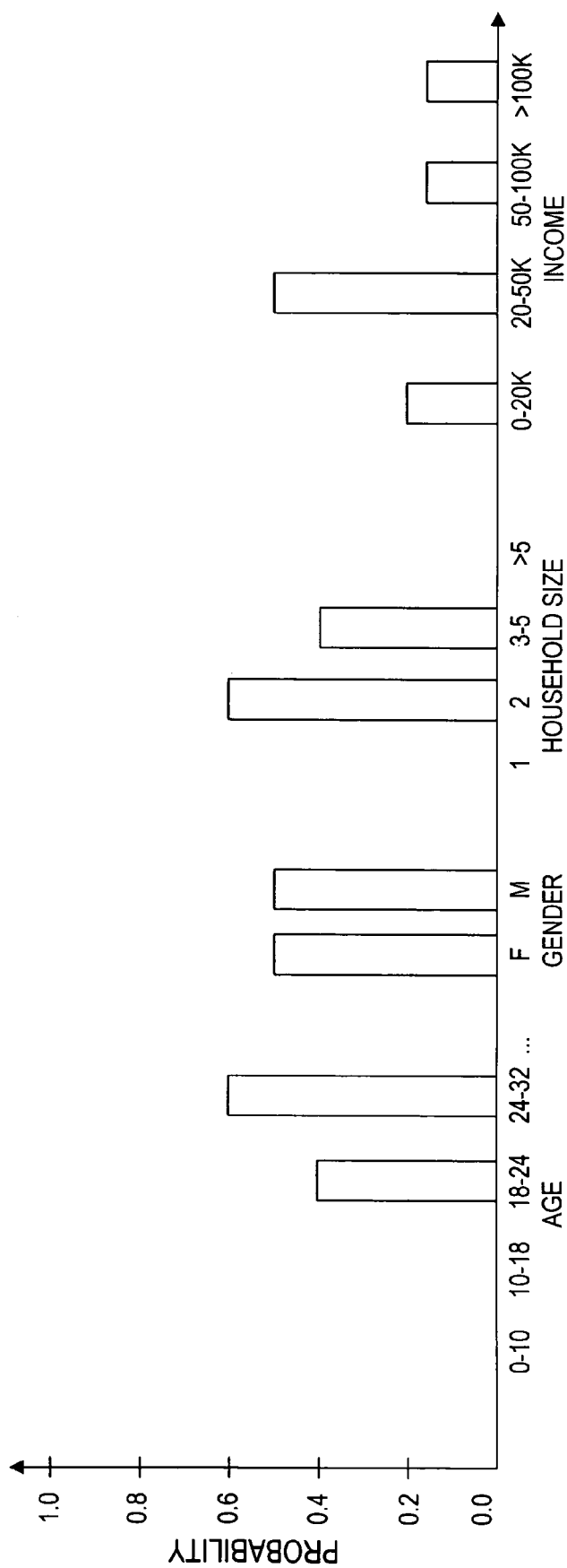
FIGS. 22A-B illustrate an advertisement demographic characterization vector and an advertisement product preference characterization vector respectively.
Figure 22B:
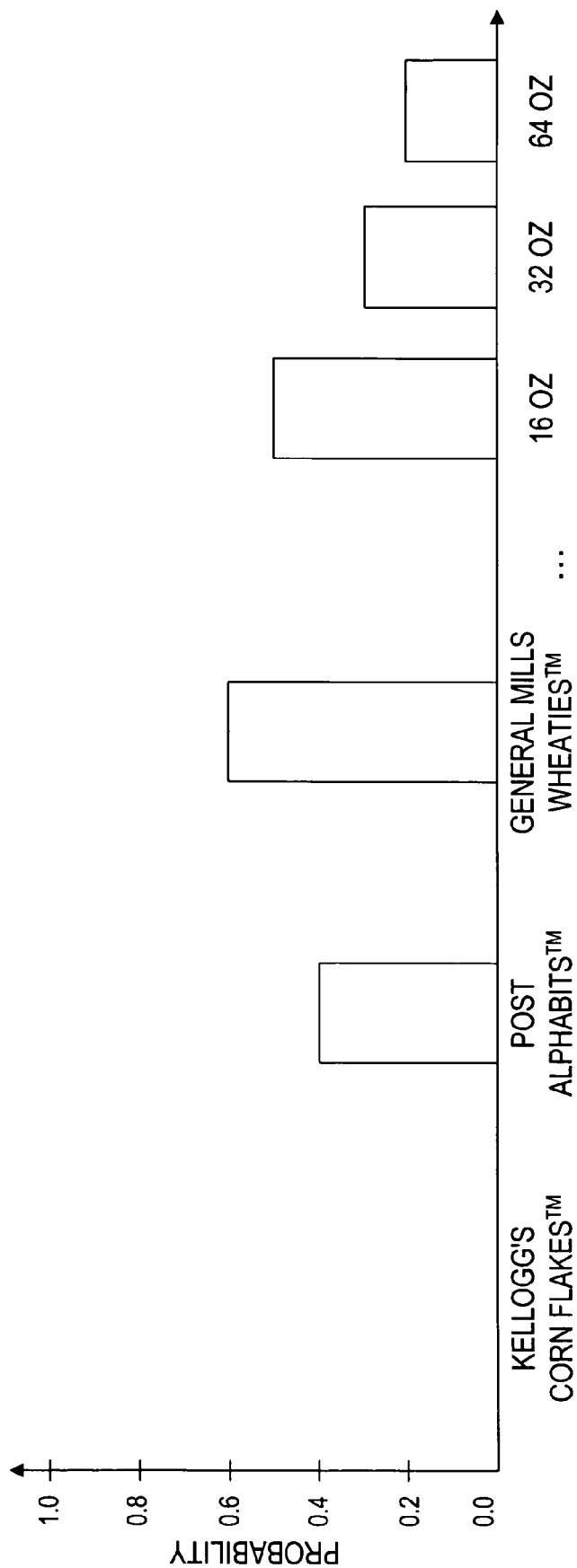

FIGS. 22A-B represent an ad demographics vector and an ad product preference vector respectively. The ad demographics vector, similar in structure to the demographic characterization vector, is used to target the ad by setting the demographic parameters in the ad demographics vector to correspond to the targeted demographic group. As an example, if an advertisement is developed for a market which is the 18-24 and 24-32 age brackets, no gender bias, with a typical household size of 2-5, and income typically in the range of $20,000-$50,000, the ad demographics vector would resemble the one shown in FIG. 22A. The ad demographics vector represents a statistical estimate of who the ad is intended for, based on the advertisers belief that the ad will be beneficial to the manufacturer when viewed by individuals in those groups. The benefit will typically be in the form of increased sales of a product or increased brand recognition. As an example, an "image ad" which simply shows an artistic composition but which does not directly sell a product may be very effective for young people, but may be annoying to older individuals. The ad demographics vector can be used to establish the criteria that will direct the ad to the demographic group of 18-24 year olds.

FIG. 22B illustrates an ad product preference vector. The ad product preference vector is used to select consumers that have a particular product preference. In the example illustrated in FIG. 22B, the ad product preference vector is set so that the ad can be directed a purchasers of ALPHABITS and WHEATIES, but not at purchasers of CORN FLAKES. This particular setting would be useful when the advertiser represents Kellogg and is charged with increasing sales of CORN FLAKES. By targeting present purchasers of ALPHABITS and WHEATIES, the advertiser can attempt to sway those purchasers over to the Kellogg brand and in particular convince them to purchase CORN FLAKES. Given that there will be a payment required to present the advertisement, in the form of a payment to the content/opportunity provider 2060 or to the consumer 2000, the advertiser 2044 desires to target the ad and thereby increase its cost effectiveness.

In the event that advertiser 2044 wants to reach only the purchasers of Kellogg's CORN FLAKES, that category would be set at a high value, and in the example shown would be set to 1. As shown in FIG. 22B, product size can also be specified. If there is no preference to size category the values can all be set to be equal. In a preferred embodiment the values of each characteristic including brand and size are individually normalized.

Because advertisements can be targeted based on a set of demographic and product preference considerations which may not be representative of any particular group of present consumers of the product, the ad characterization vector can be set to identify a number of demographic groups which would normally be considered to be uncorrelated. Because the ad characterization vector can have target profiles which are not representative of actual consumers of the product, the ad characterization vector can be considered to have discretionary elements. When used herein the term discretionary refers to a selection of target market characteristics which need not be representative of an actual existing market or single purchasing segment.

In a preferred embodiment the consumer characterization vectors shown in FIGS. 21A-C and the ad characterization vectors represented in FIGS. 22A-B have a standardized format, in which each demographic characteristic and product preference is identified by an indexed position. In a preferred embodiment the vectors are singly indexed and thus represent coordinates in n-dimensional space, with each dimension representing a demographic or product preference characteristic. In this embodiment a single value represents one probabilistic or deterministic value (e.g. the probability that the consumer is in the 18-24 year old age group, or the weighting of an advertisement to the age group).

In an alternate embodiment a group of demographic or product characteristics forms an individual vector. As an example, age categories can be considered a vector, with each component of the vector representing the probability that the consumer is in that age group. In this embodiment each vector can be considered to be a basis vector for the description of the consumer or the target ad. The consumer or ad characterization is comprised of a finite set of vectors in a vector space that describes the consumer or advertisement.

Figure 23:
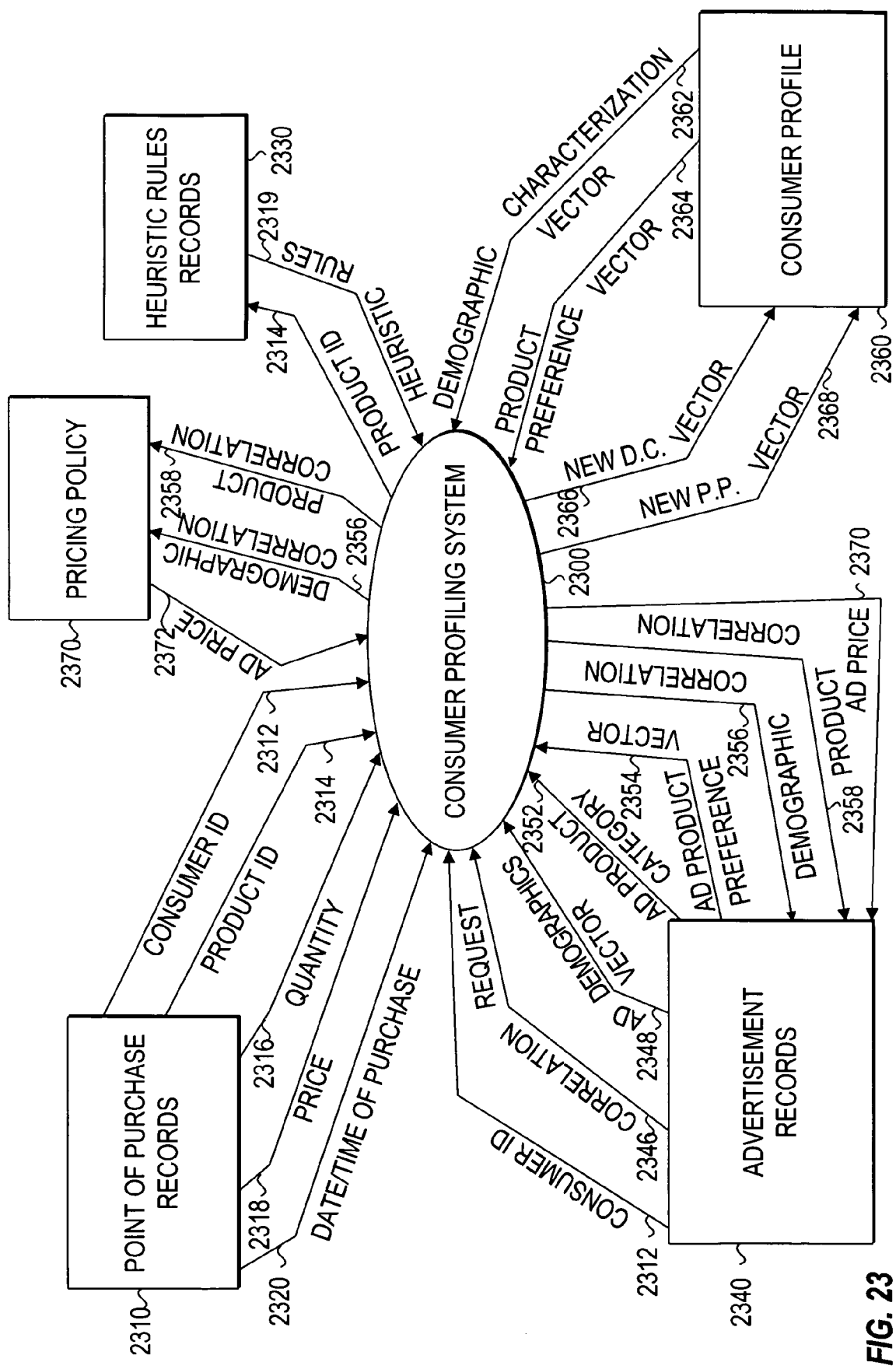
FIG. 23 illustrates a context diagram for the present invention.

FIG. 23 shows a context diagram for the present invention. Context diagrams are useful in illustrating the relationship between a system and external entities. Context diagrams can be especially useful in developing object oriented implementations of a system, although use of a context diagram does not limit implementation of the present invention to any particular programming language. The present invention can be realized in a variety of programming languages including but not limited to C, C++, Smalltalk, Java, Perl, and can be developed as part of a relational database. Other languages and data structures can be utilized to realize the present invention and are known to those skilled in the art.

Referring to FIG. 23, in a preferred embodiment consumer profiling system 2300 is resident on consumer profile server 2030. Point of purchase records 2310 are transmitted from point of purchase 2010 and stored on consumer profile server 2030. Heuristic rules 2330, pricing policy 2370, and consumer profile 2360 are similarly stored on consumer profile server 130. In a preferred embodiment advertisement records 2340 are stored on ad server 2046 and connectivity between advertisement records 2340 and consumer profiling system 2300 is via the Internet or other network.

In an alternate embodiment the entities represented in FIG. 23 are located on servers that are interconnected via the Internet or other network.

Consumer profiling system 2300 receives purchase information from a point of purchase, as represented by point of purchase records 2310. The information contained within the point of purchase records 2310 includes the consumer ID 2312, a product ID 2314 of the purchased product, the quantity 2316 purchased and the price 2318 of the product. In a preferred embodiment, the date and time of purchase 2320 are transmitted by point of purchase records 2310 to consumer profiling system 2300.

The consumer profiling system 2300 can access the consumer profile 2360 to update the profiles contained in it. Consumer profiling system 2300 retrieves a consumer characterization vector 2362 and a product preference vector 2364. Subsequent to retrieval one or more data processing algorithms are applied to update the vectors. An algorithm for updating is illustrated in the flowchart in FIG. 26A. The updated vectors termed herein as new demographic characterization vector 2366 and new product preference 2368 are returned to consumer profile 2360 for storage.

Consumer profiling system 2300 can determine probabilistic consumer demographic characteristics based on product purchases by applying heuristic rules 2319. Consumer profiling system 2300 provides a product ID 2314 to heuristic rules records 2330 and receives heuristic rules associated with that product. Examples of heuristic rules are illustrated in FIG. 25.

In a preferred embodiment of the present invention, consumer profiling system 2300 can determine the applicability of an advertisement to the consumer 2000. For determination of the applicability of an advertisement, a correlation request 2346 is received by consumer profiling system 2300 from advertisements records 2340, along with consumer ID 2312. Advertisements records 2340 also provides advertisement characteristics including an ad demographic vector 2348, an ad product category 2352 and an ad product preference vector 2354.

Application of a correlation process, as will be described in accordance with FIG. 26B, results in a demographic correlation 2356 and a product correlation 2358 which can be returned to advertisement records 2340. In a preferred embodiment, advertiser 2044 uses product correlation 2358 and demographic correlation 2356 to determine the applicability of the advertisement and to determine if it is worth purchasing the opportunity. In a preferred embodiment, pricing policy 2370 is utilized to determine an ad price 2372 which can be transmitted from consumer profiling system 2300 to advertisement records 2340 for use by advertiser 2044.

Pricing policy 2370 is accessed by consumer profiling system 2300 to obtain ad price 2372. Pricing policy 2370 takes into consideration results of the correlation provided by the consumer profiling system 2300. An example of pricing schemes will be discussed in detail later with respect to FIG. 27.

FIGS. 24A and 24B illustrate pseudocode for the updating process and for a correlation operation respectively. The updating process involves utilizing purchase information in conjunction with heuristic rules to obtain a more accurate representation of consumer 2000, stored in the form of a new demographic characterization vector 2362 and a new product preference vector 2368.

As illustrated in the pseudocode in FIG. 24A the point of purchase data are read and the products purchase are integrated into the updating process. Consumer profiling system 2300 retrieves a product demographics vector obtained from the set of heuristic rules 2319 and applies the product demographics vector to the demographics characterization vector 2362 and the product preference vector 2364 from the consumer profile 2360.

The updating process as illustrated by the pseudocode in FIG. 24A utilizes a weighting factor that determines the importance of that product purchase with respect to all of the products purchased in a particular product category. In a preferred embodiment the weight is computed as the ratio of the total of products with a particular product ID 2314 purchased at that time, to the product total purchase, which is the total quantity of the product identified by its product ID 2314 purchased by consumer 2000 identified by its consumer ID 2312, purchased over an extended period of time. In a preferred embodiment the extended period of time is one year.

In the preferred embodiment the product category total purchase is determined from a record containing the number of times that consumer 2000 has purchased a product identified by a particular product ID.

In an alternate embodiment other types of weighting factors, running averages and statistical filtering techniques can be used to use the purchase data to update the demographic characterization vector. The system can also be reset to clear previous demographic characterization vectors and product preference vectors.

The new demographic characterization vector 2366 is obtained as the weighted sum of the product demographics vector and the demographic characterization vector 2362.

The same procedure is performed to obtain the new product preference vector 2368. Before storing those new vectors, a normalization is performed on the said new vectors. When used herein the term product characterization information refers product demographics vectors, product purchase vectors or heuristic rules, all of which can be used in the updating process. The product purchase vector refers to the vector that represents the purchase of an item represented by a product ID. As an example, a product purchase vector for the purchase of Kellogg's CORN FLAKES in a 32 oz. size has a product purchase vector with a unity value for Kellogg's CORN FLAKES and in the 32 oz. size. In the updating process the weighted sum of the purchase as represented by the product purchase vector is added to the product preference vector to update the product preference vector, increasing the estimated probability that the consumer will purchase Kellogg's CORN FLAKES in the 32 oz. size.

In FIG. 24B the pseudocode for a correlation process is illustrated. Consumer profiling system 2300, after receiving the product characteristics and the consumer ID 2312 from the advertisement records retrieves the consumer demographic characterization vector 2362 and its product preference vector 2364. The demographic correlation is the correlation between the demographic characterization vector 2362 and the ad demographics vector. The product correlation is the correlation between the ad product preference vector 2354 and the product preference vector 2364.

In a preferred embodiment the correlation process involves computing the dot product between vectors. The resulting scalar is the correlation between the two vectors.

Figure 28:
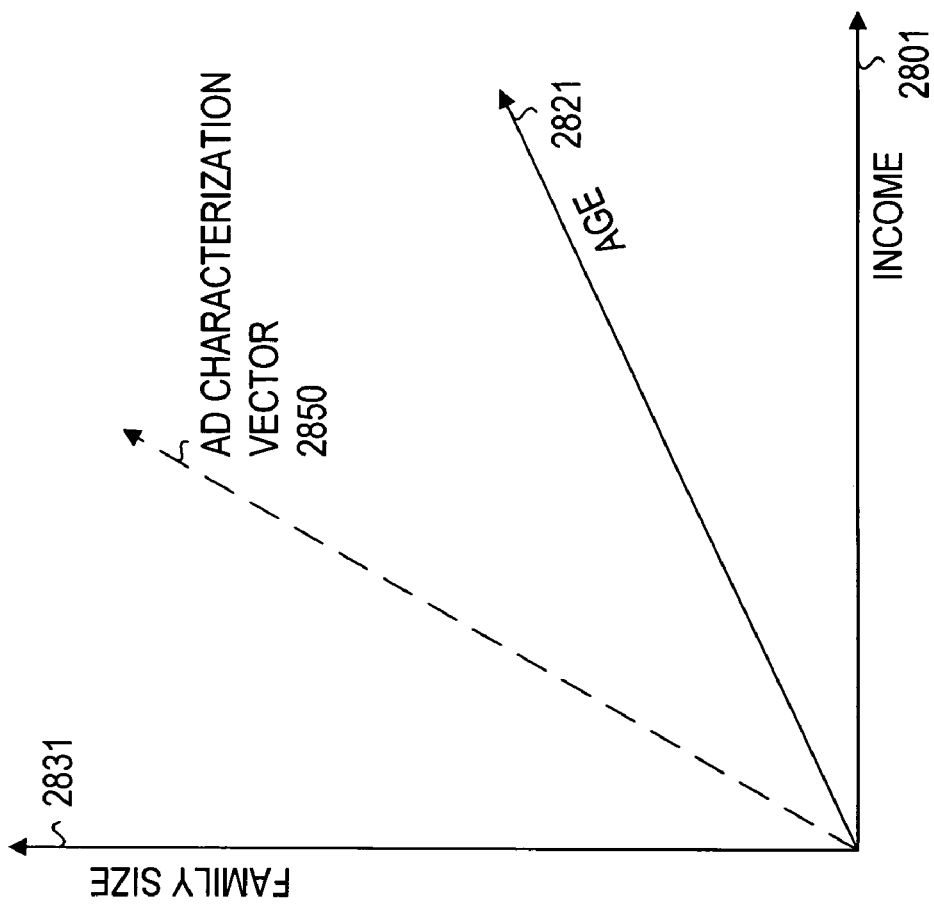
FIG. 28 illustrates a representation of a consumer characterization as a set of basis vectors and an ad characterization vector.

In an alternate embodiment, as illustrated in FIG. 28, the basis vectors which describe aspects of the consumer can be used to calculate the projections of the ad vector on those basis vectors. In this embodiment, the result of the ad correlation can itself be in vector form whose components represent the degree of correlation of the advertisement with each consumer demographic or product preference feature. As shown in FIG. 28 the basis vectors are the age of the consumer 2821, the income of the consumer 2801, and the family size of the consumer 2831. The ad characterization vector 2850 represents the desired characteristics of the target audience, and can include product preference as well as demographic characteristics.

In this embodiment the degree of orthogonality of the basis vectors will determine the uniqueness of the answer. The projections on the basis vectors form a set of data that represent the corresponding values for the parameter measured in the basis vector. As an example, if household income is one basis vector, the projection of the ad characterization vector on the household income basis vector will return a result indicative of the target household income for that advertisement.

Because basis vectors cannot be readily created from some product preference categories (e.g. cereal preferences) an alternate representation to that illustrated in FIG. 21C can be utilized in which the product preference vector represents the statistical average of purchases of cereal in increasing size containers. This vector can be interpreted as an average measure of the cereal purchased by the consumer in a given time period.

The individual measurements of correlation as represented by the correlation vector can be utilized in determining the applicability of the advertisement to the subscriber, or a sum of correlations can be generated to represent the overall applicability of the advertisement.

In a preferred embodiment individual measurements of the correlations, or projections of the ad characteristics vector on the consumer basis vectors, are not made available to protect consumer privacy, and only the absolute sum is reported. In geometric terms this can be interpreted as disclosure of the sum of the lengths of the projections rather than the actual projections themselves.

In an alternate embodiment the demographic and product preference parameters are grouped to form sets of paired scores in which elements in the consumer characterization vector are paired with corresponding elements of the ad characteristics vector. A correlation coefficient such as the Pearson product-moment correlation can be calculated. Other methods for correlation can be employed and are well known to those skilled in the art.

When the consumer characterization vector and the ad characterization vector are not in a standardized format, a transformation can be performed to standardize the order of the demographic and product preferences, or the data can be decomposed into sets of basis vectors which indicate particular attributes such as age, income or family size.

FIG. 25 illustrates an example of heuristic rules including rules for defining a product demographics vector. From the product characteristics, a probabilistic determination of household demographics can be generated. Similarly, the monthly quantity purchased can be used to estimate household size. The heuristic rules illustrated in FIG. 25 serve as an example of the types of heuristic rules that can be employed to better characterize consumer 2000 as a result of their purchases. The heuristic rules can include any set of logic tests, statistical estimates, or market studies that provide the basis for better estimating the demographics of consumer 2000 based on their purchases.

Figure 26A:
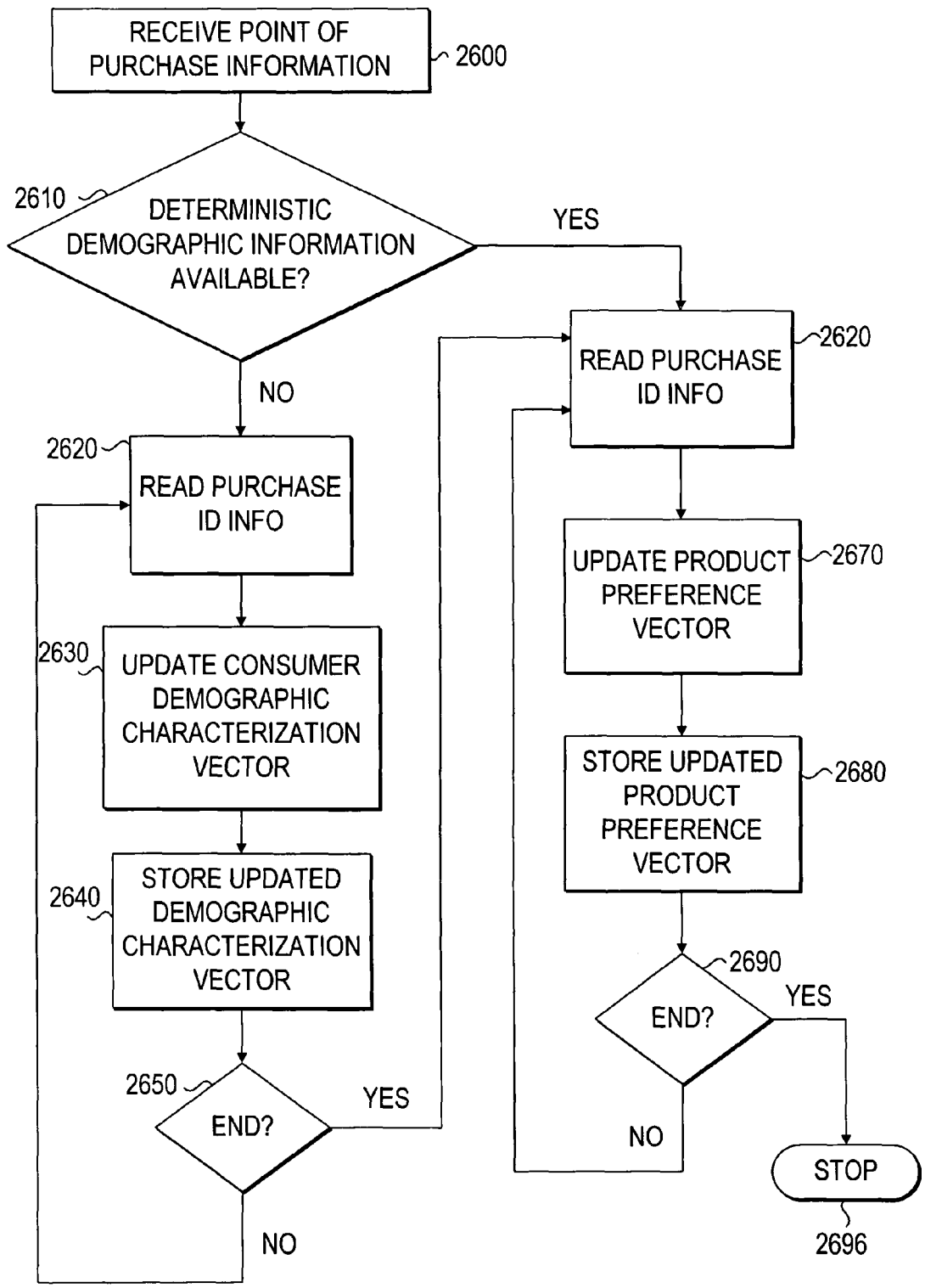
FIGS. 26A-B illustrate flowcharts for updating consumer characterization vectors and a correlation operation respectively.

In FIG. 26A the flowchart for updating the consumer characterization vectors is depicted. The system receives data from the point of purchase at receive point of purchase information step 2600. The system performs a test to determine if a deterministic demographic characterization vector is available at deterministic demographic information available step 2610 and, if not, proceeds to update the demographic characteristics.

Referring to FIG. 26A, at read purchase ID info step 2620, the product ID 2314 is read, and at update consumer demographic characterization vector step 2630, an algorithm such as that represented in FIG. 24A is applied to obtain a new demographic characterization vector 2366, which is stored in the consumer profile 2360 at store updated demographic characterization vector step 2640.

The end test step 2650 can loop back to the read purchase ID info 2620 if all the purchased products are not yet processed for updating, or continue to the branch for updating the product preference vector 2364. In this branch, the purchased product is identified at read purchase ID info step 2620. An algorithm, such as that illustrated in FIG. 24A for updating the product preference vector 2364, is applied in update product preference vector step 2670. The updated vector is stored in consumer profile 2360 at store product preference vector step 2680. This process is carried out until all the purchased items are integrated in the updating process.

Figure 26B:
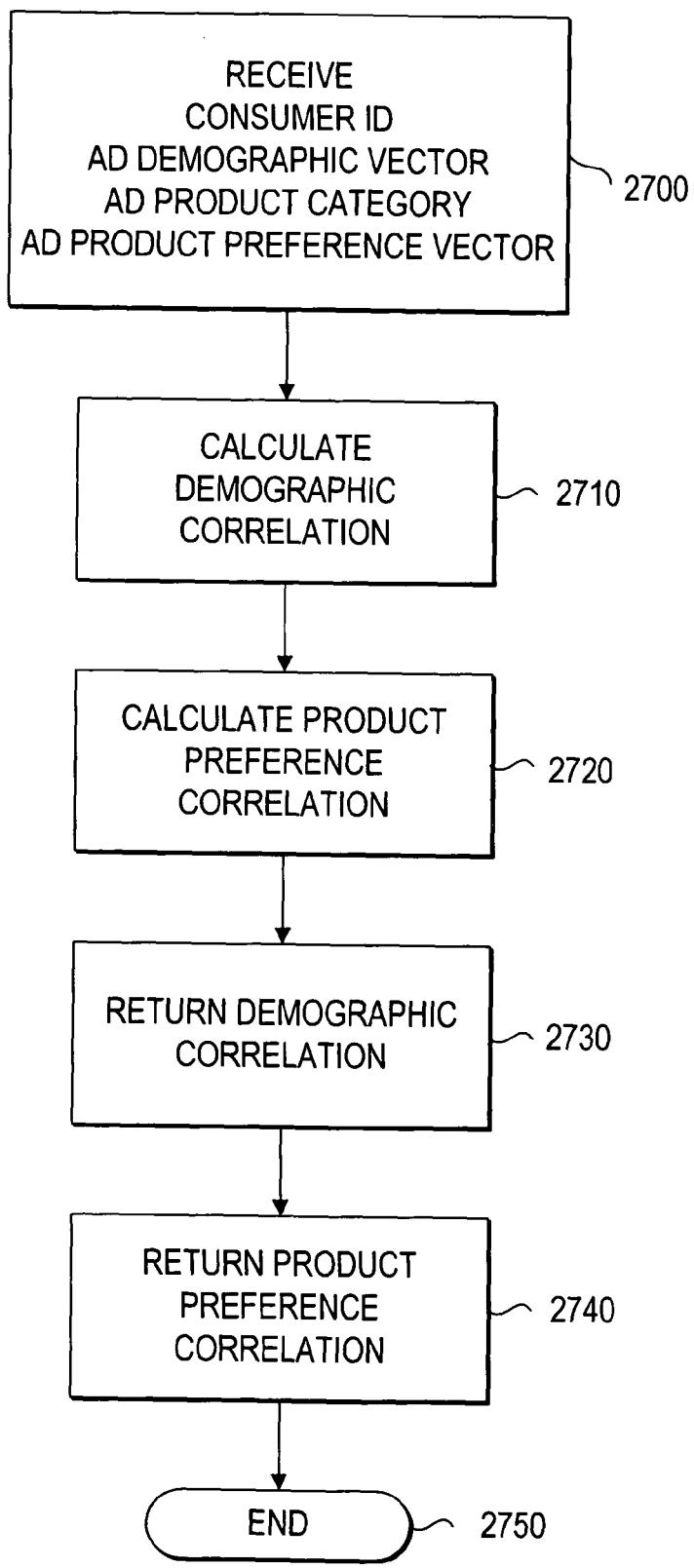

FIG. 26B shows a flowchart for the correlation process. At step 2700 the advertisement characteristics described earlier in accordance with FIG. 23 along with the consumer ID are received by consumer profiling system 2300. At step 2710 the demographic correlation 2356 is computed and at step 2720 the product preference correlation 2358 is computed. An illustrative example of an algorithm for correlation is presented in FIG. 24b. The system returns demographic correlation 2356 and product preference correlation 2358 to the advertisement records 2340 before exiting the procedure at end step 2750.

Figure 27:
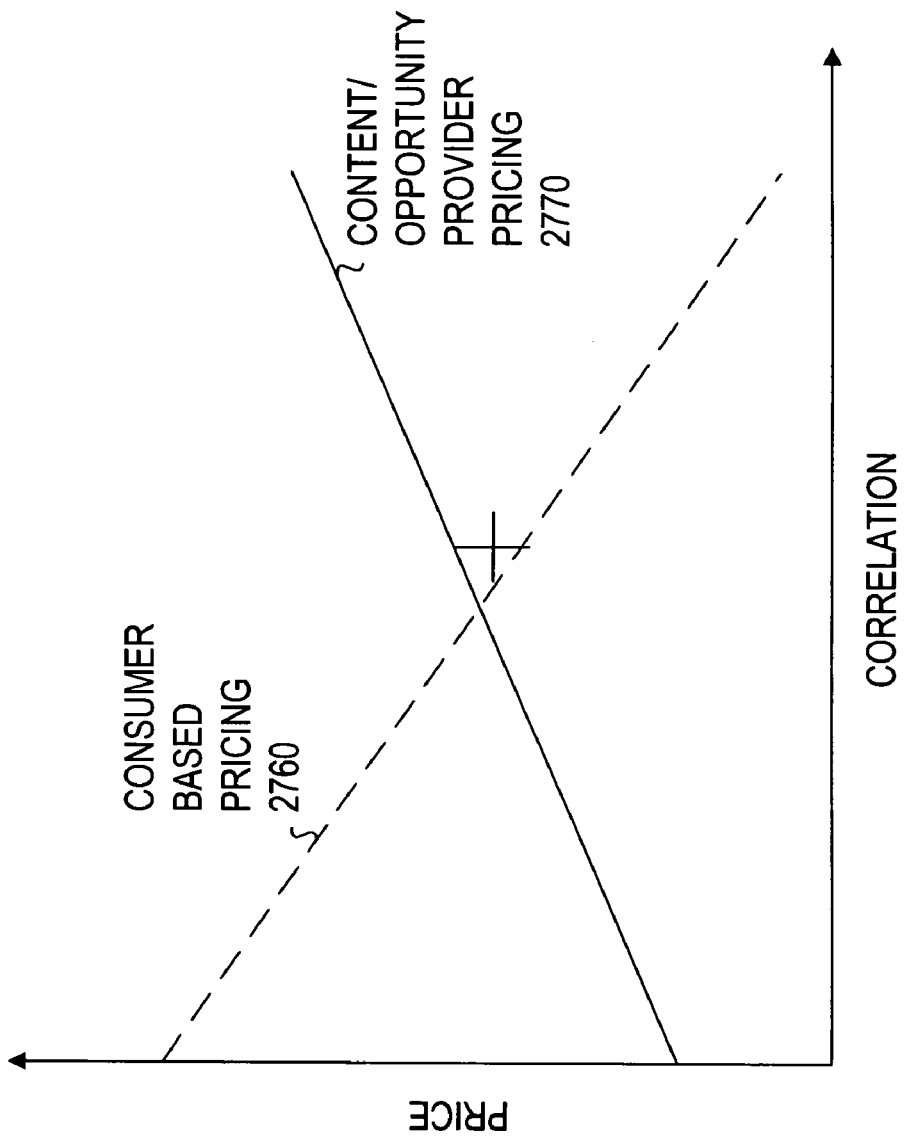
FIG. 27 represents pricing as a function of correlation.

FIG. 27 illustrates two pricing schemes, one for content/opportunity provider 160 based pricing 2770, which shows increasing cost as a function of correlation. In this pricing scheme, the higher the correlation, the more the content/opportunity provider 2060 charges to air the advertisement.

FIG. 27 also illustrates consumer based pricing 2760, which allows a consumer to charge less to receive advertisements which are more highly correlated with their demographics and interests.

As an example of the industrial applicability of the invention, a consumer 2000 can purchase items in a grocery store that also acts as a profiler 2040 using a consumer profiling system 2300. The purchase record is used by the profiler to update the probabilistic representation of customer 2000, both in terms of their demographics as well as their product preferences. For each item purchased by consumer 2000, product characterization information in the form of a product demographics vector and a product purchase vector is used to update the demographic characterization vector and the product preference vector for consumer 2000.

A content/opportunity provider 2060 may subsequently determine that there is an opportunity to present an advertisement to consumer 2000. Content/opportunity provider 2060 can announce this opportunity to advertiser 2044 by transmitting the details regarding the opportunity and the consumer ID 2312. Advertiser 2044 can then query profiler 2040 by transmitting consumer ID 2312 along with advertisement specific information including the correlation request 2346 and ad demographics vector 2348. The consumer profiling system 2300 performs a correlation and determines the extent to which the ad target market is correlated with the estimated demographics and product preferences of consumer 2000. Based on this determination advertiser 2044 can decide whether to purchase the opportunity or not.

The principles of the present invention also provide novel ways of collecting subscriber information, e.g., subscribers have options to control the flow of information. In one implementation, the subscribers decide whether they want to be enrolled in the profiling, i.e., whether they want their viewing habits and other information to be collected.

In this implementation, the data is collected with the explicit permission of the consumer/subscriber, who enrolls in the service and agrees to be profiled, similar to an "opt-in" feature. In the "opt-in" feature, the subscriber/consumer is specifically inquired whether he or she wants to be profiled. In exchange for opt-in, the subscribers may receive economic benefit from the service through discounts on cable service, discounts through retail outlets, rebates from specific manufacturers, and other incentive plans.

In the case of video services, the subscribers may be presented with a series of enrollment screens that confirm the subscribers' opt-in and ask the subscriber for specific demographic information that may be used to create one or more subscriber profiles.

In performing the enrollment process, it is possible to obtain specific demographic information including household income, size, and age distribution. Although this information is not necessary for profiling, obtaining it from the subscriber allows deterministic information to be used in conjunction with the probabilistic information.

Other opt-in methods may be used for the different media. In an Internet environment, a free browser add-on/plug-in may be used that performs profiling through one or more secured techniques that remove cookies, alters/hides surf streams. In this case, the subscriber will have an option to enroll in a secure system that permits profiling in a controlled and secure manner along with providing economic incentives for participation in the profiling process. Upon enrolling in the service, a profiling module may be downloaded or activated that may perform the profiling through the browser.

The principles of the present invention also support the construction of distributed databases, each of which contain a portion of information that is utilized to create a subscriber/consumer profile. The distributed databases are constructed such that no privacy violating information is contained in one database, and the operators utilized to extract information from each database preserve privacy and do not measure the parameters that should not be observed.

In the actual formation of subscriber profiles, the system may extract information from a plurality of databases and aggregate portions of the information to create a subscriber profile. In the aggregation of data, the emerging standards, such as XML, may be used for the transport of the data and the standardized profiles may be utilized to ensure that the secured server may effectively combine the elements of the distributed profiling databases to create a composite consumer/subscriber characterization vector characterizing subscriber profiles.

Figure 29:
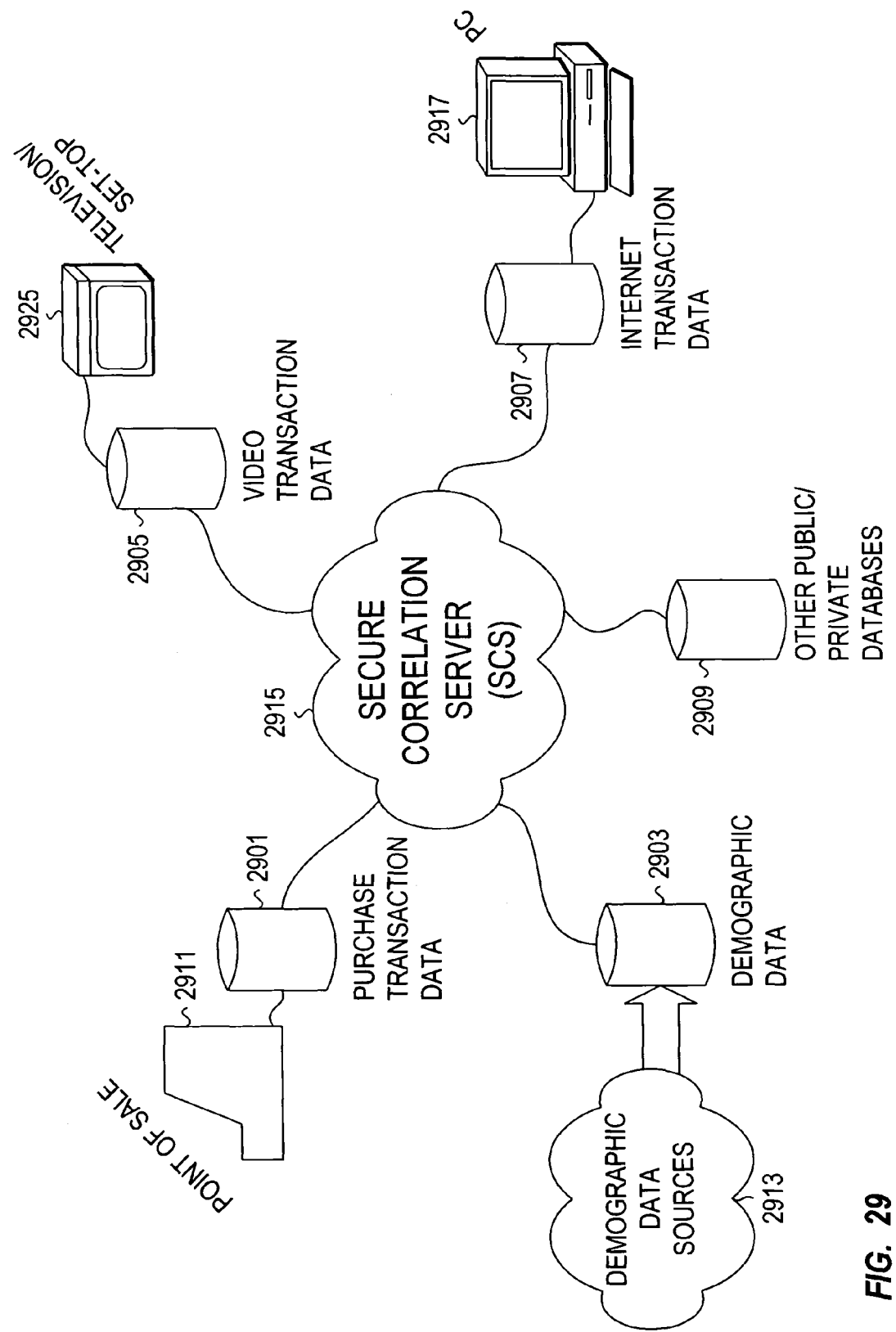
FIG. 29 illustrates an exemplary implementation of distributed databases, each of which contain a portion of information that can be utilized to create a subscriber/consumer profile.

As illustrated in FIG. 29, the distributed database may be comprised of specific data sets including: purchase transaction data 2901 obtained from a point-of-sale 2911 which may be a physical point-of-sale or a virtual (Internet) point-of-sale; Internet transaction data 2907 obtained from a PC 2917 or other device connected to the Internet; video transaction data 2905 obtained in conjunction with a television/set-top combination 2925 or other video centric device; and demographic data 2903 obtained from demographic data sources 2913. The examples of demographic data sources include commercial databases such as the MicroVision™ product from the Claritas corporation™. Other public or private databases 2909 including those containing tax information may also be used. Different distributed databases are configured to a secure correlation server (SCS) 2915.

In the present invention, Quantum Advertising™ is proposed wherein a probabilistic representation of an individual's interests, in particular, products and services, is utilized and specific private information about the individual is kept private. In this way, it is possible for advertisers to effectively target information to consumers without violating their privacy. The basis for what is termed Quantum Advertising™ is derived from quantum mechanics, and in particular rests on the concept that an individual's information may be treated in a similar fashion to electrons and other subatomic particles. In quantum mechanics, it is possible to have a probabilistic representation of a particle, but impossible to have a deterministic representation in which the precise position of the particle is known.

In the present invention, the probabilistic descriptions of subscribers along with a restricted set of operators are developed. The restricted set of operators allows certain measurements to be made, but prohibits privacy invading determinations. As an example, an operator may be created and utilized that may indicate a probability that an individual will potentially purchase a new health care product, such as a shampoo or a toothpaste, but proper construction of the database and operators would prohibit determination of the individual's exact income in order to see if they are a potential purchaser of that product.

Another example would be the development of a target group for a new drug, such as an HIV related product. The proper construction of the databases and operators may allow for the formation of a group of individuals likely to be receptive to the product, but would not allow identification of individuals in the group, and the database would not contain health related information such as HIV status.

Thus, the principles of the present invention utilize one or more operators that allow the measurement of certain parameters (non-deterministic parameters), but prohibit the measurement of other parameters. In accordance with the principles of the present invention, the description of an individual/household may be contained in a vector which is described as the ket vector, using the notation |A> where A represents the vector describing an aspect of the individual/household.

The ket vector |A> can be described as the sum of components such that $$|A\rangle = (a_1\rho_1 + a_2\rho_2 + \ldots a_n\rho_n) +$$
$$(b_1\sigma_1 + b_2\sigma_2 + \ldots b_n\sigma_n) + (c_1\tau_1 + c_2\tau_2 + \ldots c_n\tau_n) +$$
$$(d_1\upsilon_1 + d_2\upsilon_2 + \ldots d_n\upsilon_n) + (e_1\omega_1 + e_2\omega_2 + \ldots e_n\omega_n)$$

where $a_n\rho_n$ represents weighted demographic factors that may be deterministic or probabilistic.

The other components of the ket vector |A> include:
$b_n\sigma_n$, which represents weighted socio-economic factors;
$c_n\tau_n$, which represents weighted housing factors;
$d_n\upsilon_n$, which represents weighted purchase factors; and
$e_n\omega_n$, which represents weighted consumption factors.

The elements of the ket vector |A> may be stored on distributed databases, and the components within the groups above can be mixed and stored in various locations. In addition, |A> may not comprise all of the components listed above, but may instead utilize only a subset of that information.

Consistent with the concepts of wave functions in quantum mechanics, for each ket vector there is a corresponding bra vector of the format <A|. In order to insure that the probabilities are normalized, the identity <A|A>=1 is insured. Although the ket and bra vectors are expected to be real entities, there is the possibility of storing additional information in a complex ket vector, in which case the corresponding bra vector will be <A*|, and the normalization criteria is <A*|A>=1.

Having created the basic descriptions of the households/individuals in the form of a distributed or centralized database, a series of linear operations may be performed on the database in order to obtain results that provide targeting information. The linear operations may be performed using one or more operators, which when applied to the database, yield a measurable result. It is important to note that by proper construction of the operators, it is possible to prevent inappropriate (privacy violating) measurements from being made.

The generalized method for obtaining information from the database is thus:

targeting information=$<A|f|A>$ where f is a single operation or series of operations that result in a measurable quantity (observable). Through the application of these operators it is possible to query the database in a controlled manner and obtain information about a target group, or to determine if an advertisement is applicable to an individual/household (subscriber).

For determination of the applicability of an advertisement to an individual/household, the advertiser can supply an ad characterization vector along with the ID of an individual/household, with the applicability of the advertisement being determined as:

ad applicability=$<A|AC\{ID\}|A>$ where AC{ID} is the ad characterization vector that contains an ID that may be at the individual, anonymous, or group level. Examples of the possible IDs are as follows:
Individual Level:
social security #
address
credit card/courtesy card #
phone #
Anonymous (e.g. Through the Use of Anonymous Transaction Profiling):
transaction ID (video transaction records)
transaction ID (purchase transaction records)
transaction ID (surfing transaction records)
Group:
zip code
area code/central office code
domain name
employer The use of individual/household IDs allows determination of the applicability of an advertisement for a particular household or individual. Anonymous transaction IDs may be used when no information regarding the identity of the subscriber is being provided, but when transaction profiles have been developed based on the use of anonymous transaction profiling. Group IDs may be utilized to determine applicability of an advertisement to a particular group, with the basis for the grouping being geographic, demographic, socio-economic, or through another grouping mechanism.

The operators may result in a simple correlation operation in which the operator contains an advertisement characterization vector which is correlated against elements in the database, or may be a series of operations which result in the determination of the applicability of an advertisement, or determination of the product preferences of a group or an individual.

The ad characterization vector contains a description of the expected characteristics of the target market. The ad characterization vector may be obtained from the advertiser, a media buyer, or individual cognizant of the market to which the advertisement is directed.

Other operators can be constructed so that functions other than correlations can be performed. As an example, grouping or clustering can be performed on the database by performing a series of operations that identifies consumers with similar characteristics. In addition to grouping or clustering, operators can be constructed to identify a set of subscribers who are candidates for a product based on specific selection criteria. As an example, it is possible to construct an operator which returns a list of subscribers likely to be interested in a product, with the level of interest being determined from probabilistic elements such as age, income, previous purchase profiles, Internet profiles, or video selection profiles.

Proper construction of the database (and in particular construction of the ket vectors and ket vector subcomponents) and the operators ensures that privacy is maintained and prevents direct reading of the data and inappropriate queries. Furthermore, the actual transaction records (e.g. purchases, web surf streams, or channels viewed) are never stored, and no privacy violating information (e.g. medical conditions) are stored in the database.

Figure 30A:
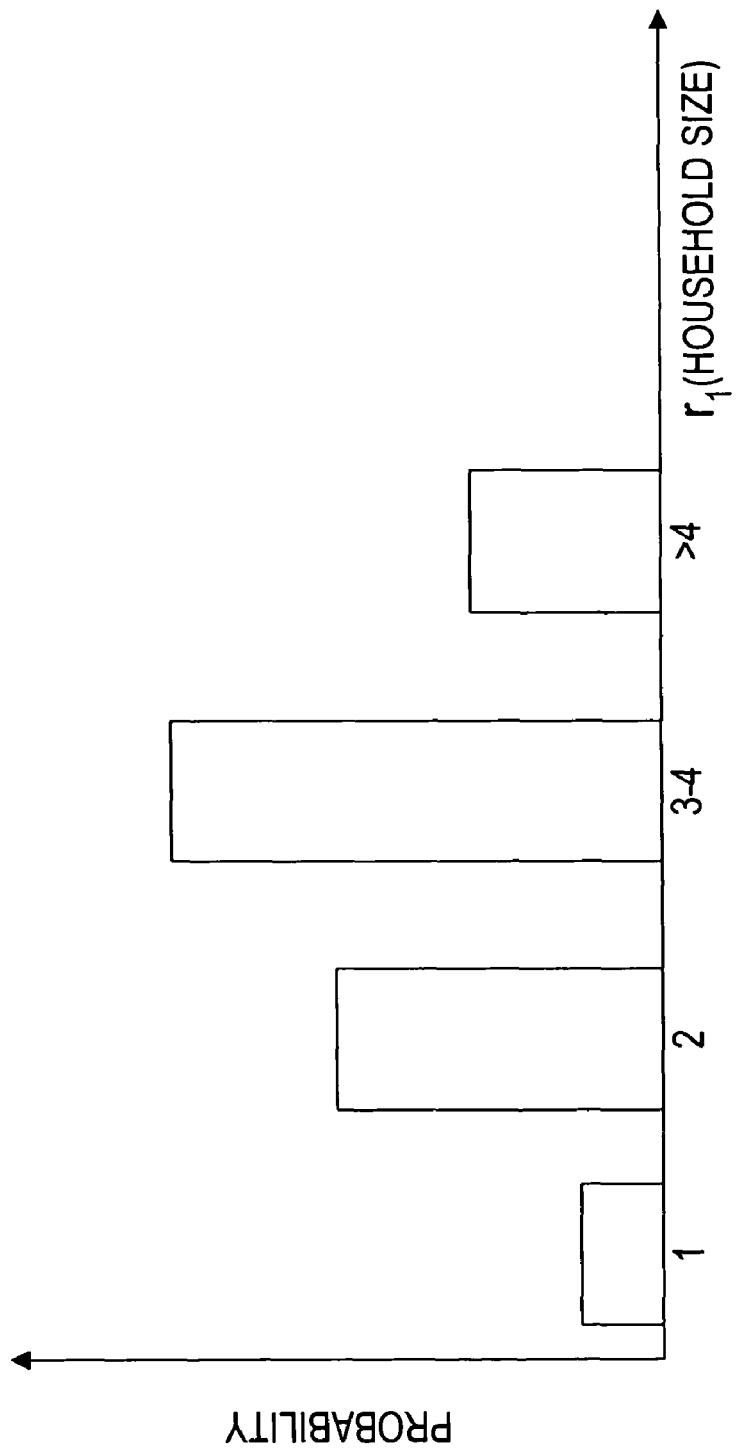
FIGS. 30A-B illustrate examples of demographic factors including household size and ethnicity.
Figure 30B:
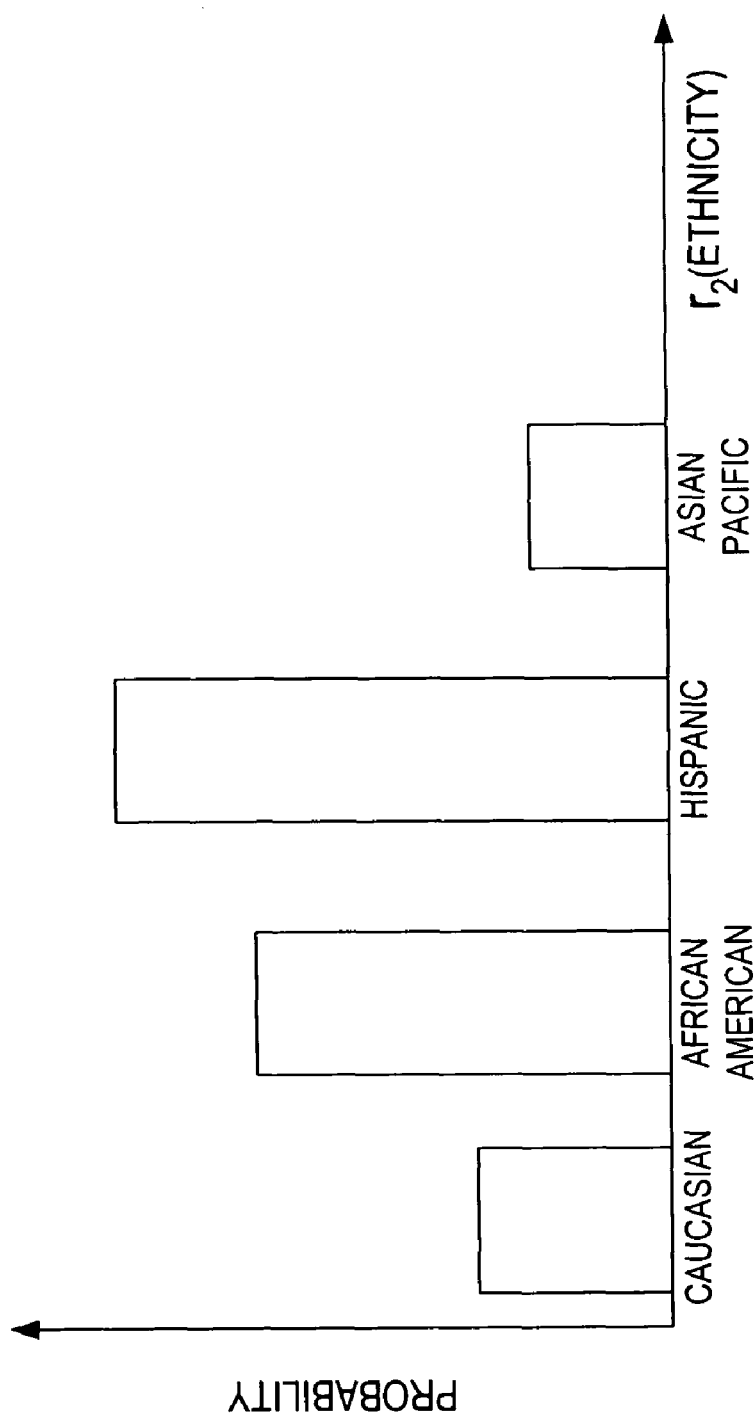

FIGS. 30A and 30B illustrate examples of demographic factors including household size and ethnicity. As previously mentioned, these functions may not necessarily be probabilistic, but may be obtained from questionnaires presented to the subscriber that lead to deterministic responses. These responses can be represented as unity value probabilities.

The principles of the present invention propose advantages both for subscribers and advertisers. A proposed service in accordance with the principles of the present invention will be free to the subscriber and includes incentives such as discounts on Internet/video service. Furthermore, the advertisers may pay a premium for advertisements placed using the system. This premium is amongst the content provider, the Internet/video service provider, and the provider of ad matching.

As an example, if an advertising opportunity during a network sports event costs $0.10 per viewer, the charge for the matched advertisement (ad) might be $0.14 per viewer. The additional $0.04 is divided amongst the content provider (in this case the network), the Internet/video service provider, and the provider of ad matching. Because the ad is not displayed to the entire set of viewers, but rather to the subset of viewers that will find the ad acceptable, the total cost to the advertiser is likely to be less than, or at most the same as without the matching.

The ad matching increases the effectiveness of the advertising and thus makes better use of advertising dollars.

The service may be applied to cable networks, both for Internet based services as well as video services. For Internet based services over cable networks, the targeting may be at the level of the individual home. For video services, the targeting is presently at the level of the node, since cable networks do not have the individual home resolution that switched digital video networks have. Ad substitution technology at the set-top level may increase the resolution of cable advertising, while SDV networks are inherently capable of resolution at the individual home level.

In one embodiment, the present invention may be deployed as an Ad Management System (AMS) in a video environment. The AMS includes a Secure Correlation Server™ (SCS) configured to deliver targeted advertisements over video systems including Switched Digital Video (SDV) platforms, cable platforms, satellite platforms, and streaming video (Internet) delivery platforms. The system allows for advertisers to deliver ad characterization vectors to the Secure Correlation Server™ (SCS). The ad characterization vectors assist in determining the applicability of the advertisements to a particular subscriber or group of subscribers (e.g., node). The AMS performs the functions of prioritizing, selling, scheduling, and billing of video advertisements.

In another embodiment, the present invention may be deployed as a browser add-on/plug-in for the Internet environment. In this embodiment, the profiling is not completely blocked, but the subscriber is allowed to switch to a secured mode wherein the subscriber is profiled via a secure system. In return, subscribers receive economic benefit for their participation.

In another embodiment, the present invention is a profiling product that operates at the point-of-purchase (retail outlet, mail order, or other retail purchasing system) and produces profiles based on the purchases of the subscriber. The specific purchases of the consumer are not stored, and the profiles are only utilized by authorized members.

In another embodiment, the principles of the present invention are deployed as a secured credit card that may be utilized to monitor purchase transactions of the subscribers and to ensure consumers that their purchase information will not be aggregated, but to allow them to gain the benefits of secure profiling. By the use of a secured credit card, consumers may allow profiling based on their purchase records. This embodiment ensures that the raw transaction data (detailed purchase records) is not stored.

By using a credit card that is part of the targeted advertising business, it is possible to track the purchases made by that consumer. Although it is preferable to discard the specific transaction data after profiling, use of a credit card associated with the targeted advertising process allows for tracking of purchase activity by consumers who "opt-in". The credit card may also be subsidized by the advertising dollars, thus creating a low interest rate credit card, which would be an incentive to "opt-in".

In this embodiment, advertisers may also be able to correlate their advertisements against consumer information and target advertisements to the subscribers, however, the advertisers are not provided access to the profiles themselves. The revenues generated by the credit card issuer/profiler may be used to subsidize the credit card in the form of decreased interest rates and/or discounts or rebates for use of the card. Another feature of the secured credit card is the ability to determine if a displayed advertisement resulted in the purchase of an item. As an example, if a targeted advertisement is displayed to a consumer via the present system and the item is subsequently purchased using the secured credit card, the advertisement may be marked as effective. On a statistical basis, the effectiveness of an advertising campaign may be readily measured when the subscribers receive advertisements through the secured system and make their purchase using the secured credit card of the present invention.

In one implementation, the present invention may be based on the use of a secure correlation server (SCS) connected directly to an access platform, e.g., a Broadband Digital Terminal (BDT). In this implementation, the secure correlation server is capable of receiving video profiles (formed from channel changes and dwell times) from the BDT as well as receiving consumer purchase records from participating retail outlets and/or online stores. The SCS may also utilize the data from external databases.

In this implementation, the profiling is performed based on consent, e.g., the profiles of subscribers/consumers who opt-in for the service agree to have their demographic and preference profiles stored on the SCS.

Advertisers wishing to send advertisements to a subscriber during an ad opportunity (Web page ad location or video advertising spot) transmit an ad characterization vector to the SCS. The ad characterization vector may be created by the advertiser by simply filling out a Web page containing questions (with pull down answers) that describe the target market by demographic information or by preference information.

Upon receiving the ad characterization vector the SCS correlates the ad characterization vector with the subscriber/consumer characterization vector. Based on the results of this correlation, the SCS may determine whether the ad should be delivered to the subscriber, or if an alternate ad should be presented.

A privacy firewall may be maintained between the BDT and the SCS to ensure that subscriber/consumer characterization vectors may not be read or constructed by unauthorized parties. Because no raw data (consumer purchase or viewing records) are stored on the SCS, there is no possibility of unauthorized access of private information. This system allows subscribers/consumers the ability to receive more desirable advertisements while simultaneously receiving discounts for Internet/video services and at retail/online outlets. Advertisers receive the benefit of more effective advertisements, and thus spend advertising dollars more efficiently. This increase in efficiency results in increased revenue stream. Advertisers pay a premium for targeted advertisements, as opposed to traditional linked sponsorship advertisements in which a flat rate is paid for access to an audience whose characteristics are only generally known.

Although this invention has been illustrated by reference to specific embodiments, it will be apparent to those skilled in the art that various changes and modifications may be made, which clearly fall within the scope of the invention. The invention is intended to be protected broadly within the spirit and scope of the appended claims.

What is claimed is:

1. A computer implemented method of identifying at least one consumer to be the target of an advertisement, the method comprising:
   (a) accessing, by a computer, a plurality of consumer transaction records corresponding to a plurality of consumers and accessing demographic information records corresponding to the plurality of consumers;
   (b) retrieving heuristic rules that associate consumer transactions with consumer characteristics, wherein said heuristic rules have been pre-defined prior to accessing said plurality of consumer transaction records and wherein said pre-defined heuristic rules have been developed based on at least one psychological or sociological study;
   (c) retrieving at least one target consumer characteristic from an advertiser that has been selected at the discretion of the advertiser;
   (d) applying said pre-defined heuristic rules to said plurality of consumer transaction records to generate inferred transaction characteristics of the plurality of consumers;
   (e) generating, by a computer, inferred consumer characteristics of the plurality of consumers by associating the inferred transaction characteristics with the demographic information records;
   (f) selecting at least one target consumer from the plurality of consumers by correlating the inferred consumer characteristics with the at least one target consumer characteristic selected at the discretion of the advertiser; and
   (g) transmitting an advertisement associated with the advertiser to the at least one target consumer.

2. The method of claim 1, wherein at least one of the plurality of consumers has more than one consumer characteristic.

3. The method of claim 1, wherein the plurality of consumer transaction records includes purchase transactions for the plurality of consumers.

4. The method of claim 1, wherein the demographic information records are stored in a private consumer demographics database.

5. The method of claim 1, wherein the demographic information records include demographic information associated with geographic locations.

6. The method of claim 1, wherein an individual consumer from said plurality of consumers is identified anonymously.

7. The method of claim 6, wherein the anonymously identified consumer is identified through the use of anonymous transaction profiling.

8. The method of claim 1, wherein the at least one target consumer characteristic includes target demographic characteristics and target purchase characteristics.

9. A computer implemented method of identifying at least one consumer to be the target of an advertisement, the method comprising:
   (a) accessing, by a computer, a plurality of consumer transaction records corresponding to a plurality of consumers and accessing demographic information records wherein each demographic information record corresponds to a consumer transaction record;
   (b) retrieving heuristic rules that associate consumer transactions with consumer characteristics, wherein said heuristic rules have been pre-defined prior to accessing said plurality of consumer transaction records and wherein said pre-defined heuristic rules have been developed through the application of at least one heuristic process which incorporates at least two types of analysis selected from the group consisting of logic tests, statistical estimates, self-learning, experiments, market studies, human knowledge and experience;
   (c) retrieving at least one target consumer characteristic from an advertiser that has been selected at the discretion of the advertiser;
   (d) applying said pre-defined heuristic rules to said plurality of consumer transaction records to generate inferred transaction characteristics of the plurality of consumers;
   (e) generating, by a computer, inferred consumer characteristics of the plurality of consumers by associating the inferred transaction characteristics with a corresponding demographic information record of the consumer; and
   (f) selecting at least one target consumer from the plurality of consumers by correlating the inferred consumer characteristics with the at least one target market characteristic selected at the discretion of the advertiser; and
   (g) transmitting an advertisement associated the advertiser to the at least one target consumer.

10. The method of claim 9, wherein the at least one target consumer characteristic includes target demographic characteristics and target purchase characteristics.

11. The method of claim 9, wherein at least one of the plurality of consumers has more than one consumer characteristic.

12. The method of claim 9, wherein the plurality of consumer transaction records includes purchase transactions for the plurality of consumers.

13. The method of claim 9, wherein the demographic information records are stored in a private consumer demographics database.

14. The method of claim 9, wherein the demographic information records include demographic information associated with geographic locations.

15. The method of claim 9, wherein an individual consumer from said plurality of consumers is identified anonymously.

* * * * *